United States Patent
Kurihara et al.

(10) Patent No.: US 11,432,470 B2
(45) Date of Patent: Sep. 6, 2022

(54) INFORMATION PROCESSING APPARATUS, INFORMATION PROCESSING METHOD, AND VEGETATION MANAGEMENT SYSTEM

(71) Applicant: Sony Group Corporation, Tokyo (JP)

(72) Inventors: Kuniaki Kurihara, Tokyo (JP); Masahiko Enari, Kanagawa (JP); Hitoshi Yoshinobu, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 223 days.

(21) Appl. No.: 16/766,963

(22) PCT Filed: Nov. 16, 2018

(86) PCT No.: PCT/JP2018/042425
§ 371 (c)(1),
(2) Date: May 26, 2020

(87) PCT Pub. No.: WO2019/107179
PCT Pub. Date: Jun. 6, 2019

(65) Prior Publication Data
US 2021/0029890 A1    Feb. 4, 2021

(30) Foreign Application Priority Data
Dec. 1, 2017  (JP) .............. JP2017-231793

(51) Int. Cl.
*A01G 7/00*   (2006.01)
*G06T 7/11*   (2017.01)
(Continued)

(52) U.S. Cl.
CPC .............. *A01G 7/00* (2013.01); *A01G 20/00* (2018.02); *G06T 7/0002* (2013.01); *G06T 7/11* (2017.01);
(Continued)

(58) Field of Classification Search
CPC .......... A01G 7/00; A01G 20/00; A01G 7/045; G06T 7/0002; G06T 7/11;
(Continued)

(56) References Cited

U.S. PATENT DOCUMENTS 9,945,828 B1 *  4/2018  Poling ................ G01N 33/0098
10,755,443 B1 *  8/2020  Trundle ................ A01G 25/16
(Continued)

FOREIGN PATENT DOCUMENTS

| CN | 1641348 A | 12/2004 |
| CN | 1658187 A | 8/2005 |

(Continued)

OTHER PUBLICATIONS

Yong et al, ("comparative analysis of the hyperspectral vegetation index and radar vegetation index: A novel Fusion vegetation index", IEEE, 2015) (Year: 2015).*

(Continued)

*Primary Examiner* — Amara Abdi
(74) *Attorney, Agent, or Firm* — Michael Best & Friedrich LLP

(57) ABSTRACT

The present disclosure relates to an information processing apparatus, an information processing method, and a vegetation management system each capable of managing vegetation in such a manner as to maintain a high quality state and achieve uniform growth.

In a vegetation management system, an image acquiring apparatus acquires an image in which vegetation corresponding to a target of management is captured. An analysis unit analyzes the image as at least input information and outputs a predetermined analysis result. Then, a determination unit determines work contents to be performed for the vegetation, according to the analysis result. A work apparatus performs a process for executing work for the vegeta- (Continued)

tion according to the work contents. For example, the present technology is applicable to a management system that manages natural grass.

20 Claims, 45 Drawing Sheets

(51) Int. Cl.
*A01G 20/00* (2018.01)
*G06T 7/00* (2017.01)
*A01G 7/04* (2006.01)

(52) U.S. Cl.
CPC .... *A01G 7/045* (2013.01); *G06T 2207/20021* (2013.01); *G06T 2207/20081* (2013.01); *G06T 2207/30188* (2013.01)

(58) Field of Classification Search
CPC . G06T 2207/20021; G06T 2207/20081; G06T 2207/30188
See application file for complete search history.

(56) References Cited

U.S. PATENT DOCUMENTS

| | | | | |
|---|---|---|---|---|
| 2015/0278640 | A1* | 10/2015 | Johnson | G06T 7/13 |
| | | | | 382/110 |
| 2016/0286801 | A1* | 10/2016 | Liu | A01N 43/38 |
| 2018/0129210 | A1* | 5/2018 | Achtelik | G06T 17/05 |
| 2019/0124853 | A1* | 5/2019 | Serizawa | G06Q 10/06375 |
| 2019/0387741 | A1* | 12/2019 | Kon | A01N 43/90 |

FOREIGN PATENT DOCUMENTS

| | | | | |
|---|---|---|---|---|
| CN | 101729792 | A | | 6/2010 |
| CN | 101742100 | A | | 6/2010 |
| CN | 102084794 | A | | 6/2011 |
| CN | 102215666 | A | | 10/2011 |
| CN | 102708354 | A | | 10/2012 |
| CN | 103377487 | A | | 10/2013 |
| CN | 103970996 | A | | 8/2014 |
| CN | 104239674 | A | | 12/2014 |
| CN | 104412290 | A | | 3/2015 |
| CN | 106954385 | A | | 7/2017 |
| JP | 2005-253415 | A | | 9/2005 |
| JP | 2012-228231 | A | | 11/2012 |
| JP | 2016-52299 | A | | 4/2016 |
| JP | WO2017131172 | | * | 8/2017 ............... A01G 2/00 |
| KR | 20150061981 | A | | 6/2015 |
| WO | WO-2017104841 | A1 | | 6/2017 |
| WO | WO-2017130236 | A1 | | 8/2017 |
| WO | WO2017131172 | | * | 8/2017 ............... A01G 2/00 |
| WO | WO-2017131172 | A1 | | 8/2017 |

OTHER PUBLICATIONS

Chinese Notice of Allowance dated Dec. 1, 2021 for corresponding Chinese Application No. 201880076118.9.

* cited by examiner

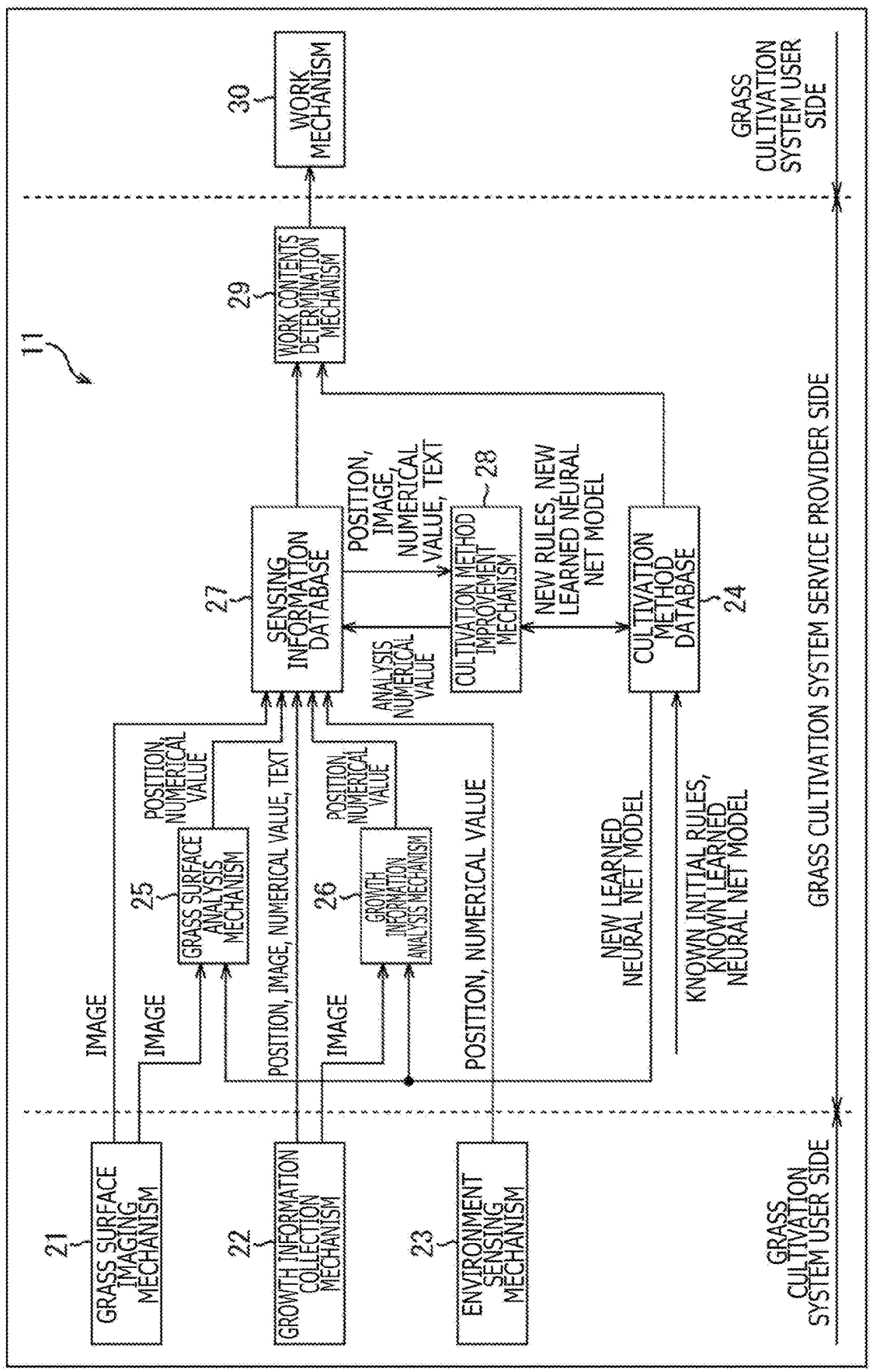
F I G. 1

FIG. 7

MEASUREMENT VALUE INPUT

MEASURING DATE  2017/06/21 – 13:25

MEASURING SPOT  BEFORE NORTH GOAL

MOWING WASTE AMOUNT  23Kg

IMAGE INPUT

CAPTURED PICTURE    GRASS ROOT ANALYSIS

ROOT LENGTH: 12

ROOT DENSITY: 4

SUBJECTIVE EVALUATION: 7
AUTOMATIC EVALUATION: 8

FIG. 22
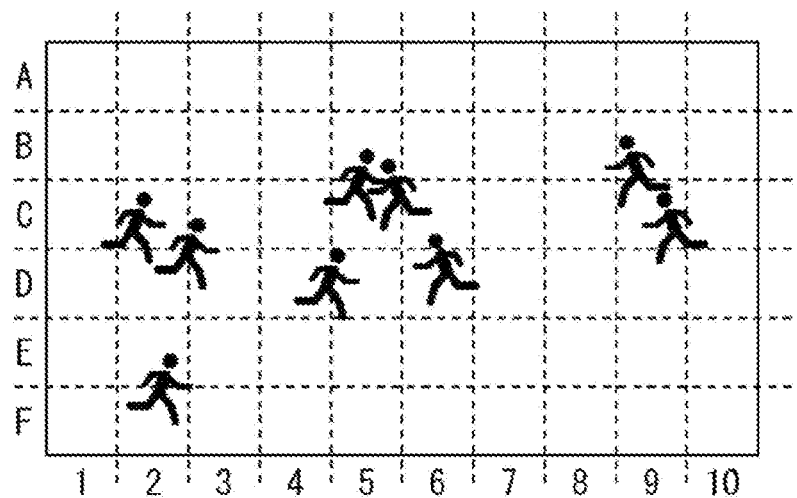
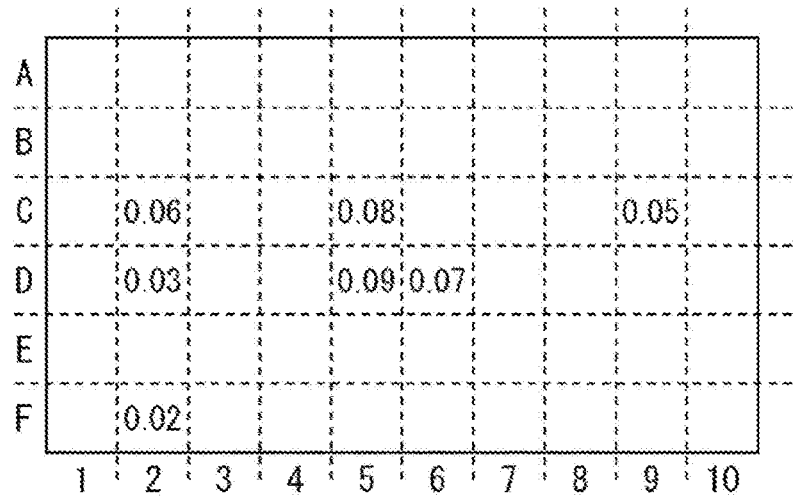

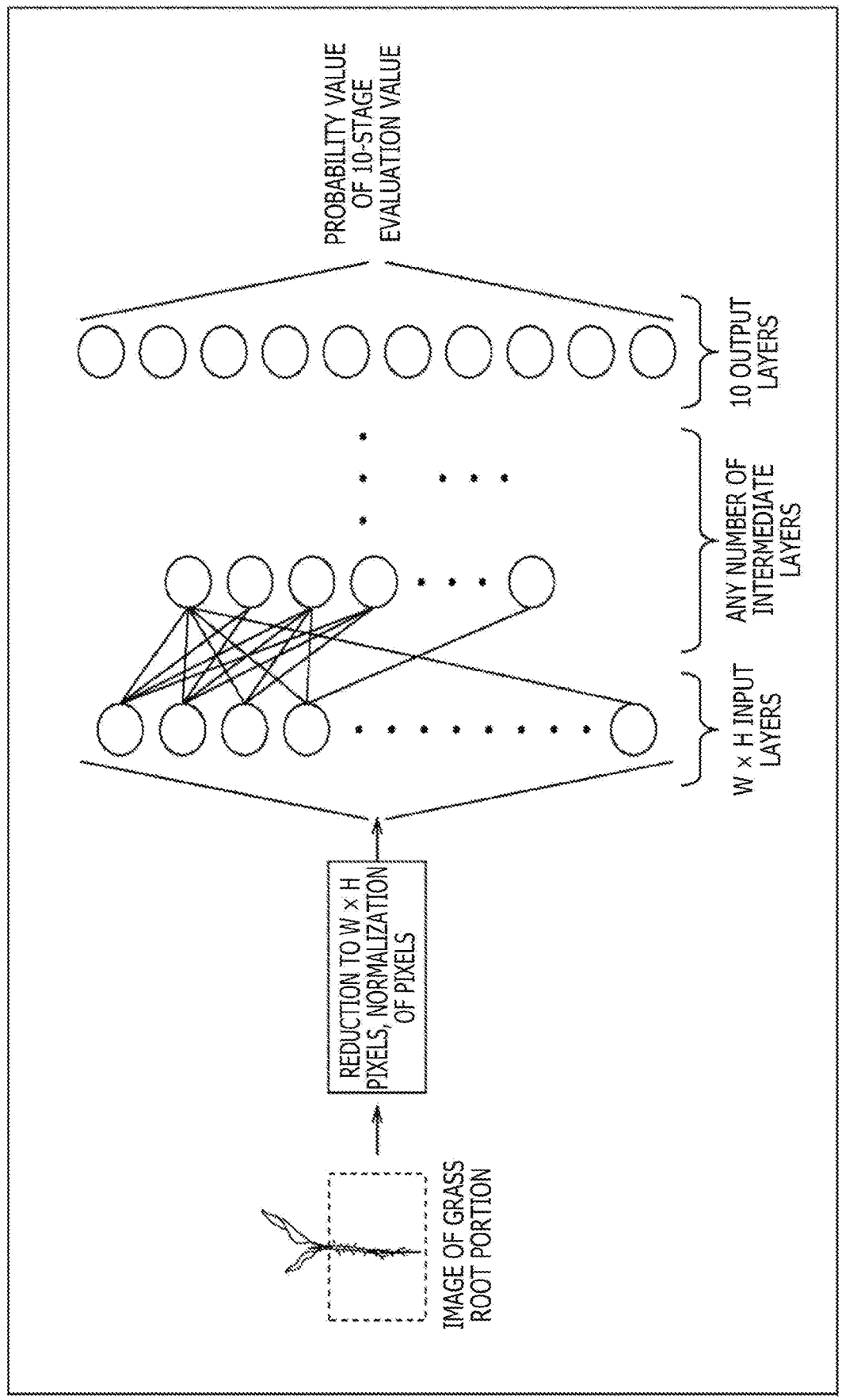

FIG. 32

FACILITY INFORMATION TABLE

| FACILITY NAME | TYPE | DISTRICT |
|---|---|---|
| aaa | SOCCER STADIUM | TOKYO |
| bbb | ROOFTOP GREENING | KUSHIRO |

METEOROLOGICAL INFORMATION TABLE

| DATE | TEMPERATURE | HUMIDITY | WIND SPEED | WIND DIRECTION |
|---|---|---|---|---|
| xxy | 23.1 | 63 | 3 | NW |
| xxz | 21.0 | 51 | 1 | E |

GRASS IMAGE ANALYSIS INFORMATION TABLE

| DATE | POSITION | GRASS LEAF COVERING RATIO | SOLAR RADIATION AMOUNT | TRAMPLING PRESSURE GRASS DAMAGE RATIO | HARMFUL ANIMAL GRASS DAMAGE RATIO |
|---|---|---|---|---|---|
| xxy | A2 | 90 | 2200 | 0 | 10 |
| xxz | E3 | 97 | 2310 | 80 | 30 |

ENVIRONMENT SENSING INFORMATION TABLE

| DATE | POSITION | SOIL TEMPERATURE | SOIL MOISTURE | SOIL HARDNESS | SOIL pH | SOIL EC | GRASS SURFACE TEMPERATURE |
|---|---|---|---|---|---|---|---|
| xyz | A2 | 28.1 | 18 | 1.8 | 5.4 | 0.34 | 38 |
| zyy | E3 | 27.9 | 15 | 1.9 | 6.3 | 0.22 | 42 |

GRASS GROWTH INFORMATION TABLE

| DATE | POSITION | GRASS LEAF HARDNESS | MOWING WASTE AMOUNT | GRASS ROOT LENGTH | GRASS ROOT THICKNESS | GRASS ROOT DENSITY | GRASS ROOT AUTOMATIC EVALUATION | GRASS ROOT SUBJECTIVE EVALUATION | NUMBER OF OCCURRENCE OF WEED | NUMBER OF OCCURRENCE OF DISEASE |
|---|---|---|---|---|---|---|---|---|---|---|
| xzy | A2 | 21 | 20 | 59 | 2 | 19 | 10 | 9 | 0 | 1 |
| yyz | B5 | 30 | 18 | 42 | 3 | 4 | 4 | 7 | 3 | 0 |

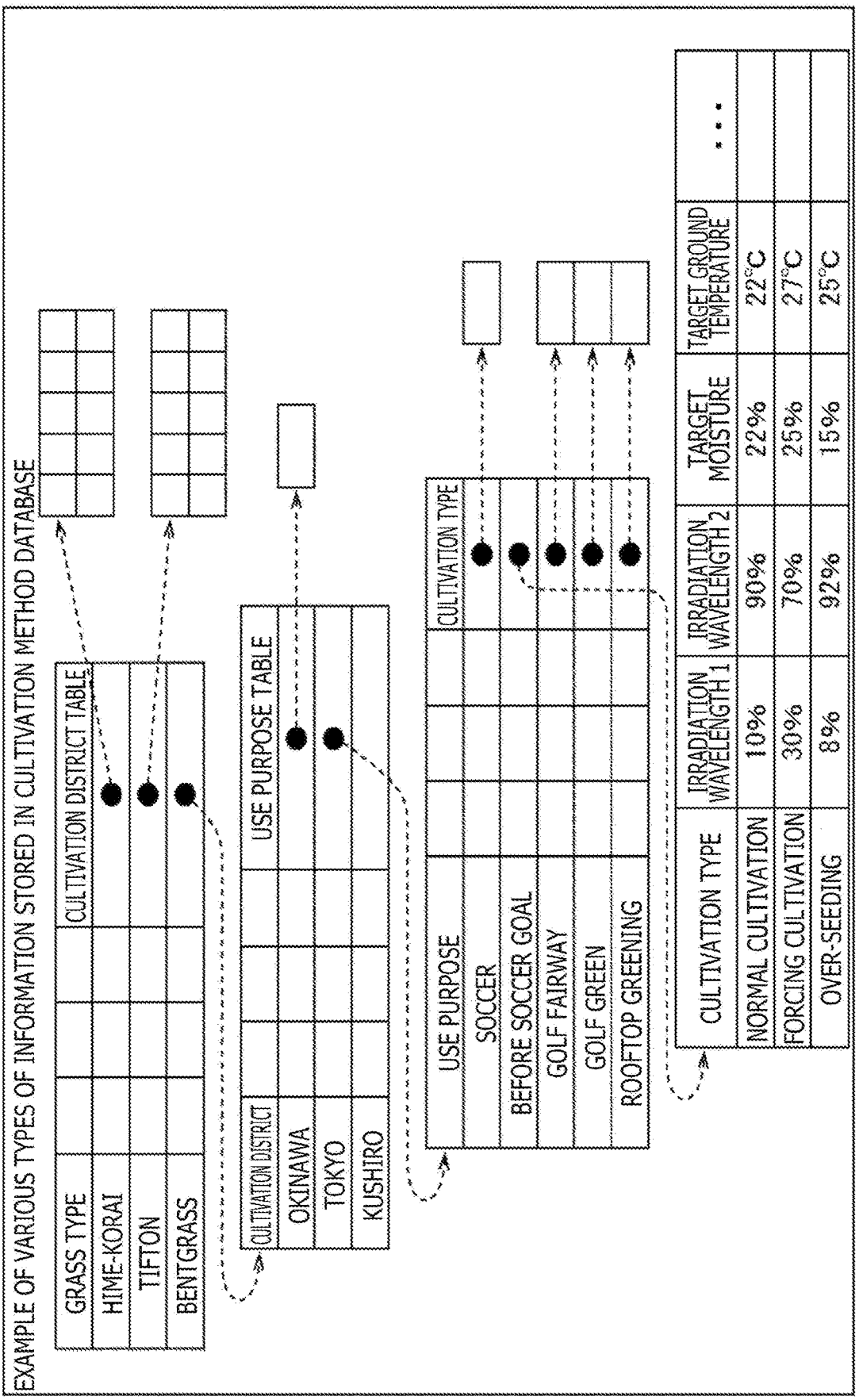

FIG. 34

EXAMPLE OF INITIAL RULES STORED IN CULTIVATION METHOD DATABASE
(MEANS CORRESPONDING TO GRASS LEAF COVERING RATIO)

| DISTRICT | USE PURPOSE | RULE |
|---|---|---|
| TOKYO | SOCCER | ● |
| OSAKA | RUGBY | |

| GRASS LEAF COVERING RATIO | CONTENTS | SUBSEQUENT CONDITION |
|---|---|---|
| 80% OR LOWER | ---- | ● |
| 81% — 90% | SET SOIL MOISTURE AMOUNT TO 27% | ● |
| 91% OR HIGHER | SET SOIL MOISTURE AMOUNT TO 22% | ---- |

| SOLAR RADIATION AMOUNT | CONTENTS | SUBSEQUENT CONDITION |
|---|---|---|
| 4000 OR SMALLER | IRRADIATE WITH LED | ---- |
| 4001 — 7000 | IRRADIATE WITH LED, DISTRIBUTE FERTILIZER XXX | ● |
| 7001 OR LARGER | ---- | ● |

| TRAMPLING PRESSURE GRASS DAMAGE RATIO | CONTENTS | SUBSEQUENT CONDITION |
|---|---|---|
| 50% OR LOWER | ---- | ● |
| 51% OR HIGHER | DISTRIBUTE FERTILIZER YYY | ---- |

| HARMFUL ANIMAL GRASS DAMAGE RATIO | CONTENTS | SUBSEQUENT CONDITION |
|---|---|---|
| 50% OR LOWER | GRASS RE-COVERING | ● |
| 51% OR HIGHER | DISTRIBUTE ANTI-BACTERIAL AGENT | ---- |

F I G. 3 5

LEARNING DATA AND TEACHER DATA OF NEURAL NETWORK

| ANALYSIS TARGET | LEARNING DATA | TEACHER DATA |
|---|---|---|
| TRAMPLING STRESS GRASS DAMAGE RATIO | VIDEO DURING GAME | (1-GRASS LEAF COVERING RATIO) IMMEDIATELY AFTER END OF GAME OR AFTER ELAPSE OF SEVERAL DAYS FROM END OF GAME |
| HARMFUL ANIMAL GRASS DAMAGE RATIO | VIDEO OF DAY WHEN NO GAME IS HELD | WEED OCCURRENCE RATIO AND DISEASE OCCURRENCE RATIO OF NEXT DAY OF GRASS SURFACE IMAGING OR AFTER ELAPSE OF SEVERAL DAYS FROM IMAGING |
| GRASS ROOT EVALUATION VALUE | PICTURE OF GRASS ROOT | GRASS ROOT EVALUATION VALUE OF SUBJECTIVE INPUT BY HUMAN |

F I G . 3 7

DEADLINE-BASED WORK LIST

| START TIME | EXECUTION CONTENTS |
|---|---|
| 17:30 | If INTEGRATED SOLAR RADIATION RATIO < 2500 then DETERMINE SUPPLEMENTARY RADIATION BY INQUIRY TO CULTIVATION METHOD DATABASE |
| EVERY WEEKEND 17:30 | If GRASS LEAF COVERING RATIO < 0.5 then DETERMINE FERTILIZATION BY INQUIRY TO CULTIVATION METHOD DATABASE |
| ... | ... |

FIG. 40

EVENT-BASED WORK LIST

| MONITORING EVENT | EXECUTION CONTENTS |
|---|---|
| TEMPERATURE > 30°C, HUMIDITY < 50% | DETERMINE WATERING TO ENTIRE GRASS SURFACE |
| GROUND TEMPERATURE > 28°C, SOIL MOISTURE < 10% | DETERMINE WATERING AMOUNT FOR EACH REGION BY INQUIRY TO CULTIVATION DATABASE |
| ... | ... |

INFORMATION PROCESSING APPARATUS, INFORMATION PROCESSING METHOD, AND VEGETATION MANAGEMENT SYSTEM

TECHNICAL FIELD

The present disclosure relates to an information processing apparatus, an information processing method, and a vegetation management system and particularly to an information processing apparatus, an information processing method, and a vegetation management system each capable of managing vegetation in such a manner as to maintain a high quality state and achieve uniform growth.

BACKGROUND ART

Generally, there exist a large number of facilities requiring natural grass, such as sport stadiums where soccer, golf, rugby, and other various types of sporting events are held, and parks, rooftops, and wall greening environments. For example, natural grass used in sporting events offers such an advantage that a physical burden imposed on leg and back muscles of players can be reduced during games. Moreover, natural grass can raise values of facilities by providing more excellent landscapes in comparison with artificial grass. Meanwhile, for raising values of facilities using natural grass, management needs to be fulfilled in such a manner as to maintain an evergreen state of a grass surface throughout the year and achieve uniform growth of the grass surface.

Accordingly, as disclosed in PTL 1, there has been proposed a natural grass cultivation lighting apparatus which includes a light source for emitting red light and blue light having predetermined wavelengths to irradiate natural grass located at a specific position with light from light emission elements and to thereby achieve growth promotion and restoration of the natural grass.

Moreover, as disclosed in PTL 2, there has been proposed a movable natural grass cultivation lighting apparatus which achieves reduction of a storage space at the time of storage and facilitates moving work so as to be usable for maintenance and management of natural grass.

Furthermore, PTL 3 discloses a natural grass structure management system capable of extracting maintenance work information necessary for a natural grass structure usable for indoor facilities as well so that cultivation management required for the natural grass structure on a daily basis is facilitated.

As apparent from above, rapid restoration of grass has conventionally been sought by supplementing sunlight insufficiency resulting from an influence of shadows produced by the weather, the presence of facilities, or the like or by irradiating a damaged spot of the grass with light.

CITATION LIST

Patent Literature

[PTL 1]
  JP 2012-228231 A
[PTL 2]
  JP 2016-52299 A
[PTL 3]
  JP 2005-253415 A

SUMMARY

Technical Problems

Meanwhile, the technologies disclosed in the pieces of patent literature specified above each have such a configuration that a position to be irradiated with light and an irradiation time are determined by a user using the apparatus, the system, or the like. It is therefore difficult to fulfill management in such a manner that a high quality state sufficient for producing an evergreen condition of a grass surface throughout the year is maintained and uniform growth sufficient for producing an equalized grass surface is achieved.

The present disclosure has been developed in consideration of the aforementioned circumstances and fulfills management of vegetation in such a manner as to maintain a high quality state and achieve uniform growth.

Solution to Problems

An information processing apparatus according to one aspect of the present disclosure includes an analysis unit that analyzes, as at least input information, an image in which vegetation corresponding to a target of management is captured and a determination unit that determines work contents to be performed for the vegetation, according to an analysis result output from the analysis unit.

An information processing method according to one aspect of the present disclosure includes analyzing, as at least input information, an image in which vegetation corresponding to a target of management is captured and determining work contents to be performed for the vegetation, according to an analysis result output by the analysis.

A vegetation management system according to one aspect of the present disclosure includes an information processing apparatus that includes an image acquiring apparatus that acquires an image in which vegetation corresponding to a target of management is captured, an analysis unit that analyzes, as at least input information, an image acquired by the image acquiring apparatus, and a determination unit that determines work contents to be performed for the vegetation, according to an analysis result output from the analysis unit, and a work apparatus that performs a process for executing work for the vegetation according to the work contents determined by the determination unit.

According to one aspect of the present disclosure, an image in which vegetation corresponding to a target of management is captured is analyzed as at least input information. Work contents to be performed for the vegetation are determined according to an analysis result output from the analysis.

Advantageous Effect of Invention

According to one aspect of the present disclosure, management of vegetation can be fulfilled in such a manner as to maintain a high quality state and achieve uniform growth.

Note that advantageous effects to be offered are not necessarily limited to the advantageous effect described herein and may be any advantageous effects described in the present disclosure.

BRIEF DESCRIPTION OF DRAWINGS

FIG. 1 is a block diagram depicting a configuration example of a grass management system according to one embodiment to which the present technology is applied.

FIG. 7 is a diagram depicting an example of a growth information input screen.

FIG. 22 is a diagram explaining a calculation method of a trampling pressure grass damage ratio.

FIG. 31 is a diagram explaining growth information analysis using the neural network model.

FIG. 32 is a diagram depicting an example of tables stored in a sensing information database.

FIG. 33 is a diagram depicting an example of various types of information stored in a cultivation method database.

FIG. 34 is a diagram depicting an example of initial rules stored in the cultivation method database.

FIG. 35 is a diagram depicting an example of learning data and teacher data of the neural network model.

FIG. 37 is a diagram depicting an example of a deadline-based work list.

FIG. 40 is a diagram depicting an example of an event-based work list.

DESCRIPTION OF EMBODIMENT

<Grass Management System>

Figure 2:
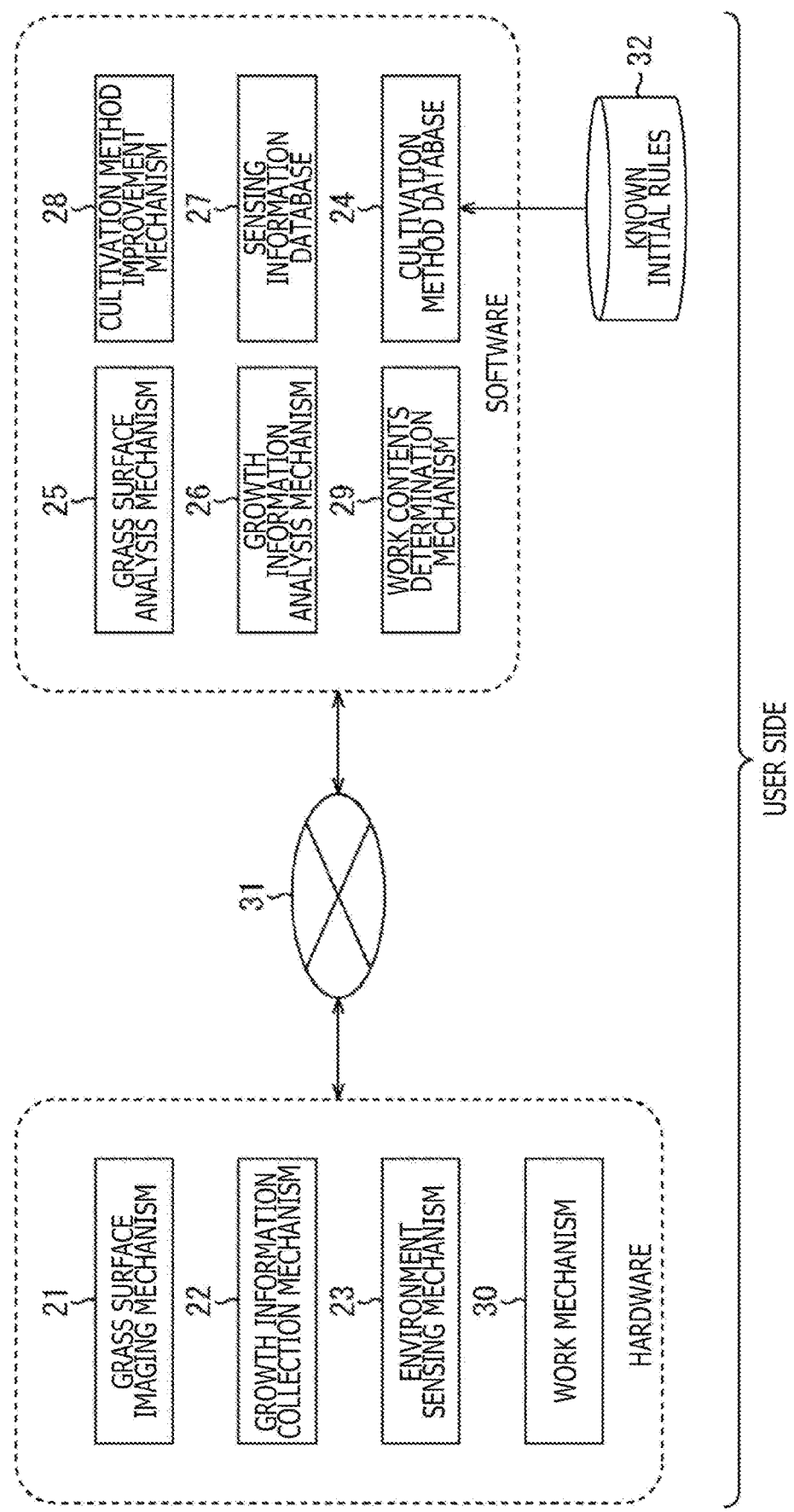
FIG. 2 is a block diagram depicting a first arrangement example of components constituting the grass management system.

Before describing a specific embodiment to which the present technology is applied, a background requiring a grass management system will first be explained.

For example, growth of natural grass is influenced by natural conditions such as sunlight, air temperature, and moisture similarly to other plants, and therefore grass management work needs to be fulfilled by dealing with meteorological conditions changeable every day. Accordingly, for constantly maintaining high quality of a grass surface, advanced cultivation knowledge based on long-term experiences is indispensable.

Moreover, grass grows outdoors by performing photosynthesis which uses sunlight. However, in facilities such as stadiums using grass, a structure such as audience seats and illuminations becomes a light shield, and produces such a situation where uniform sunlight does not reach a grass surface. This situation causes irregular growth of the grass, and therefore, insufficiency of sunlight is supplemented by an artificial sunlight irradiation apparatus, fertilization, or the like. A range and an amount of this supplement are determined on the basis of experiences.

Moreover, there is PPFD (photosynthetic photon flux density) which defines a light amount used for photosynthesis in light contained in sunlight. PPFD represents light amount photon flux density contained in a wavelength range from 400 to 700 nm which is a wavelength range absorbable by chlorophylls of plants. For example, for measuring PPFD, equipment of an optical bandpass filter and correction of sensitivity characteristics of a light receiving unit are needed. In this case, a relatively expensive dedicated sensor is required. Moreover, this measurement is measurement in a representative narrow two-dimensional range where the sensor is equipped. Accordingly, a large number of sensors need to be equipped to measure PPFD at respective spots of a wide grass surface.

Furthermore, there is NDVI (Normalized Difference Vegetation Index: vegetation index) as an index for quantitatively determining a growth state of a plant obtained as a result of photosynthesis. NDVI is calculated as an index indicating information associated with activity of a plant and obtained by optical spectrum analysis of light reflected on leaves.

For example, an apparatus for measuring NDVI already exists and is widely used as an apparatus which quantifies a state of grass leaves that is difficult to determine with the naked eye. A conventional apparatus for measuring NDVI is provided as handy equipment and is capable of recording NDVI at any spot together with position coordinates in response to a mere press of a button after the apparatus is shifted to the corresponding spot and then installed on the grass surface. However, for measuring a grass surface of a wide stadium using this apparatus, the actions of shift and measurement need to be repeated. In this case, efficient data collection becomes difficult.

Accordingly, there exists remote sensing as a technology for measuring NDVI in a wide range. In remote sensing, a field where plants are cultivated is imaged at a long altitude in an overlooking manner using an airplane or an artificial satellite. This technology is influenced by dusts, water vapors, and clouds lying midway in a case where a distance between an observation surface and a camera is long. In this case, accurate measurement may be difficult to achieve.

Moreover, remote sensing has such an advantage that wide-range imaging is achievable at a time, but a captured image has a rough resolution of several square meters. Accordingly, remote sensing is not a suitable method for recognizing details of a state of grass growing only in such an area as an area of a pitch surface within a soccer stadium and an area within green of a golf course, for example. Furthermore, considering an orbit of a satellite and running cost, the number of times of imaging allowed for one day is extremely limited. It is therefore difficult to compare a change in NDVI of grass after a game is held in a stadium, for example.

Meanwhile, a sensor measuring a ground temperature or a moisture amount is often installed into the ground at the time of construction of a facility as a sensor built in the ground beforehand to analyze or determine a growth state of grass, for example, as a method other than the methods of measuring PPFD and NDVI as described above. However, measurement at a spot different from the spot of the sensor at the time of construction, or replacement with a latest sensor appearing with technological progress, for example, is often difficult to carry out in view of cost. Accordingly, a sensor which is inexpensive and easily built and removed and also capable of observing a state of a grass surface or inside soil in real time has been demanded.

Furthermore, in facility management, it is important to rapidly restore grass damaged by various events having been held, to increase an operating rate of a facility.

In the background described above, there has been a demand for a grass management system capable of fulfilling management in such a manner as to maintain a high quality state sufficient for producing an evergreen condition of a grass surface throughout the year and achieve uniform growth sufficient for producing an equalized grass surface.

A specific embodiment to which the present technology is applied will hereinafter be described in detail with reference to the drawings.

<Configuration Example of Grass Management System>

FIG. 1 is a block diagram depicting a configuration example of a grass management system according to one embodiment to which the present technology is applied. In addition, while a configuration of the grass management system to which the present technology is applied will hereinafter be described, the present technology is not limited to the grass management system. More specifically, the present technology is applicable to a management system for vegetation requiring management in such a manner as to maintain a high quality state and achieve uniform growth, such as parks, rooftops, and wall greening environments, for example.

A grass management system 11 in FIG. 1 includes a grass surface imaging mechanism 21, a growth information collection mechanism 22, an environment sensing mechanism 23, a cultivation method database 24, a grass surface analysis mechanism 25, a growth information analysis mechanism 26, a sensing information database 27, a cultivation method improvement mechanism 28, a work contents determination mechanism 29, and a work mechanism 30.

In addition, each of the grass surface imaging mechanism 21, the growth information collection mechanism 22, the environment sensing mechanism 23, and the work mechanism 30 among the respective components constituting the grass management system 11 is provided as hardware such as various types of sensors and work apparatuses. On the other hand, each of the cultivation method database 24, the grass surface analysis mechanism 25, the growth information analysis mechanism 26, the sensing information database 27, the cultivation method improvement mechanism 28, and the work contents determination mechanism 29 is provided as software executed by an information processing apparatus.

For example, the components included in the grass management system 11 and provided as hardware are disposed on the side of a user using the grass management system 11, while the components included in the grass management system 11 and provided as software are disposed on the side of a service provider operating the grass management system 11. Note that the arrangement of the respective components constituting the grass management system 11 are not limited to the arrangement example depicted in FIG. 1. Various arrangement examples are adoptable as the arrangement of the respective components as described below with reference to FIGS. 2 to 4.

The grass surface imaging mechanism 21 includes a camera (e.g., camera 41 in FIG. 6) which captures an image of a grass surface as a target of management and supplies an acquired image to the grass surface analysis mechanism 25 and the sensing information database 27.

The growth information collection mechanism 22 includes a terminal (e.g., personal computer 43 and tablet type computer 45 in FIG. 6) used by the user using the grass management system 11 to input growth information. For example, the growth information collection mechanism 22 supplies a measuring date, a measuring position, measuring contents (numerical values or text), an image, and the like described below to the sensing information database 27, as growth information input from the user.

The environment sensing mechanism 23 includes various sensors (e.g., sensors 51 in FIG. 9) for collecting growth information associated with the grass surface. For example, the environment sensing mechanism 23 obtains sensor information by sensing an environment of the grass surface using the sensors and supplies the sensor information to the sensing information database 27 in association with positions of the sensors that obtained the sensor information.

For example, the cultivation method database 24 is capable of reading out a known learning model from an external storage apparatus and storing the learning model. While rules and a neural network model are adopted as an example of the learning model in the following description, the learning model is not particularly limited to these. Besides, the cultivation method database 24 is capable of storing a new learning model (e.g., new rules or new learned neural network model) improved by the cultivation method improvement mechanism 28.

The grass surface analysis mechanism 25 analyzes a grass surface appearing in an image supplied from the grass surface imaging mechanism 21, for example, by using the image as at least input information and outputs vegetation indexes such as a grass leaf covering ratio, a trampling pressure grass damage ratio, and a harmful animal grass damage ratio described below, as an analysis result. Thereafter, the grass surface analysis mechanism 25 supplies, to the sensing information database 27, an analysis result (numerical value) for each of divisional regions produced by dividing the grass surface into plural regions, for example, in association with the position of the divisional region where the corresponding analysis result is obtained. In addition, the grass surface analysis mechanism 25 may output an analysis result obtained by an input to a learned neural network model read out from the cultivation method database 24 by using the image supplied from the grass surface imaging mechanism 21 as at least input information.

The growth information analysis mechanism 26 analyzes grass roots appearing in an image supplied from the growth information collection mechanism 22, for example, by using the image as at least input information and outputs lengths and density of the grass roots described below, as an analysis result. Thereafter, the grass surface analysis mechanism 25 supplies, to the sensing information database 27, an analysis result (numerical value) of the grass roots in association with the position of the spot where the grass roots grow, for example. In addition, the growth information analysis mechanism 26 may output an analysis result obtained by an input to a learned neural network model read out from the cultivation method database 24, by using the image supplied from the grass surface imaging mechanism 21, as at least input information.

The sensing information database 27 stores the image supplied from the grass surface imaging mechanism 21, the growth information supplied from the growth information collection mechanism 22, the analysis results supplied from the grass surface analysis mechanism 25 and the growth information analysis mechanism 26, the sensor information supplied from the environment sensing mechanism 23, and others.

The cultivation method improvement mechanism 28 discovers new rules associated with cultivation and management of grass and performs learning using a neural network model on the basis of various kinds of information (e.g., positions, images, numerical values, and text) stored in the sensing information database 27. Moreover, the cultivation method improvement mechanism 28 stores numerical values analyzed by new rules or new learning in the sensing information database 27 and stores the new rules or the new learned neural network model in the cultivation method database 24.

The work contents determination mechanism 29 determines work contents to be performed for the grass surface according to various kinds of information stored in the sensing information database 27 and the cultivation method database 24, outputs information associated with the work contents to the work mechanism 30, and causes the work mechanism 30 to execute the work contents.

The work mechanism 30 includes various apparatuses explained below with reference to FIGS. 42 to 46 and performs a process for executing work contents determined by the work contents determination mechanism 29.

The grass management system 11 configured as described above is capable of fulfilling management in such a manner as to maintain a high quality state sufficient for producing an evergreen condition of a grass surface throughout the year and achieve uniform growth sufficient for producing an equalized grass surface.

<Arrangement Example of Components Constituting Grass Management System>

Another arrangement example of components constituting the grass management system 11 will be described with reference to FIGS. 2 to 4.

According to a grass management system 11a depicted in FIG. 2, all components, i.e., the grass surface imaging mechanism 21, the growth information collection mechanism 22, the environment sensing mechanism 23, the cultivation method database 24, the grass surface analysis mechanism 25, the growth information analysis mechanism 26, the sensing information database 27, the cultivation method improvement mechanism 28, the work contents determination mechanism 29, and the work mechanism 30, are disposed on the user side.

In addition, in the grass management system 11a, components each provided as hardware and components each provided as software are connected to each other via a network 31 used only in a closed environment, such as an intranet, for example. Moreover, in the grass management system 11a, a storage apparatus 32 storing known initial rules is connected to the cultivation method database 24.

As described above, the grass management system 11a is allowed to adopt the arrangement example in which all of the components constituting the grass management system 11a are arranged on the user side.

Figure 3:
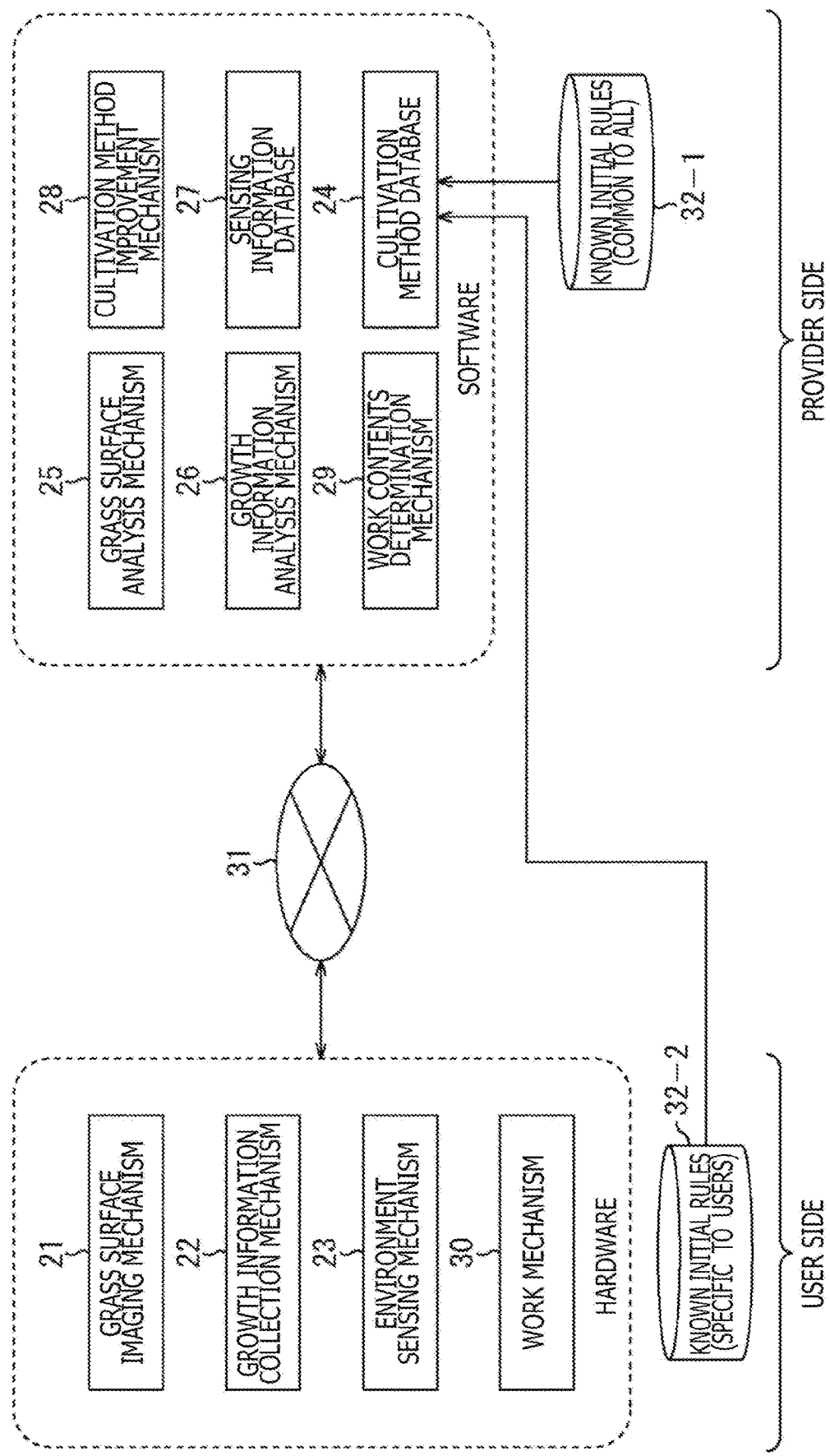
FIG. 3 is a block diagram depicting a second arrangement example of components constituting the grass management system.

In a grass management system 11b depicted in FIG. 3, the grass surface imaging mechanism 21, the growth information collection mechanism 22, the environment sensing mechanism 23, and the work mechanism 30 are disposed on the user side. On the other hand, the cultivation method database 24, the grass surface analysis mechanism 25, the growth information analysis mechanism 26, the sensing information database 27, the cultivation method improvement mechanism 28, and the work contents determination mechanism 29 are disposed on the provider side.

In addition, in the grass management system 11b, the components disposed on the user side and the components disposed on the provider side are connected to each other via the network 31 including the Internet or a private network, for example. Moreover, in the grass management system 11b, the storage apparatus 32 storing known initial rules includes a storage apparatus 32-1 storing rules common to all of various users and disposed on the provider side and a storage apparatus 32-2 storing rules each specific to an individual user and disposed on the user side.

As described above, the grass management system 11b is allowed to adopt the arrangement example in which the components provided as software are not arranged on the user side. For example, the grass management system 11b is allowed to be constructed such that the components provided as software are distributed (in the form of what is generally called cloud computing) using a plurality of information processing apparatuses connected in a network.

Figure 4:
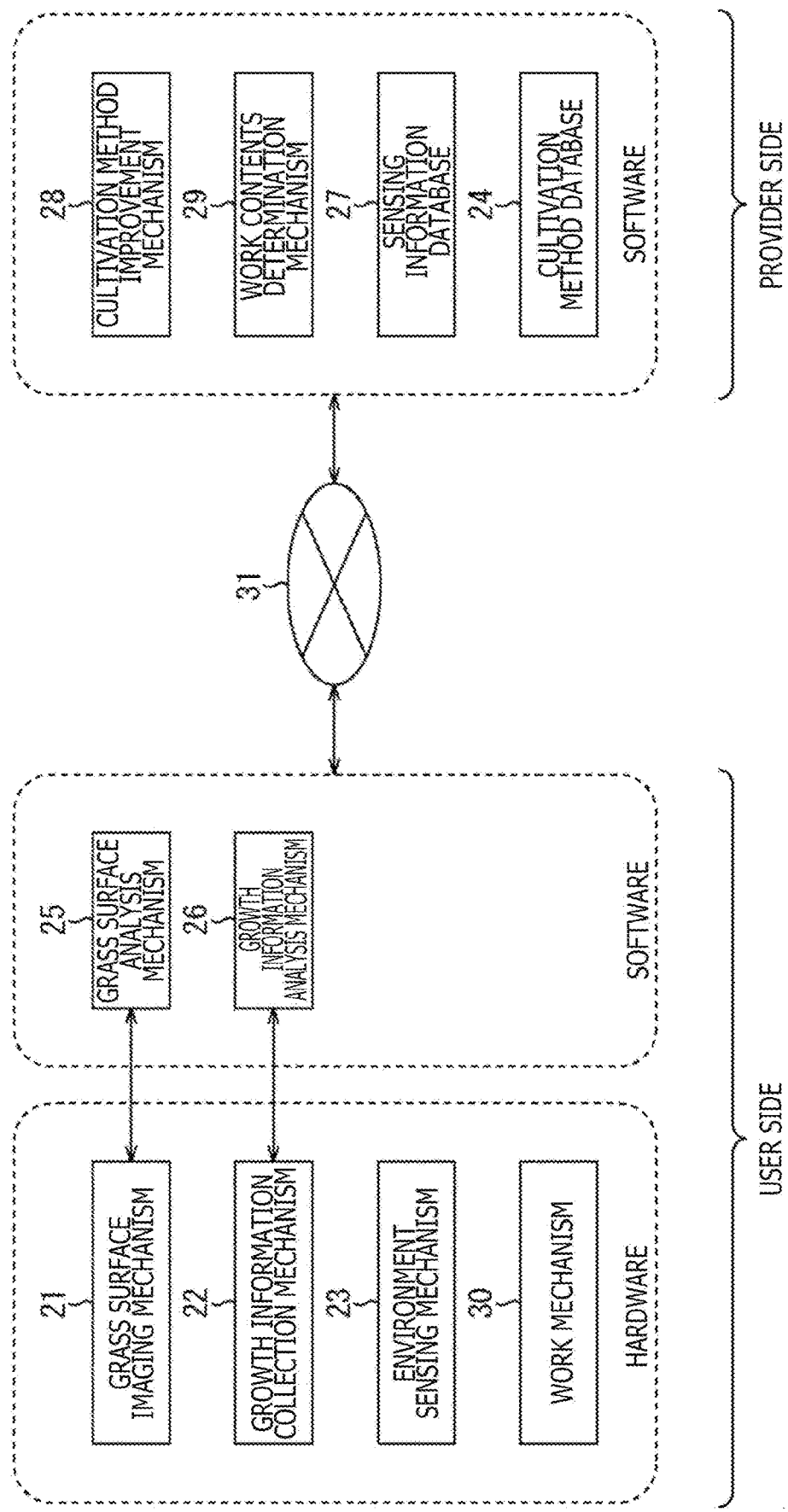
FIG. 4 is a block diagram depicting a third arrangement example of components constituting the grass management system.

In a grass management system 11c in FIG. 4, the grass surface imaging mechanism 21, the growth information collection mechanism 22, the environment sensing mechanism 23, the grass surface analysis mechanism 25, the growth information analysis mechanism 26, and the work mechanism 30 are disposed on the user side. On the other hand, the cultivation method database 24, the sensing information database 27, the cultivation method improvement mechanism 28, and the work contents determination mechanism 29 are disposed on the provider side.

In addition, in the grass management system 11c, the components disposed on the user side and the components disposed on the provider side are connected to each other via the network 31 including the Internet or a private network, for example.

With the grass management system 11c having this configuration, processes can be shared by the user and the provider, and a network traffic can be reduced. Moreover, with the grass management system 11c, a processing load imposed on the provider can be reduced to cope with an increase in the number of users, for example.

As described above, the grass management system 11 is allowed to adopt the arrangement examples explained with reference to FIGS. 2 to 4 and is naturally allowed to adopt other arrangement examples. For example, in the grass management system 11, the cultivation method database 24 and the cultivation method improvement mechanism 28 may be disposed on the provider side to use the cultivation method database 24 and the cultivation method improvement mechanism 28 as resources common to users using the grass management system 11. In this manner, more efficient services can be provided.

<Grass Management Process by Grass Management System>

Figure 5:
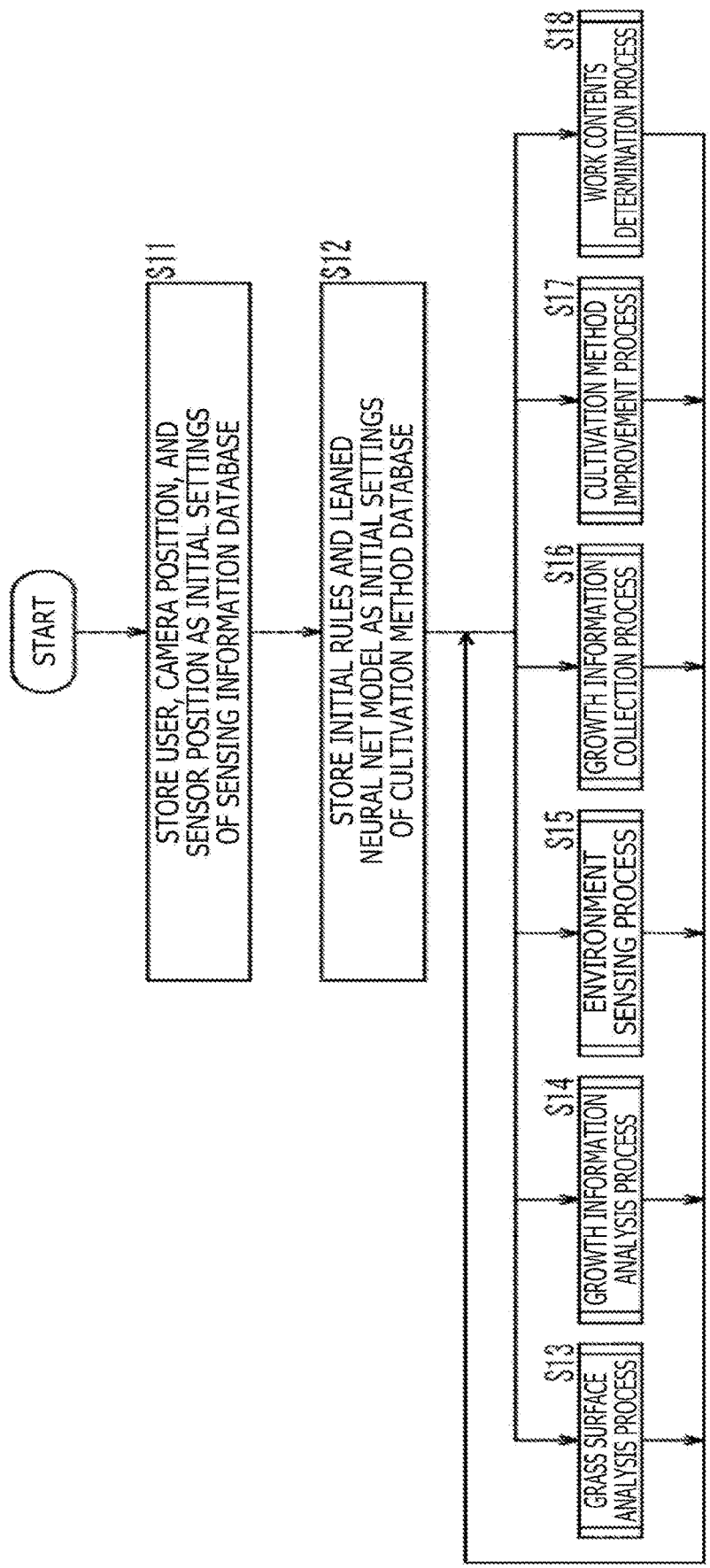
FIG. 5 is a flowchart explaining a grass management process.

A grass management process executed by the grass management system 11 will be explained with reference to a flowchart depicted in FIG. 5.

For example, a process is performed in response to a start of grass management by the grass management system 11. In step S11, initial settings are input to the sensing information database 27. For example, as initial settings, an ID and mapping information indicating a positional relation in arrangement are stored in the sensing information database 27 for each of a facility (user) using the grass management system 11 and a sensor group such as a camera used in the corresponding facility.

In step S12, initial settings are input to the cultivation method database 24 to produce a state usable by the user. For example, as initial settings, basic rules concerning grass cultivation and a learned neural network model used by the grass surface analysis mechanism 25 and the growth information analysis mechanism 26 are stored in the cultivation method database 24.

Subsequently, after completion of the process in step S12, processes from step S13 to S18 are allowed to be sequentially executed in parallel at necessary timing for each.

Note that a grass surface analysis process in step S13 will be described below with reference to flowcharts in FIGS. 18, 20, 21, 23, and 24. In addition, a growth information analysis process in step S14 will be described below with reference to a flowchart in FIG. 30. Similarly, an environment sensing process in step S15 will be described below with reference to flowcharts in FIGS. 15 and 16, while a growth information collection process in step S16 will be described below with reference to a flowchart in FIG. 8. Furthermore, a cultivation method improvement process in step S17 will be explained with reference to a configuration example of the cultivation method improvement mechanism 28 described below, while a work contents determination process in step S18 will be explained with reference to a configuration example of the work contents determination mechanism 29 described below.

As described above, the grass management system 11 is capable of managing grass by inputting initial settings in steps S11 and S12, and then performing the processes from step S13 to step S18 as necessary in an appropriate manner. In this manner, the grass management system 11 can fulfill management in such a manner as to maintain a high quality state sufficient for producing an evergreen condition of a grass surface throughout the year and achieve uniform growth sufficient for producing an equalized grass surface, for example.

<Configuration Example of Grass Surface Imaging Mechanism>

The grass surface imaging mechanism 21 includes a camera capable of capturing an image in a wavelength band of at least visible light. For example, the camera included in the grass surface imaging mechanism 21 is disposed in such a position as to overlook the grass surface and is capable of acquiring, as image information, a state of an entire field where the grass grows.

Note that the grass surface imaging mechanism 21 preferably includes a camera capable of capturing a moving image as well as a still image. Moreover, the grass surface imaging mechanism 21 preferably includes a camera capable of acquiring NDVI described above, such as a camera capable of measuring a vegetation index of grass by acquiring an image in a narrow bandwidth of approximately 10 nm around any wavelength in each of wavelength ranges of visible light and near infrared light. Furthermore, the grass surface imaging mechanism 21 preferably includes a camera capable of measuring a temperature of the grass surface by imaging a far infrared range, such as a camera capable of capturing an image in a far infrared wavelength band to measure a surface temperature of a field.

Figure 6:
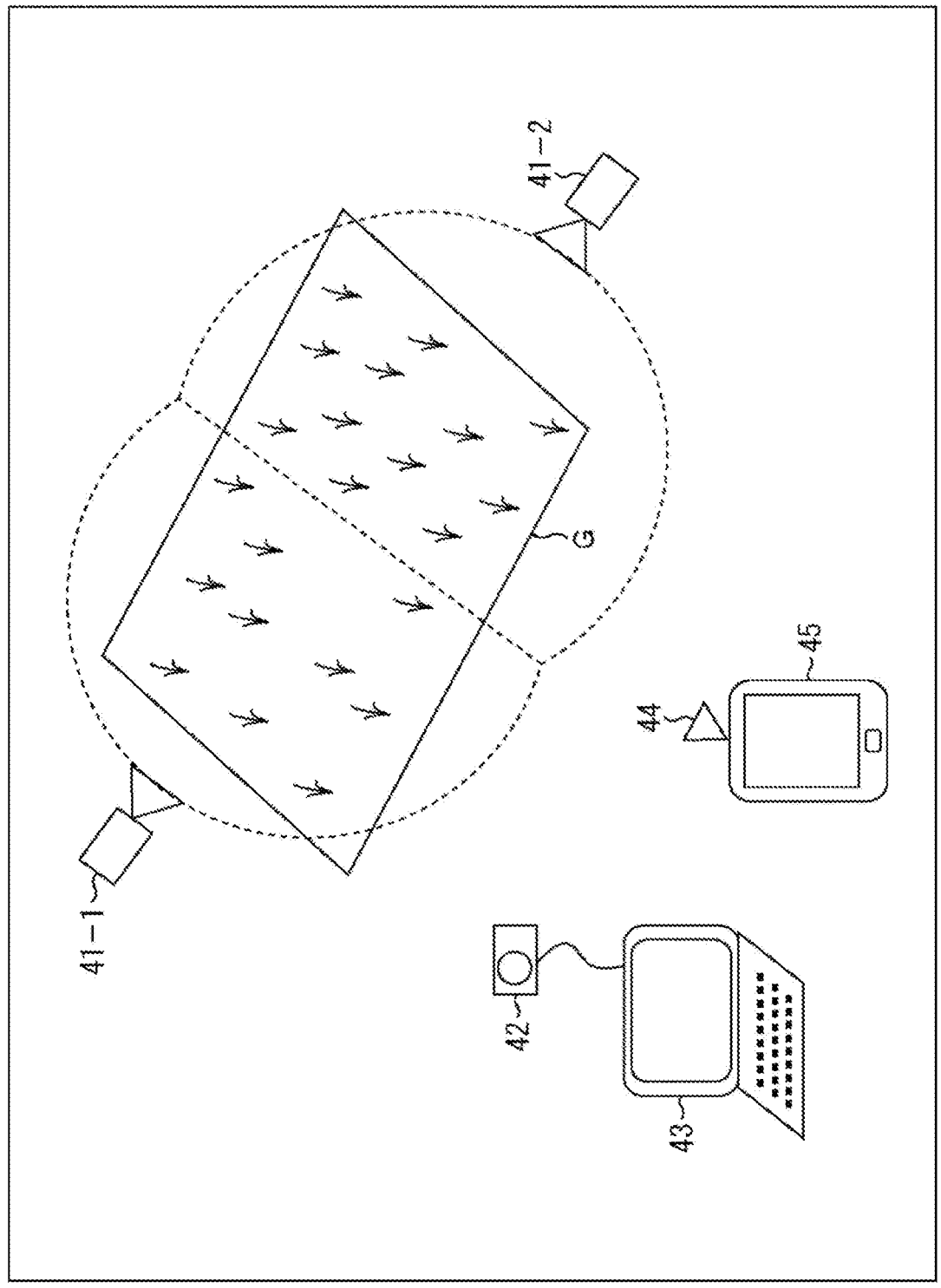
FIG. 6 is a diagram depicting an example of an arrangement of two cameras with respect to a grass surface and terminals each used as a growth information collection mechanism.

In addition, the grass surface imaging mechanism 21 is only required to have at least one camera and may include plural cameras, i.e., two or more cameras, so as to simultaneously acquire images of the grass surface in a wide range, for example. As depicted in FIG. 6, for example, it is preferable to divide a grass surface G into two imaging ranges by using two cameras 41-1 and 41-2 and capture an entire image of the grass surface G in such a manner that resolution of a far grass surface as viewed from each of the cameras 41-1 and 41-2 is not lowered.

Moreover, the grass surface imaging mechanism 21 may capture plural images by using panning for changing the direction of the camera, a zooming mechanism for changing an angle of view of the camera, or the like and connecting the images by postprocessing to acquire an image overlooking the entire grass surface. Furthermore, the grass surface imaging mechanism 21 is preferably capable of acquiring information from the camera as RAW data. Besides, the grass surface imaging mechanism 21 may acquire data compressed by JPEG (Joint Photographic Experts Group), H.264, or the like, for example, as long as precise expression of green of the grass is achievable.

In addition, the grass surface imaging mechanism 21 preferably uses a camera which has a fixed position so as to easily specify a position where an image is captured. Besides, the grass surface imaging mechanism 21 may use a camera equipped on a compact unmanned aerial vehicle (what is generally called a drone). In this case, a mapping process which matches an image and an actual position of the grass by postprocessing is performed.

Note that the grass surface imaging mechanism 21 is provided on an assumption that images are acquired on a 24-hour and 365-day period basis, for example, but is allowed to control a balance between an information volume and accuracy by changing imaging intervals according to processing contents for acquiring necessary information.

<Configuration Example of Growth Information Collection Mechanism>

For example, the growth information collection mechanism 22 collects growth information based on an input from the user using the grass management system 11, to collect growth information that is not acquired by using the grass surface imaging mechanism 21 or the environment sensing mechanism 23. For example, the growth information collection mechanism 22 is capable of collecting growth information difficult to acquire by the grass surface imaging mechanism 21 or the environment sensing mechanism 23 and growth information which is not an image and is expensive to acquire by the grass surface imaging mechanism 21 or the environment sensing mechanism 23.

Specifically, the growth information collection mechanism 22 collects various types of growth information obtained by measuring hardness of grass leaves, a mowing waste amount of grass leaves, lengths of grass roots, thicknesses of grass roots, density of grass roots, soil hardness including grass roots, occurrence of weeds or diseases, and the like and also a state of the grass surface, on the basis of the input from the user. Moreover, the growth information collection mechanism 22 is capable of collecting work information associated with a future growth state of the grass, such as a component and an amount of a fertilizer distributed to the grass surface and a position and a use period of a sheet provided to cure the grass, on the basis of the input from the user.

Furthermore, as depicted in FIG. 6, a stationary terminal such as a personal computer 43 to which a camera 42 is connected, a mobile terminal such as a tablet type computer 45 including a built-in camera 44, and the like are available as the growth information collection mechanism 22. In addition, the growth information collection mechanism 22 is allowed to acquire a closeup image of a state of the grass leaves, the roots, or the like by using the camera 42 or the camera 44, as growth information. For example, the user of the grass management system 11 is allowed to input growth information at a management site, an office, or other places by using the growth information collection mechanism 22 such as the personal computer 43 and the tablet type computer 45.

FIG. 7 depicts an example of a growth information input screen displayed on a display apparatus included in the growth information collection mechanism 22.

As depicted in FIG. 7, the growth information collection mechanism 22 is allowed to receive inputs of at least a measuring date, a measuring spot, and measuring contents by using a growth information input screen and is allowed to receive an input of a mowing waste amount as measuring contents in the example depicted in FIG. 7. Moreover, the growth information collection mechanism 22 is allowed to directly receive an input of measurement values or the like from the user and also display, in the growth information input screen, numerical values obtained as a result of image analysis of a captured image of an object by using the growth information analysis mechanism 26 (root length, root density, or the like in the example of FIG. 7). Furthermore, the growth information collection mechanism 22 is allowed to receive an input of a subjective evaluation value (subjective evaluation depicted in FIG. 7) given by an experienced person managing the grass, as a total evaluation of the grass roots, by using the growth information input screen. Note that this subjective evaluation value is allowed to be used as teacher data for automatically obtaining an evaluation value (automatic evaluation depicted in FIG. 7) from a captured image later.

Figure 8:
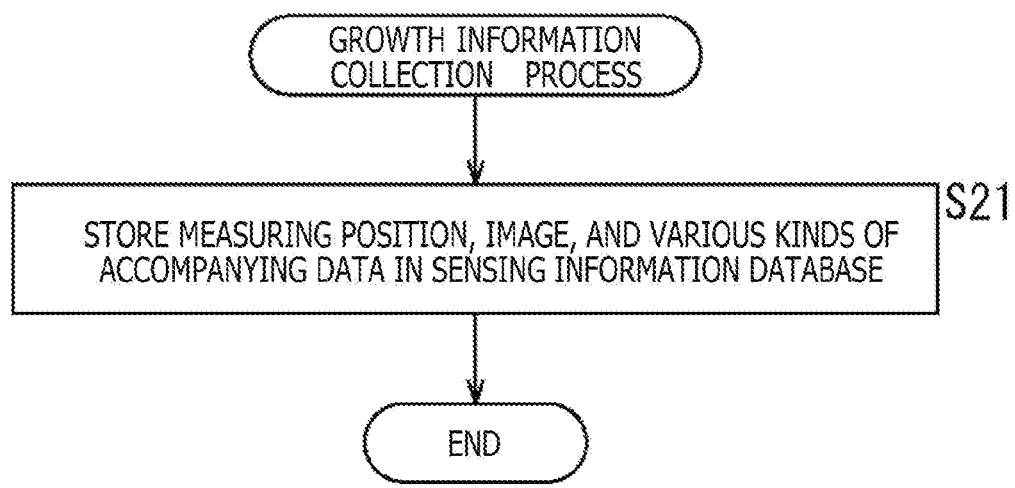
FIG. 8 is a flowchart explaining a growth information collection process.

A growth information collection process performed by the growth information collection mechanism 22 will be explained with reference to a flowchart depicted in FIG. 8. For example, the growth information collection process is performed in step S16 in FIG. 5 described above.

In step S21, the growth information collection mechanism 22 displays the growth information input screen depicted in FIG. 7 on the display apparatus and acquires growth information input by the user using an input means such as a keyboard and a touch panel. For example, the growth information collection mechanism 22 acquires a measurement position, an image, and various kinds of accompanying data described above as growth information. Subsequently, the growth information collection mechanism 22 stores these types of growth information in the sensing information database 27. Thereafter, the growth information collection process ends.

<Configuration Example of Environment Sensing Mechanism>

The environment sensing mechanism 23 senses a soil temperature, a soil moisture amount, soil acidity (pH), soil electric conductivity (EC: Electric Conductivity), and the like by using a sensor provided on the ground surface or inside the ground where the grass is cultivated, to acquire sensor information at regular intervals.

Figure 9:
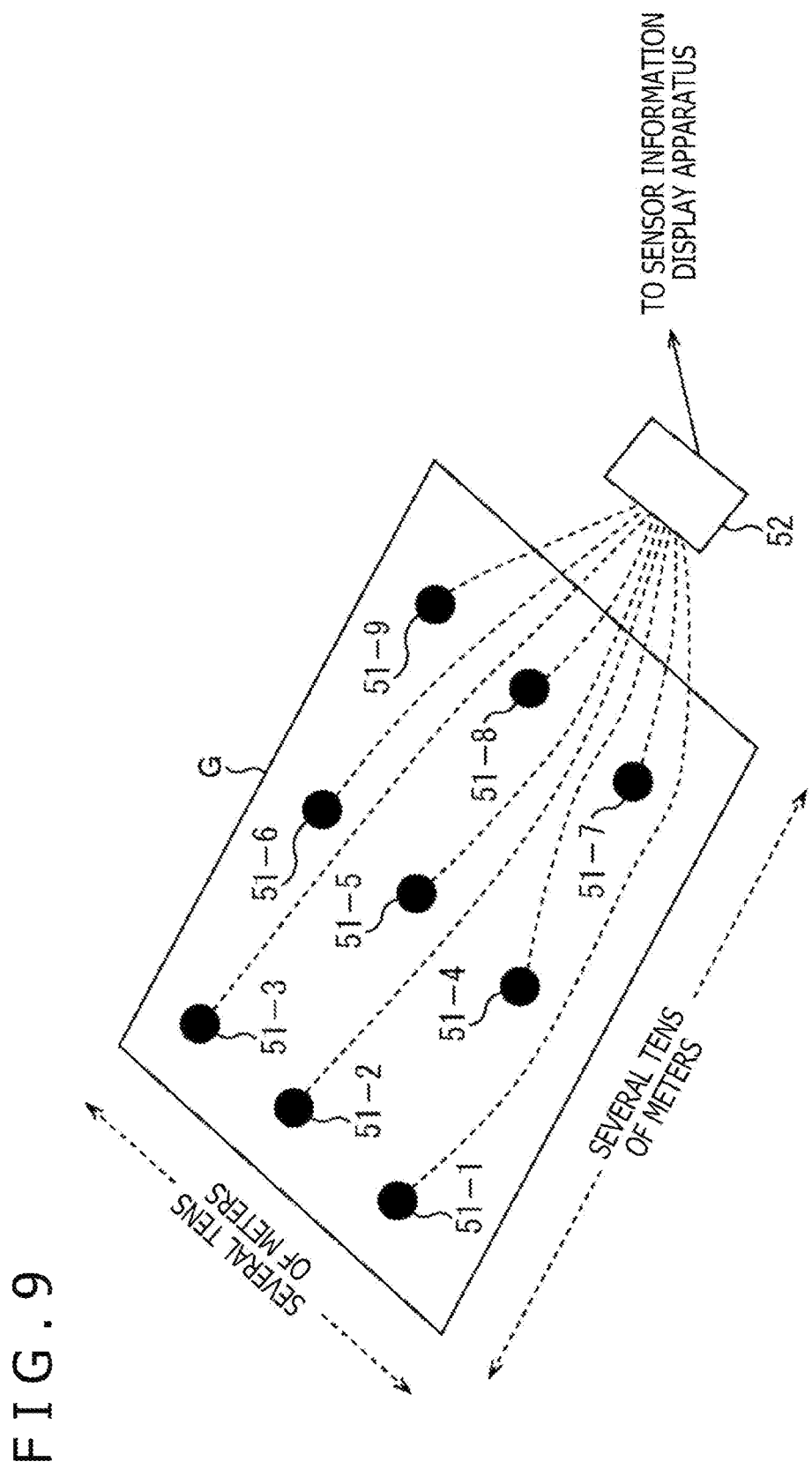
FIG. 9 is a diagram depicting a configuration example of an environment sensing mechanism.

For example, as depicted in FIG. 9, the environment sensing mechanism 23 is allowed to include plural sensors 51 (nine sensors 51-1 to 51-9 in an example in FIG. 9) and a wired sensor integrated apparatus 52. The respective sensors 51 are connected to the wired sensor integrated apparatus 52 via cables indicated by broken lines in the figure. In addition, the sensor information output from the sensors 51 is transmitted by wire to the wired sensor integrated apparatus 52 and transmitted from the wired sensor integrated apparatus 52 to a sensor information display apparatus (not depicted).

For example, supply of sunlight is essential for cultivation of grass, and also, a temperature inside soil, a moisture amount, electric conductivity, and the like have various influences on growth. Accordingly, depending on stadiums, plural sensors 51 capable of sensing a temperature, moisture, and the like are buried in the ground during construction of the facility.

Figure 10:
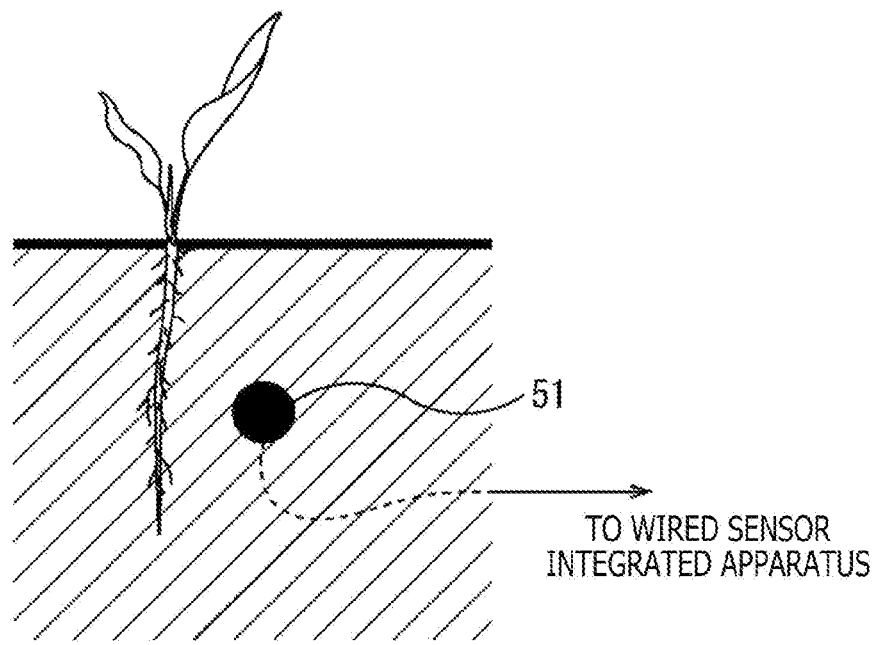
FIG. 10 is a diagram explaining a sensor constituting the environment sensing mechanism.

For example, as depicted in FIG. 10, the sensor 51 is buried in soil where grass is cultivated and collects various types of sensor information described above. Note that a ground temperature which needs to be actually acquired for cultivation of grass is a temperature at a position inside the ground away from the grass surface by approximately 5 cm, for example. However, for the sake of facility location, the sensor 51 is disposed inside the ground away from the grass surface by approximately 30 cm in some cases. Accordingly, a process for estimating the ground temperature inside the ground away from the grass surface by approximately 5 cm needs to be performed on the basis of sensor information acquired by the sensor 51.

In addition, the environment sensing mechanism 23 may have a configuration for transmitting sensor information by using an RF (Radio Frequency) band wireless, for example, as well as a configuration for transmitting sensor information by wire from the sensors 51 as depicted in FIG. 9.

Figure 11:
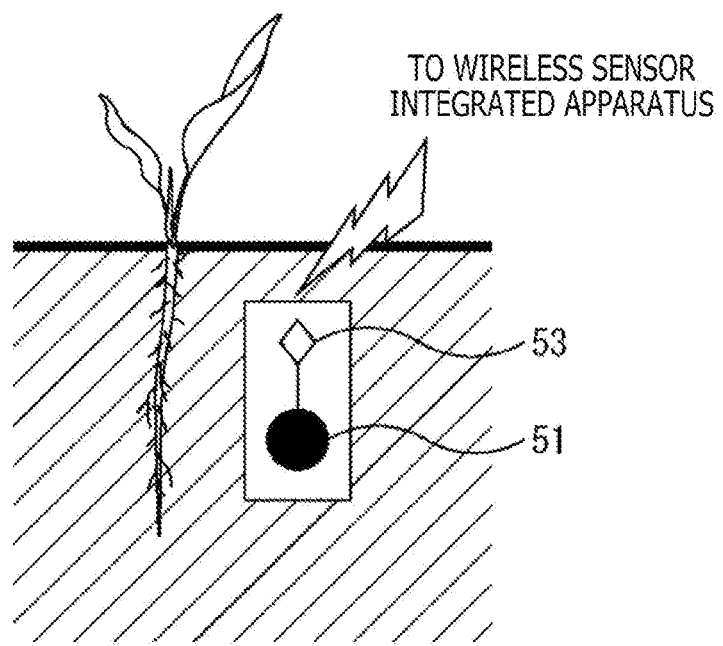
FIG. 11 is a diagram explaining a first modification of the environment sensing mechanism.

A first modification of the environment sensing mechanism 23 will be explained with reference to FIG. 11. As depicted in the figure, the environment sensing mechanism 23 is allowed to adopt a configuration in which an antenna 53 is connected to the sensor 51, and transmits sensor information to a wireless sensor integrated apparatus (not depicted) by using RF band electromagnetic waves output from the antenna 53. The environment sensing mechanism 23 having this configuration facilitates laying work and removal work of the sensors 51.

Moreover, for example, the environment sensing mechanism 23 may have a configuration in which sensor information optically modulated using a light emitter such as an LED (Light Emitting Diode) is transmitted.

A second modification of the environment sensing mechanism 23 will be explained with reference to FIG. 12. As depicted in the figure, the environment sensing mechanism 23 is allowed to adopt a configuration in which a light emitting apparatus 54 which appears above the ground surface is connected to the sensor 51 and light which indicates sensor information optically modulated and transmitted from the light emitting apparatus 54 is received via the camera of the grass surface imaging mechanism 21. In addition, the environment sensing mechanism 23 analyzes a moving image captured by the camera, thereby demodulating the light received by the camera and acquiring sensor information and further specifying each position of the sensors 51. The environment sensing mechanism 23 thus configured facilitates removal and insertion from and into soil and is capable of easily measuring the temperature of the grass surface, for example.

Meanwhile, many plants including grass perform a behavior called transpiration for discharging moisture from leaves. Wind flowing around leaves plays an important role for this behavior. Accordingly, measurement of a wind speed and a wind direction near grass leaves is useful for determining a position of a blower or the like separately provided and an output setting of the blower.

The environment sensing mechanism 23 may therefore be configured to measure a wind speed and a wind direction near grass leaves.

Third and fourth modifications of the environment sensing mechanism 23 will be explained with reference to FIGS. 13 and 14. For example, the environment sensing mechanism 23 is allowed to use a streamer 55 depicted in FIG. 13 or a smoke generator 56 depicted in FIG. 14. In addition, the environment sensing mechanism 23 is allowed to have such a configuration that a wind speed and a wind direction near grass leaves are acquired as sensor information on the basis of image analysis of a captured image in which the streamer 55 or smoke of the smoke generator 56 is captured. At this time, the environment sensing mechanism 23 can specify the position of the streamer 55 or the smoke generator 56 on the basis of image analysis.

Figure 15:
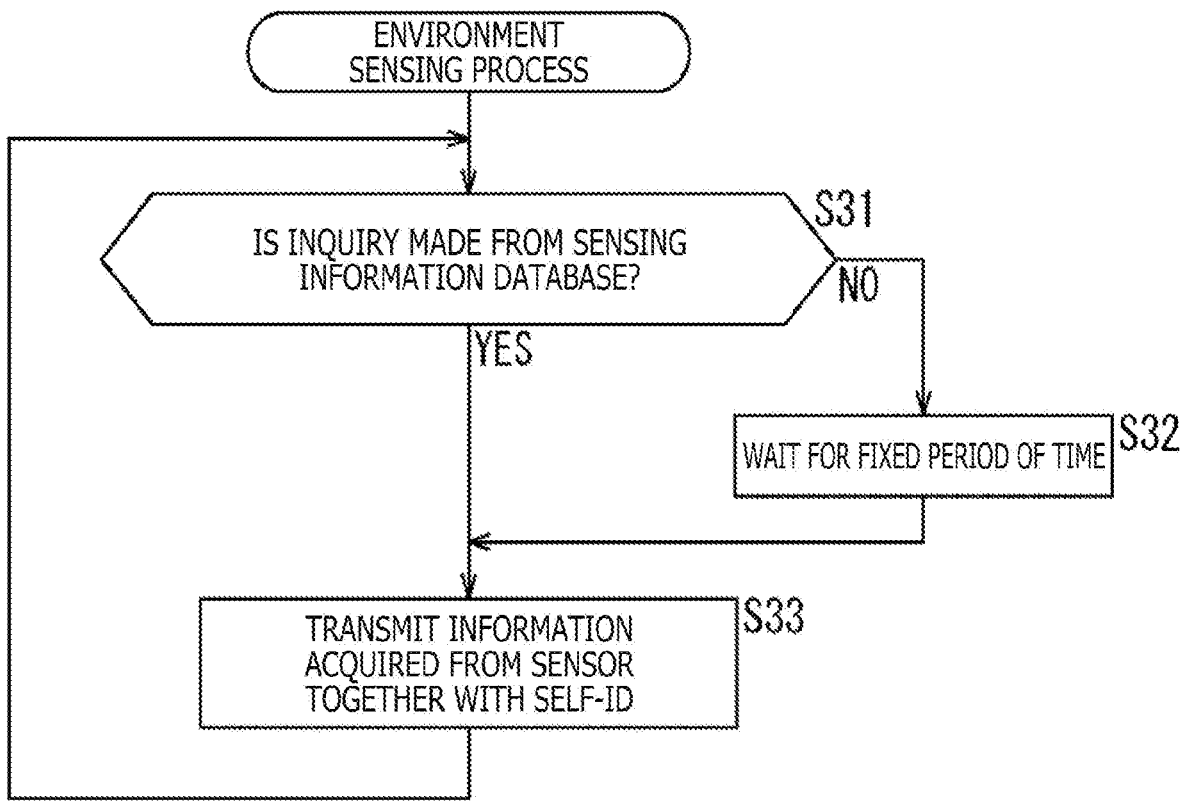
FIG. 15 is a flowchart explaining a first processing example of an environment sensing process.

A first processing example of an environment sensing process performed by the environment sensing mechanism 23 will be explained with reference to a flowchart depicted in FIG. 15. For example, the environment sensing process is performed in step S15 in FIG. 5 described above. In addition, this process is applied to the configuration in which the sensors 51 are connected by wire (see FIG. 10) or wirelessly (see FIG. 11).

In step S31, the environment sensing mechanism 23 determines whether or not an inquiry has been made by the sensing information database 27.

In a case where no inquiry is determined to have been made by the sensing information database 27 in step S31, the process proceeds to step S32. In this case, the environment sensing mechanism 23 waits for a fixed period of time.

On the other hand, in a case where an inquiry is determined to have been made by the sensing information database 27 in step S31, or after processing in step S32 is completed, the process proceeds to step S33. In step S33, the environment sensing mechanism 23 requests the sensors 51 to transmit sensor information. Thereafter, the environment sensing mechanism 23 supplies, to the sensing information database 27, the sensor information acquired from the sensors 51 in response to the request, together with IDs (Identifications) for identifying the respective sensors 51. After completion of processing in step S33, the process returns to step S31, and similar processing is repeated subsequently.

Figure 16:
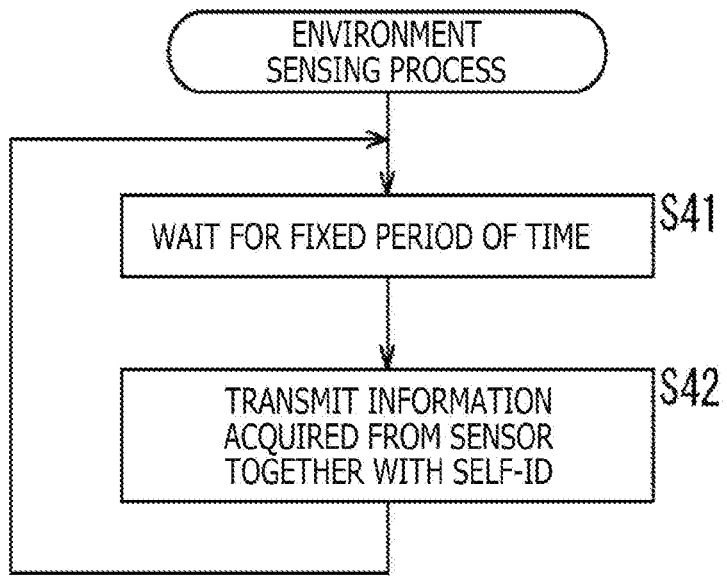
FIG. 16 is a flowchart explaining a second processing example of the environment sensing process.

A second processing example of the environment sensing process performed by the environment sensing mechanism 23 will be explained with reference to a flowchart depicted in FIG. 16. For example, the environment sensing process is performed in step S15 in FIG. 5 described above. In addition, this process is applied to the configuration in which optically modulated sensor information is transmitted from the sensors 51 (see FIG. 12).

In step S41, the environment sensing mechanism 23 waits for a fixed period or time, and then, the process proceeds to step S42.

In step S42, the environment sensing mechanism 23 acquires the sensor information transmitted from the sensors 51. Thereafter, the environment sensing mechanism 23 supplies the sensor information acquired from the sensors 51 to the sensing information database 27 together with IDs for identifying the respective sensors 51. After completion of processing in step S42, the process returns to step S41, and similar processing is subsequently repeated.

<Configuration Example of Grass Surface Analysis Mechanism>

The grass surface analysis mechanism 25 performs various types of image analysis in a visible light range by using an image (still image or moving image) supplied from the grass surface imaging mechanism 21, thereby extracting necessary information and analyzing a grass state.

Specifically, the grass surface analysis mechanism 25 is capable of calculating a ratio of grass present per unit area as a grass leaf covering ratio from a visible light image and calculating a solar radiation amount per unit time from a luminance image of sunlight reaching the grass surface.

Moreover, the grass surface analysis mechanism 25 is capable of detecting a person as a detection target from a moving image of a game having been held, to analyze damage to the grass caused by a trampling pressure from a period of time during which the person stayed on the grass surface, and detecting harmful animals having entered the grass surface in a period during which no game was held as a detection target, to analyze occurrence of diseases and weeds brought into by the harmful animals.

Figure 12:
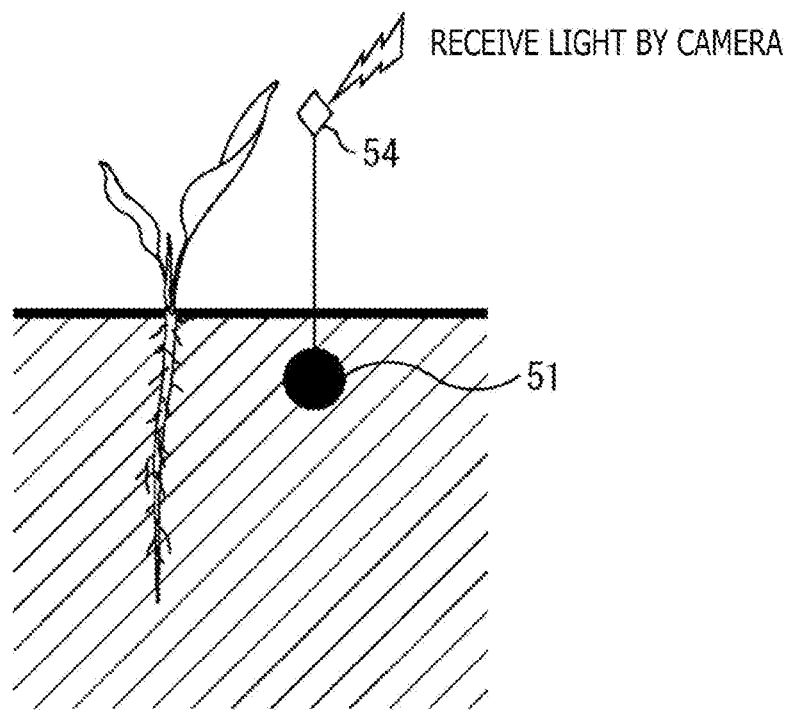
FIG. 12 is a diagram explaining a second modification of the environment sensing mechanism.

Note that the grass surface analysis mechanism 25 is capable of performing a process for acquiring sensor information optically modulated and generated from the sensors 51 provided on the grass surface as depicted in FIG. 12. Moreover, the grass surface analysis mechanism 25 is capable of analyzing a wind direction and a wind speed near the grass surface by recognizing shapes of the compact streamer 55 in FIG. 13, smoke from the smoke generator 56 in FIG. 14, or the like.

Furthermore, for example, the grass surface analysis mechanism 25 is allowed to use a method achieved by a procedure type process explained below or a method using a learned neural network model, as a method for the above analyses.

First, explained as the procedure type process performed by the grass surface analysis mechanism 25 for analyzing the grass surface will be optical observation of a grass leaf covering ratio, a solar radiation amount, a trampling pressure grass damage ratio, a harmful animal grass damage ratio, and sensor information.

—Grass Leaf Covering Ratio

NDVI described above is used as one of indexes for recognizing health conditions of plants. For example, for accurately measuring NDVI, it is necessary to radiate grass with light containing a fixed wavelength component and conduct measurement using at least two narrow-band optical bandpass filters. Accordingly, implementation of NDVI measurement requires high cost.

Accordingly, a state of color fading of leaves from green in association with weakness of grass is detected using an ordinary visible light camera and acquired as an index for recognizing a health condition of grass in place of NDVI. Specifically, pixels contained in a certain color range around green are extracted from an image. Then, a ratio of grass to sand and a ratio of healthy grass growing within a unit area with separation between healthy grass and withered grass (having a color different from green) are calculated as a grass leaf covering ratio. More specifically, the grass surface analysis mechanism 25 is capable of calculating, as the "grass leaf covering ratio," a ratio of the "number of pixels contained in a designated color range" to the "number of total pixels present in a designated range" included in pixels present in the designated range.

Here, a method for calculating the grass leaf covering ratio will be explained with reference to FIG. 17.

For example, the grass leaf covering ratio can be calculated for each of plural divisional regions produced by dividing a captured image of the entire grass surface. According to the example depicted in FIG. 17, the grass leaf covering ratio is calculated for each of 60 divisional regions produced by dividing the image into 6 parts in the vertical direction (A to F) and into 10 parts in the horizontal direction (1 to 10). Note that each of the divisional regions of the captured image of the entire grass surface is determined to have a size easily recognizable as a range of grass management work to be performed later in consideration of resolution of imaging elements of the camera included in the grass surface imaging mechanism 21. In addition, for example, the divisional regions are allowed to be divided according to imaging areas in a case where the entire grass surface is divided into plural areas and imaged for each of the areas.

Only pixels within a specific range indicated by an ordinary color space are extracted from each of the foregoing divisional regions by using a fact that healthy grass is green. Thereafter, a ratio of the number of pixels extracted and falling within the specific range to the number of all pixels contained in each of the divisional regions is calculated as the grass leaf covering ratio.

Figure 17:
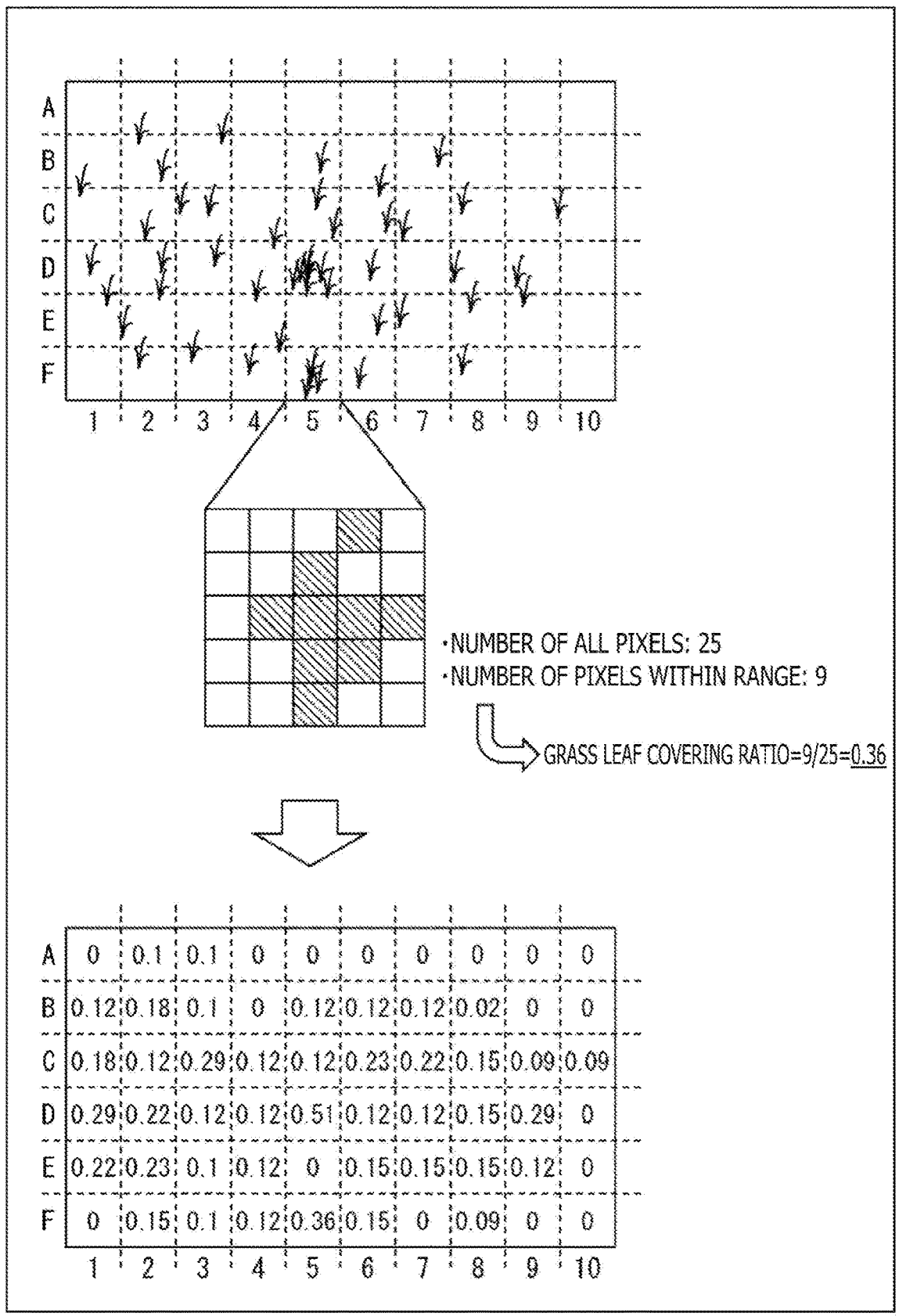
FIG. 17 is a diagram explaining a calculation method of a grass leaf covering ratio.

According to the example depicted in FIG. 17, the number of all pixels contained in the divisional region (F-5) is 25, and nine pixels are extracted as pixels contained in a green range corresponding to healthy grass. Accordingly, 0.36 (=9/25) can be obtained as the grass leaf covering ratio of the region (F-5) by calculation. This calculation of the grass leaf covering ratio for each of the divisional regions is performed for all of the divisional regions. In this manner, the grass leaf covering ratio for each of the 60 divisional regions can be expressed in a two-dimensional map as depicted in a lower part of FIG. 17. Note that a higher value of the grass leaf covering ratio indicates growth of healthier grass.

Figure 18:
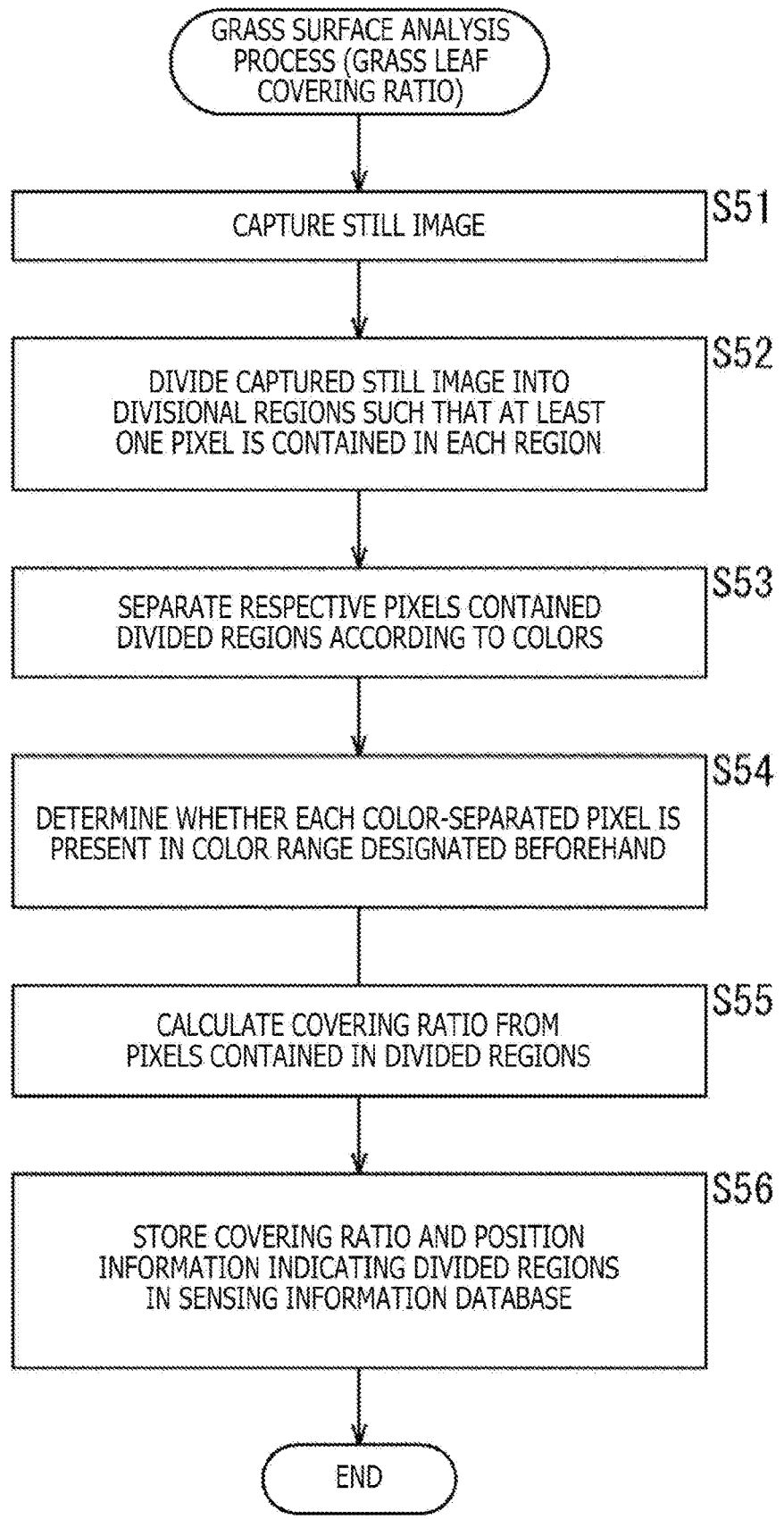
FIG. 18 is a flowchart explaining a first processing example (grass leaf covering ratio) of a grass surface analysis process.

A process for calculating the grass leaf covering ratio will be explained with reference to a flowchart in FIG. 18 as a first processing example of a grass surface analysis process performed by the grass surface analysis mechanism 25. For example, the grass surface analysis process is performed in step S13 in FIG. 5 described above.

In step S51, the grass surface analysis mechanism 25 acquires a still image when the camera 41 (see FIG. 6) of the grass surface imaging mechanism 21 captures the still image.

In step S52, the grass surface analysis mechanism 25 divides the still image acquired in step S51 into plural divisional regions (e.g., 60 divisional regions depicted in FIG. 17). At this time, the grass surface analysis mechanism 25 divides the image into the respective divisional regions such that at least one pixel is contained in each of the divisional regions.

In step S53, the grass surface analysis mechanism 25 separates pixels contained in each of the divisional regions divided in step S52, according to colors.

In step S54, the grass surface analysis mechanism 25 determines whether each of the pixels separated according to colors in step S53 is present in a color range designated beforehand (green range corresponding to healthy grass as described above).

In step S55, the grass surface analysis mechanism 25 calculates the covering ratio from the pixels contained in each of the divisional regions divided in step S54, as explained with reference to FIG. 17.

In step S56, the grass surface analysis mechanism 25 stores the covering ratio calculated in step S55 and position information indicating the divisional region in the sensing information database 27. Thereafter, the grass surface analysis process ends.

—Solar Radiation Amount

There is PPFD as a value indicating a light amount used by plants for achieving photosynthesis. For example, attachment of an optical bandpass filter, sensitivity correction of light receiving elements, and the like are necessary for accurately measuring PPFD. Accordingly, implementation of PPFD measurement requires high cost. Moreover, an influence of a shadow produced by a structure which shields sunlight with elapse of time needs to be considered. Measurement of PPFD for a wide area of a grass surface is therefore difficult.

Accordingly, a relative difference between solar radiation amount in a sunny place and a solar radiation amount in a shadow is quantified using a luminance image of the grass surface captured by the camera 41 with elapse of time. Moreover, as depicted in an upper part of FIG. 19, one PPFD measuring device 57 is provided at such a position as not to cause sunlight obstruction for the grass surface. In this manner, an appropriate PPFD value for each time and each position can be calculated on the basis of the PPFD measuring device 57 and luminance information obtained from an image in which the grass surface is captured by the camera 41. Furthermore, as depicted in the upper part of FIG. 19, a sunlight obstruction area is produced in the grass surface by an obstacle such as a building.

For example, the grass surface analysis mechanism 25 acquires images captured by the camera 41 provided on a building or the like at regular intervals such as intervals of 15 minutes and extracts a luminance value from each of these images. Thereafter, the grass surface analysis mechanism 25 plots a luminance value for each imaging time in a map divided into plural divisional regions. Furthermore, the grass surface analysis mechanism 25 integrates values of the created map in a period from sunrise to sunset, for example.

Figure 19:
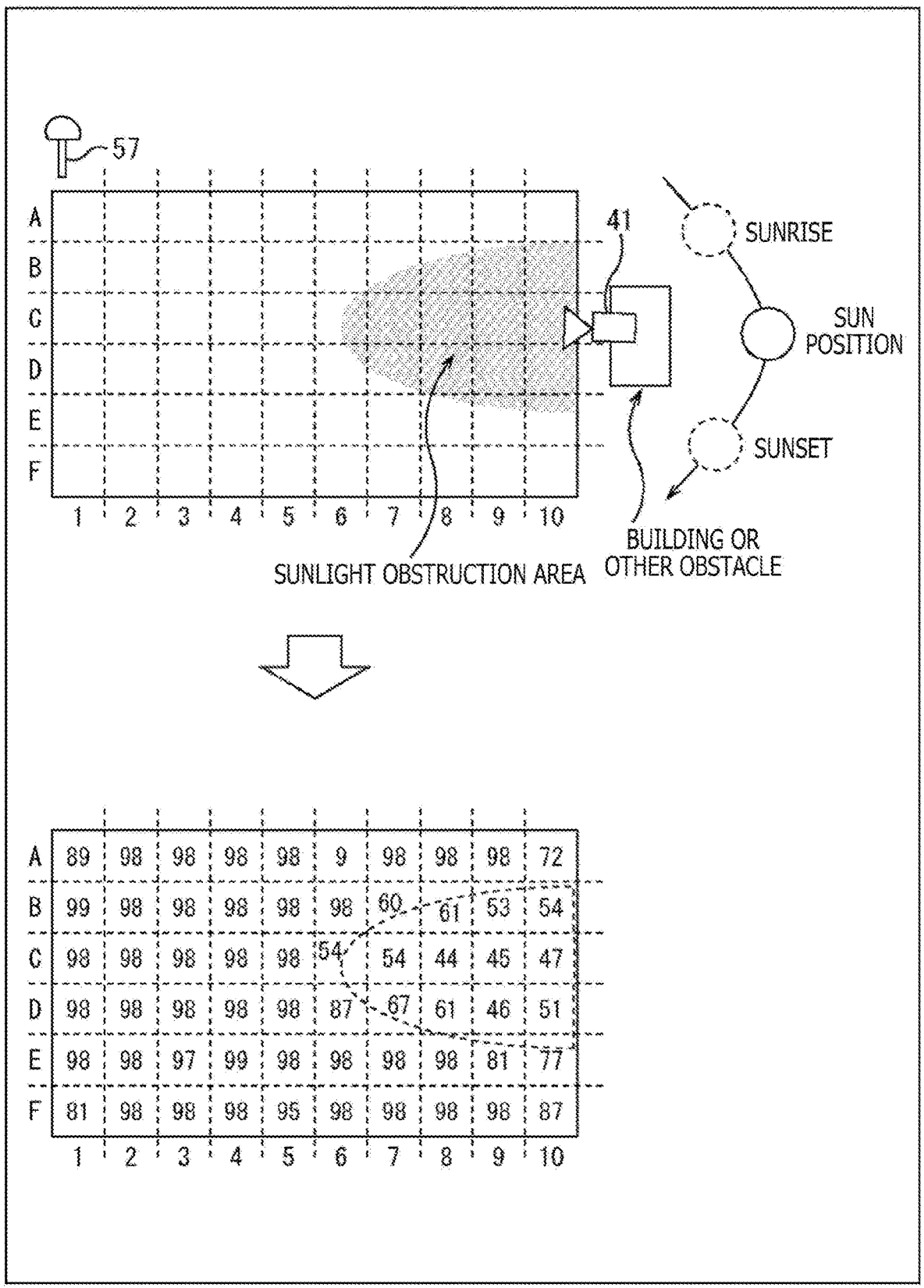
FIG. 19 is a diagram explaining a calculation method of a solar radiation amount.

In this manner, an integrated light amount per day can be presented for each of the divisional regions as depicted in a lower part of FIG. 19. In the example depicted in FIG. 19, a smaller numerical value indicates a smaller solar radiation amount. This drop of the solar radiation amount is produced by the presence of a period of time during which sunlight is shielded by a building or the like. In this manner, even in an environment where a light amount dynamically changes by an influence produced by a change of the position of the sun and clouds, insufficiency of the light amount can easily be calculated for each of the divisional regions.

Moreover, the grass surface analysis mechanism 25 uses a PPFD value measured by the PPFD measuring device 57 at a time same as the time of imaging by the camera 41. In this manner, a maximum value within the map created at that time can be determined as a value close to the PPFD value. Accordingly, the grass surface analysis mechanism 25 is also allowed to convert each value other than the maximum value within the map into an approximate PPFD value on the basis of a relation between the maximum value within the map and the PPFD value.

Figure 20:
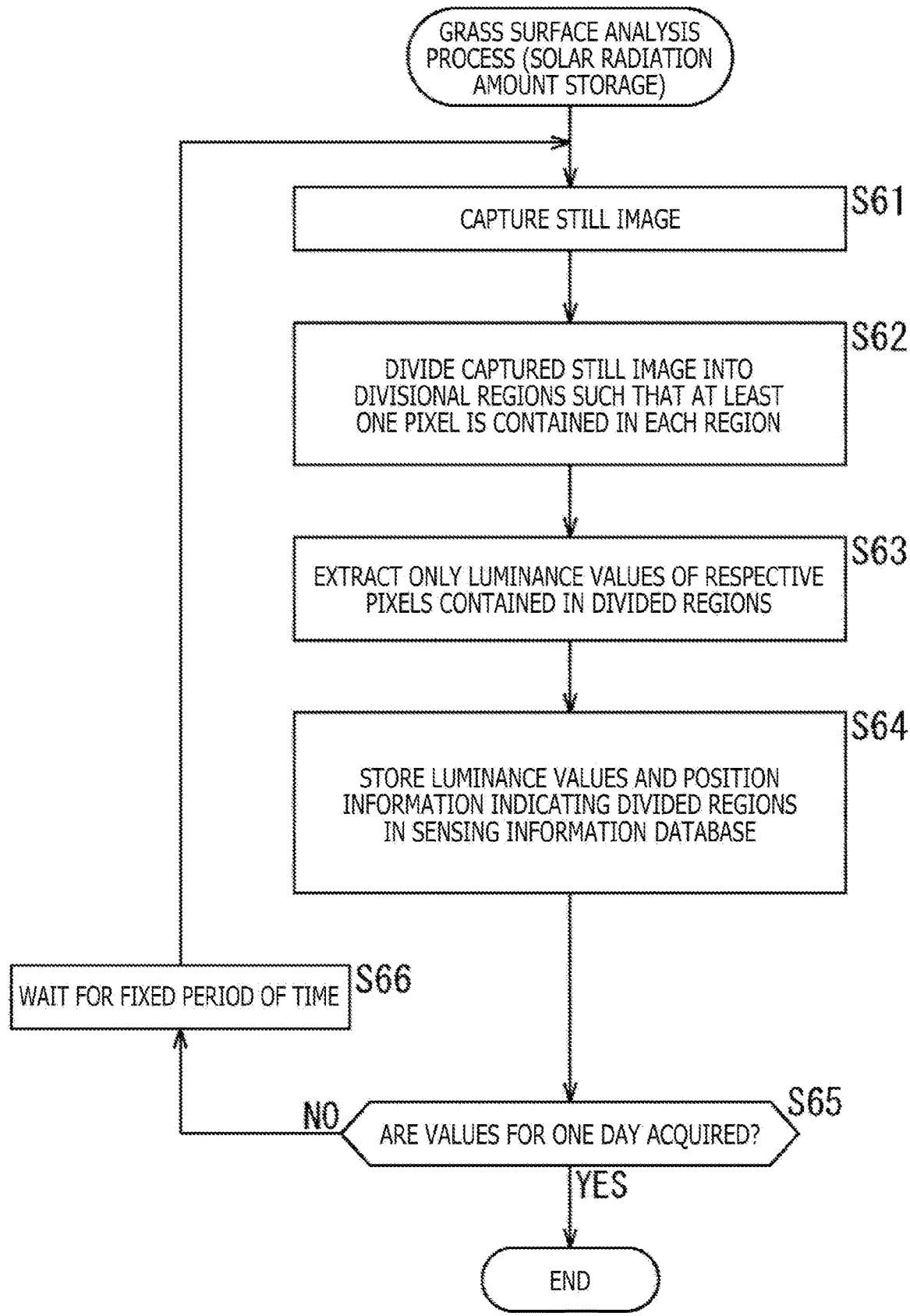
FIG. 20 is a flowchart explaining a second processing example (solar radiation amount storage) of the grass surface analysis process.

A process for storing a solar radiation amount will be explained with reference to a flowchart in FIG. 20, as a second processing example of the grass surface analysis process performed by the grass surface analysis mechanism 25. For example, the grass surface analysis process is performed in step S13 in FIG. 5 described above.

In step S61, the grass surface analysis mechanism 25 acquires a still image when the camera 41 of the grass surface imaging mechanism 21 captures the still image.

In step S62, the grass surface analysis mechanism 25 divides the still image acquired in step S61 into plural divisional regions (e.g., 60 divisional regions as depicted in FIG. 19). At this time, the grass surface analysis mechanism 25 divides the image into the respective divisional regions such that at least one pixel is contained in each of the divisional regions.

In step S63, the grass surface analysis mechanism 25 extracts only a luminance value of each of pixels contained in the divisional regions obtained by division in step S62.

In step S64, the grass surface analysis mechanism 25 stores the luminance value extracted in step S64 and position information indicating the divisional region in the sensing information database 27.

In step S65, the grass surface analysis mechanism 25 determines whether or not luminance values for one day have been acquired.

In a case where it is determined in step S65 that luminance values for one day have not yet been acquired, the process proceeds to step S66. In step S66, the grass surface analysis mechanism 25 waits for a fixed period of time. Thereafter, the process returns to step S61, and similar processing is repeated subsequently.

On the other hand, in a case where it is determined in step S65 that luminance values for one day have been acquired, the grass surface analysis process ends.

Figure 21:
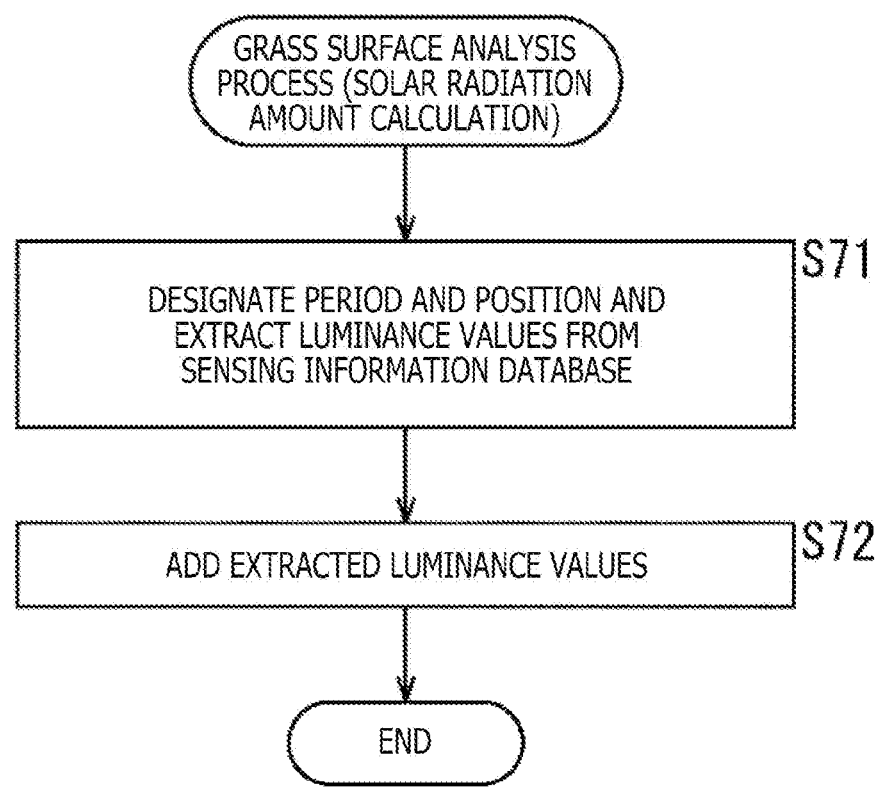
FIG. 21 is a flowchart explaining a third processing example (solar radiation amount calculation) of the grass surface analysis process.

A process for calculating a solar radiation amount will be explained with reference to a flowchart in FIG. 21, as a third processing example of the grass surface analysis process performed by the grass surface analysis mechanism 25. For example, the grass surface analysis process is performed in step S13 in FIG. 5 described above.

In step S71, the grass surface analysis mechanism 25 designates a period and a position and extracts luminance values from the sensing information database 27.

In step S72, the grass surface analysis mechanism 25 acquires the map as depicted in the lower part of FIG. 19, for example, by adding luminance values for the period extracted in step S71 for each position. Thereafter, the grass surface analysis process ends.

—Trampling Pressure Grass Damage Ratio

Future damage expected to be caused to grass is predicted from stress of a trampling pressure generated by a person (player or the like) having trampled the grass before damage to the grass is recognized on the basis of discovery of a color change of grass leaves. In this manner, deterioration of a grass state is avoidable by fertilizing a portion which is expected to suffer damage, beforehand, for example.

A method for calculating a trampling pressure grass damage ratio by the grass surface analysis mechanism 25 will be explained with reference to FIG. 22.

For example, the grass surface analysis mechanism 25 detects players of a game as a detection target by performing an image recognition process for a moving image obtained when the match is held and determines to which divisional region each of the positions of the players corresponds in an entire field, as depicted in an upper part of FIG. 22.

Thereafter, the grass surface analysis mechanism 25 is capable of calculating, for each of the divisional regions, a ratio of an "integrated time of a period during which each of the players stayed in the corresponding divisional region" to a "total time of the moving image," as a "trampling pressure grass damage ratio" in each of the divisional regions.

A lower part of FIG. 22 depicts an example of a map which represents the trampling pressure grass damage ratio obtained by the grass surface analysis mechanism 25 for each of the divisional regions. For example, such an analysis can be made that a larger numerical value indicates a longer period of stay by a player and higher stress given to the grass surface.

Moreover, using the trampling pressure grass damage ratio and the grass leaf covering ratio described above, such an analysis can also be made that the grass is damaged by a disease or the like in the divisional region where the grass leaf covering ratio and the trampling pressure grass damage ratio are both low, i.e., where a period of a stay by a player is short even though the grass is in a withered state.

Figure 23:
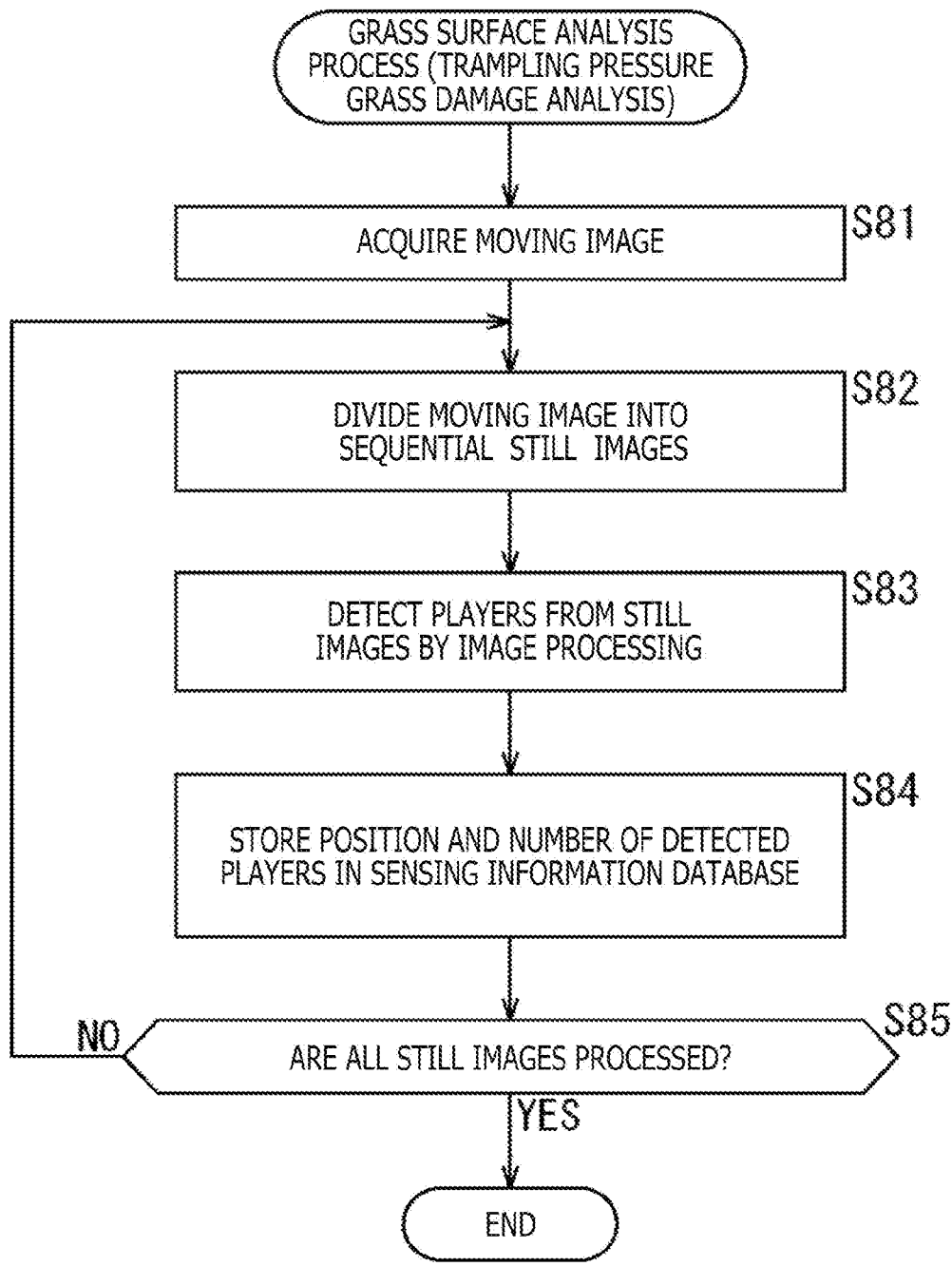
FIG. 23 is a flowchart explaining a fourth processing example (trampling pressure grass damage analysis) of the grass surface analysis process.

A process for analyzing a trampling pressure grass damage ratio will be explained with reference to a flowchart in FIG. 23, as a fourth processing example of the grass surface analysis process performed by the grass surface analysis mechanism 25. For example, the grass surface analysis process is performed in step S13 in FIG. 5 described above.

In step S81, the grass surface analysis mechanism 25 acquires a moving image when the camera 41 (see FIG. 6) of the grass surface imaging mechanism 21 captures the moving image.

In step S82, the grass surface analysis mechanism 25 divides the moving image acquired in step S81 into sequential still images. At this time, for example, the grass surface analysis mechanism 25 divides the moving image into still images at intervals of a predetermined period of time in the order from the head of the moving image.

In step S83, the grass surface analysis mechanism 25 detects players appearing in the still images, as a detection target, by performing an image recognition process for the still images acquired in step S82.

In step S84, the grass surface analysis mechanism 25 stores, in the sensing information database 27, the positions and the number of the players detected in step S83.

In step S85, for example, the grass surface analysis mechanism 25 determines whether or not the image recognition process has been performed for all of the still images obtained from the moving image acquired in step S81.

In a case where it is determined in step S85 that the imaging recognition process has not yet been performed for all of the still images, the process returns to step S82. Thereafter, similar processing is subsequently repeated for a subsequent predetermined period of time. On the other hand, in a case where it is determined in step s85 that the image recognition process has been performed for all of the still images, the grass surface analysis process ends.

Figure 24:
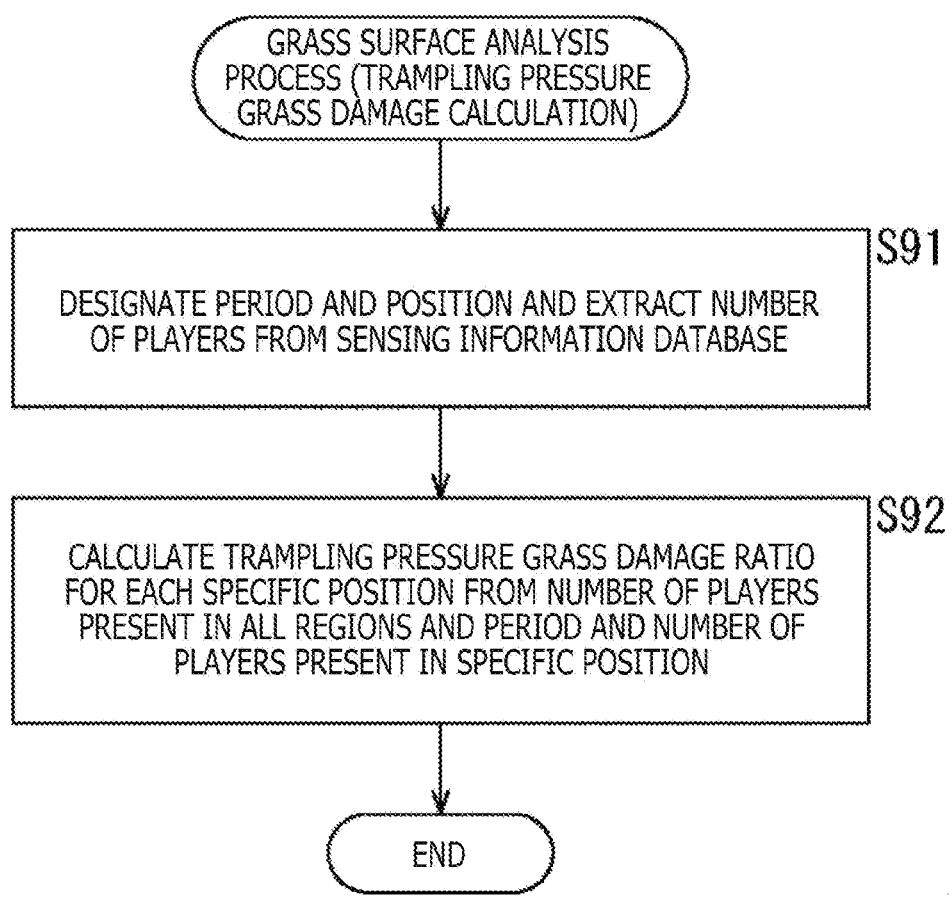
FIG. 24 is a flowchart explaining a fifth processing example (trampling pressure grass damage calculation) of the grass surface analysis process.

A process for calculating a trampling pressure grass damage ratio will be explained with reference to a flowchart in FIG. 24, as a fifth processing example of the grass surface analysis process performed by the grass surface analysis mechanism 25. For example, the grass surface analysis process is performed in step S13 in FIG. 5 described above.

In step S91, the grass surface analysis mechanism 25 designates a period and position and extracts the number of players from the sensing information database 27.

In step S92, the grass surface analysis mechanism 25 calculates a trampling pressure grass damage ratio for each of specific divisional regions included in all divisional regions where the players are present during the period, on the basis of the number of players present in each of the divisional regions and the number of players present in each of the specific divisional regions. In this manner, for example, a map depicted in a lower part of FIG. 22 is acquired, and the grass surface analysis process ends.

—Harmful Animal Grass Damage Ratio

As a result of entry of animals into the grass surface, particularly entry of birds, miscellaneous germs, plant seeds other than grass, or the like brought in by these animals may breed. These germs or plants have a considerable adverse effect on the growth of the grass. In addition, bacteria, seeds, and the like are difficult to recognize by the naked eye. Accordingly, an effect of bacteria, seeds, and the like is only recognized afterwards in many cases. The grass surface analysis mechanism 25 therefore analyzes the effect of entrance of animals by using a method similar to the method for calculating the trampling pressure grass damage ratio described above. In this manner, deterioration of a grass state is avoidable by removing droppings beforehand or distributing insect-fungicides, herbicides, or the like for the divisional region for which a high value is calculated, for example.

For example, a moving image of the grass surface is captured even when no game is held, by using the camera 41 (see FIG. 6) of the grass surface imaging mechanism 21. Thereafter, the grass surface analysis mechanism 25 detects an animal as a detection target by performing an image recognition process for a moving image obtained in a period during which no match is held and determines to which divisional region the position of the animal corresponds in an entire field.

Thereafter, the grass surface analysis mechanism 25 is capable of calculating, for each of the divisional regions, a ratio of an "integrated time of a period during which the animal stayed in the corresponding divisional region" to a "total time of the moving image," as the "harmful animal grass damage ratio" for the corresponding divisional region.

—Optical Observation of Sensor Information

There is a case where transmission of sensed information in the form of light as depicted in FIG. 12 is effective as a wireless sensor disposed on the grass surface.

For example, in a case of use of RF wireless, such requirements as usable frequencies and output regulations different for each country need to be met. However, in a case of use of light, these regulations are not imposed. Accordingly, an analog amount obtained by sensing, such as a ground temperature and a moisture amount, can be transmitted using modulation light modulated at a blinking frequency by the light emitting apparatus 54 in FIG. 12, for example. Thereafter, this modulation light is observed and demodulated by the camera 41. In this manner, sensor information sensed by the plural sensors 51 provided on the grass surface can be collected.

Figure 13:
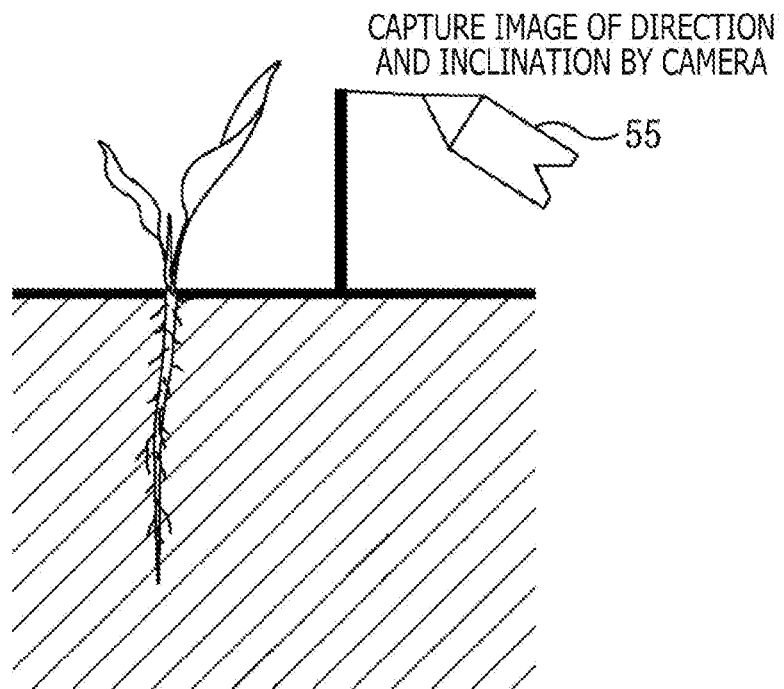
FIG. 13 is a diagram explaining a third modification of the environment sensing mechanism.
Figure 14:
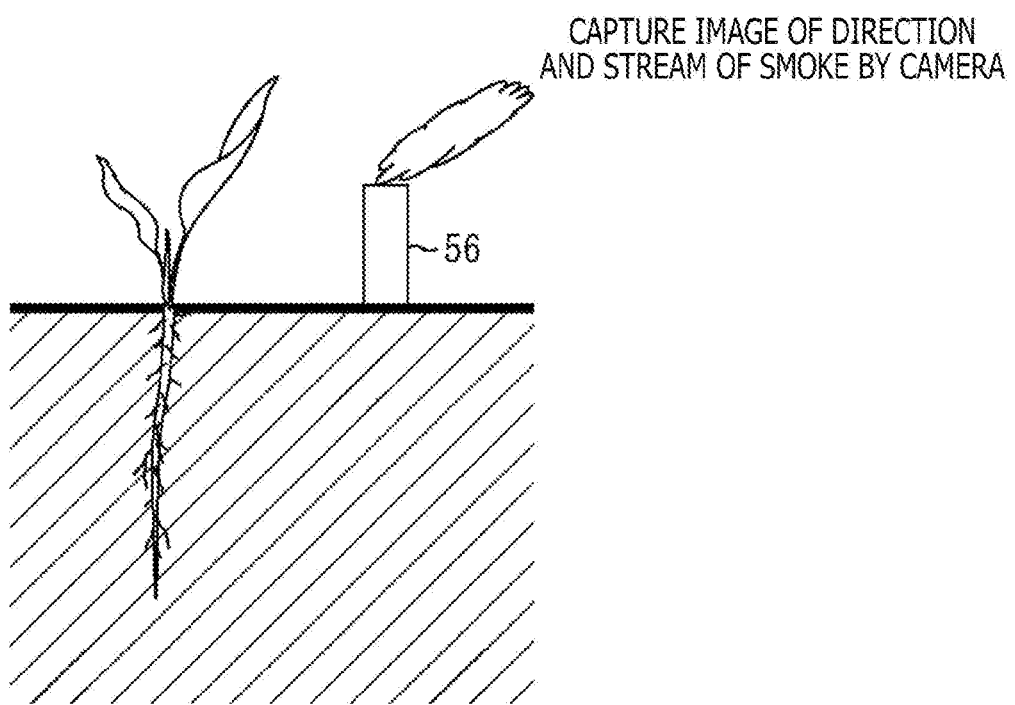
FIG. 14 is a diagram explaining a fourth modification of the environment sensing mechanism.

Furthermore, the streamer 55 depicted in FIG. 13 or the smoke generator 56 depicted in FIG. 14 are provided to recognize a flow of wind on the grass surface.

Figure 25:
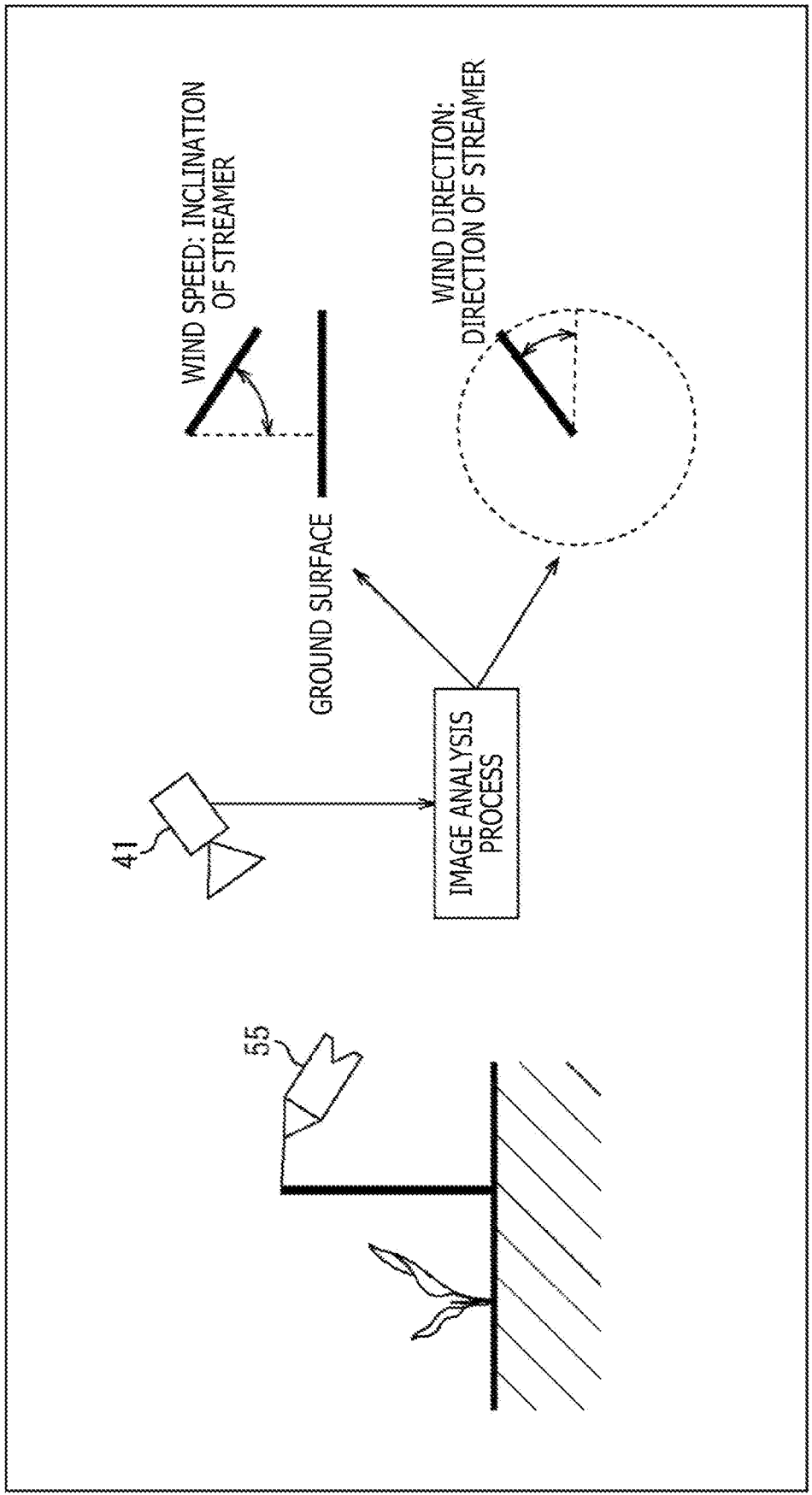
FIG. 25 is a diagram explaining a process for obtaining a wind speed and a wind direction by image analysis.

For example, as depicted in FIG. 25, a wind speed or a wind direction can be analyzed by sequentially imaging the streamer 55 with use of the camera 41 of the grass surface imaging mechanism 21. Specifically, the streamer 55 which is red is provided on the grass surface to easily recognize the image of the streamer 55 on the grass which is green. Thereafter, the grass surface analysis mechanism 25 performs an image analysis process for the image captured by the camera 41 to analyze an inclination and a direction of the streamer 55. In this manner, the inclination of the streamer 55 is obtained as a wind speed, while the direction of the streamer 55 is obtained as a wind direction.

Note that the streamer 55 is assumed to be present at a position corresponding to a blind spot as viewed from the camera 41 located at a specific position. Accordingly, it is preferable that the grass surface is observed using the plural cameras 41 to image the inclination and the direction of the streamer 55 while blind spots of the respective cameras 41 are compensated.

Next described will be a process using a neural network model performed by the grass surface analysis mechanism 25 for analyzing the grass surface.

For example, a trampling pressure grass damage ratio and a harmful animal grass damage ratio analyzed by the grass surface analysis mechanism 25 can be obtained not only from the procedure type process described above but also from learning using a neural net. Specifically, the trampling pressure grass damage ratio or the harmful animal grass damage ratio can be calculated as an output for each of spots of the grass surface in response to an input of a moving image acquired by the camera 41 of the grass surface imaging mechanism 21 to a neural network model.

For example, the grass surface analysis mechanism 25 uses a learned neural network model for which neural net learning has been carried out by the cultivation method improvement mechanism 28. In this manner, the grass surface analysis mechanism 25 can calculate the trampling pressure grass damage ratio or the harmful animal grass damage ratio while decreasing a processing load to a small value. Moreover, the cultivation method improvement mechanism 28 is allowed to use a grass state input using the growth information collection mechanism 22, the grass leaf covering ratio described above with reference to FIG. 17, and the like, as teacher data for the neural net learning.

Moreover, at the time of analysis of the trampling pressure grass damage ratio and the harmful animal grass damage ratio with use of the neural network model, the grass surface analysis mechanism 25 first decomposes a moving image captured by the camera 41 into still images for each period of time. Furthermore, the grass surface analysis mechanism 25 performs reduction to a dimension in a scale allowed to be input to the neural network model and normalization of pixel values.

Figure 26:
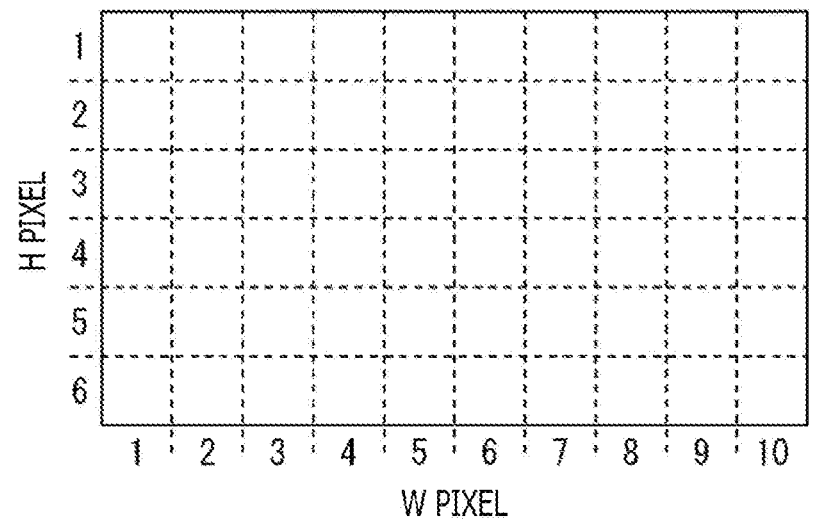
FIG. 26 is a diagram explaining pixels input to a neural network model.

For example, as depicted in an example in FIG. 26, the grass surface analysis mechanism 25 reduces a still image obtained from a moving image captured by the camera 41 into W×H pixels, i.e., W pixels in the horizontal direction and H pixels in the vertical direction. Thereafter, the grass surface analysis mechanism 25 inputs the W×H normalized pixel values to input layers of the neural network model.

In response to this input, the grass surface analysis mechanism 25 outputs the trampling pressure grass damage ratio and the harmful animal grass damage ratio for each of the divisional regions of the grass surface obtained by division in any number, from output layers of the neural network model. For example, as depicted in the example in FIG. 27, the grass surface analysis mechanism 25 outputs the trampling pressure grass damage ratio and the harmful animal grass damage ratio for each of the X×Y divisional regions produced by dividing the grass surface by X in the horizontal direction and Y in the vertical direction.

Figure 28:
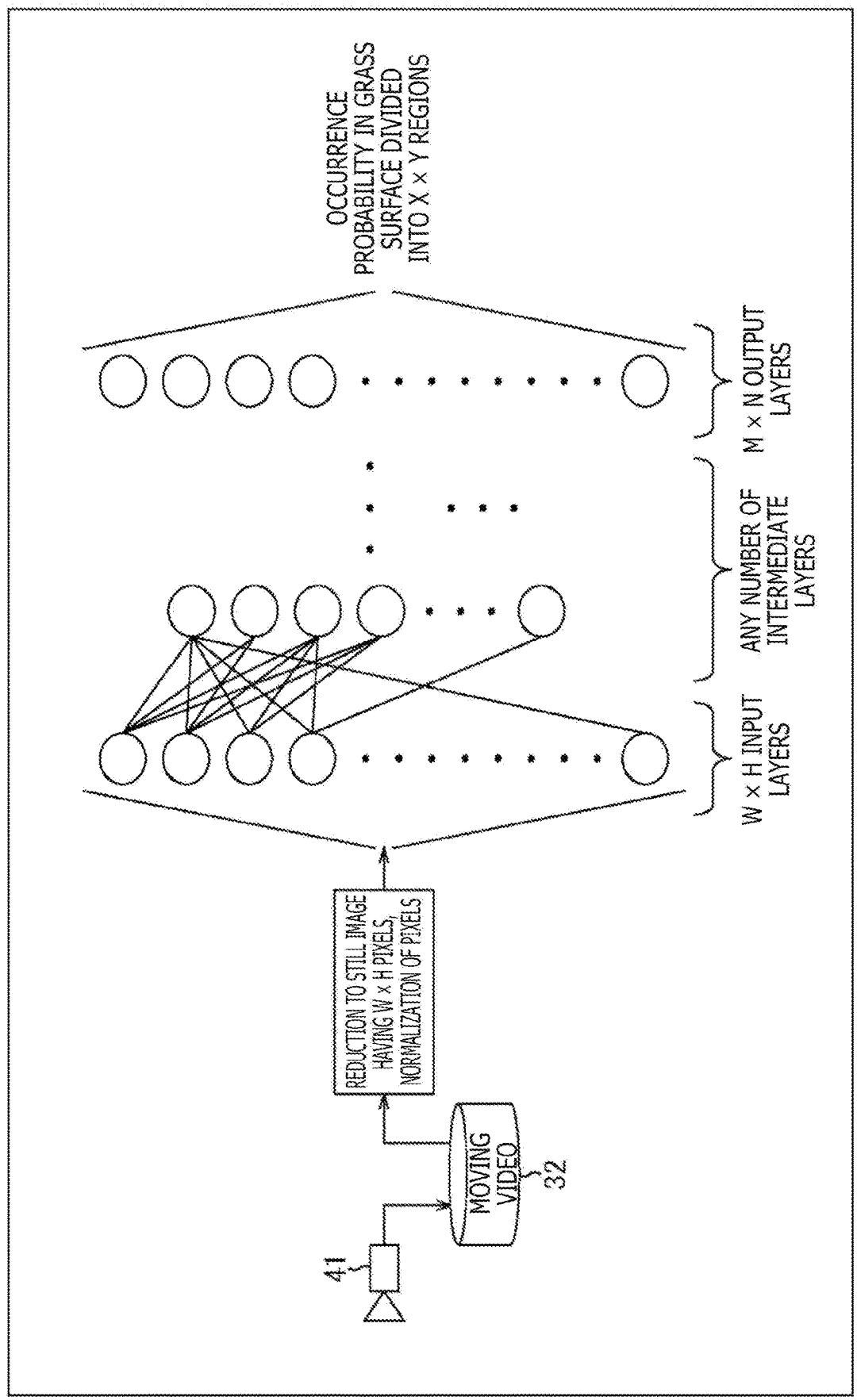
FIG. 28 is a diagram explaining grass surface analysis using the neural network model.

FIG. 28 depicts an outline of analysis performed for the trampling pressure grass damage ratio and the harmful animal grass damage ratio by the grass surface analysis mechanism 25 using the neural network model.

For example, a moving image acquired by the camera 41 of the grass surface imaging mechanism 21 is stored in the storage apparatus 32. The grass surface analysis mechanism 25 acquires a still image from the moving image read out from the storage apparatus 32 and reduces the still image into W×H pixels as depicted in FIG. 26. Moreover, the grass surface analysis mechanism 25 normalizes pixel values of the still image and inputs the W×H pixel values to the input layers of the neural network model.

The number of intermediate layers of the neural network model here may be any number. For example, according to recent studies, a dozen of layers is often provided as a convolution neural network model for recognizing images.

Figure 27:
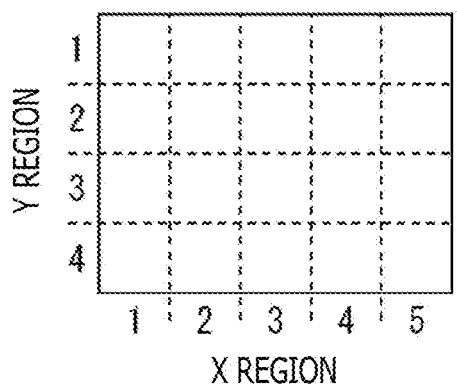
FIG. 27 is a diagram explaining regions output from the neural network model.

Thereafter, the grass surface analysis mechanism 25 divides the grass surface into any number of divisional regions, i.e., divides the grass surface into X×Y divisional regions as depicted in FIG. 27, for example, and outputs the trampling pressure grass damage ratio and the harmful animal grass damage ratio for each of the divisional regions.

For example, in a case where the trampling pressure grass damage ratio is calculated in the course of learning of the neural network model, a moving image during a game is used as leaning data, and a grass leaf covering ratio in each of the regions obtained immediately after or after several days have elapsed after an end of a game held on the grass surface is used as teacher data. Moreover, in a case of calculation of the harmful animal grass damage ratio, a moving image of the grass surface in a state in which no game is currently held is used as learning data, and the number of occurrence of weeds, diseases, or the like caused in each of the regions and input by the user through the growth information collection mechanism 22 on the next day of or after several days have elapsed from the date of imaging of the grass surface is used as teacher data. Note that the number of occurrence of weeds, diseases, or the like is stored in a grass growth information table of the sensing information database 27 as described below with reference to FIG. 32.

<Configuration Example of Growth Information Analysis Mechanism>

The growth information analysis mechanism 26 estimates lengths and thicknesses of grass roots, density of grass roots, and occurrence of current and future diseases by image analysis based on an image captured by the camera 42 or 44 (see FIG. 6) of the growth information collection mechanism 22. Moreover, the growth information analysis mechanism 26 is allowed to implement analysis using a method executed by a procedure type process and a method executed with a learned neural network model.

For example, in a case of grass, a state of roots growing in an underground portion has a considerable influence on future growth of leaves. Accordingly, quantitative recognition of the root state by the growth information analysis mechanism 26 based on an image acquired by the growth information collection mechanism 22 is essential.

Figure 29:
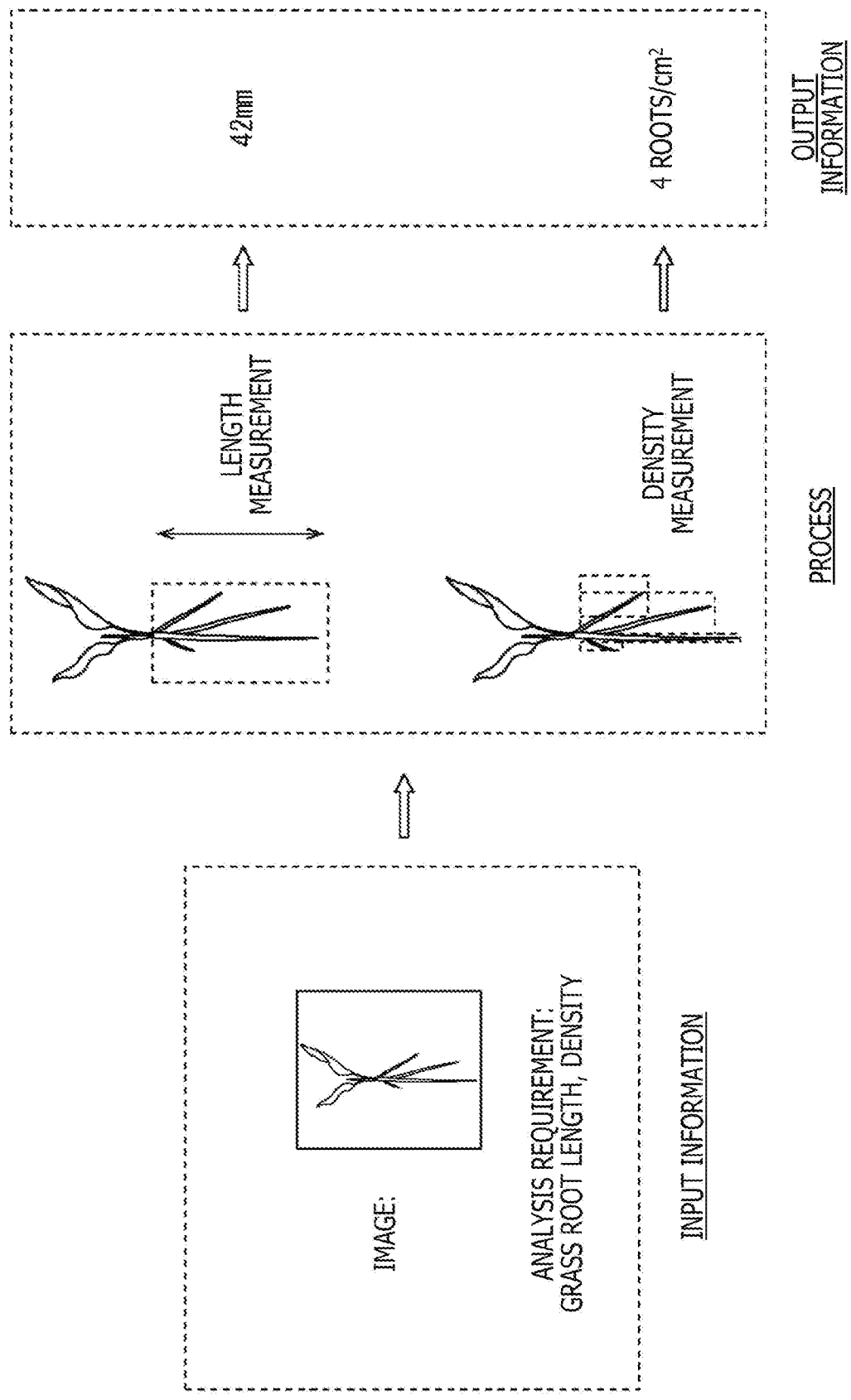
FIG. 29 is a diagram explaining analysis of growth information based on image analysis.

As depicted in FIG. 29, for example, the growth information analysis mechanism 26 quantifies lengths and density of grass roots by image analysis based on a still image in which a root portion after the grass is dug up is captured by the camera 42 or 44 of the growth information collection mechanism 22. According to the example depicted in FIG. 29, a process for analyzing a length and density of grass roots is performed on the basis of a still image as input information, and an analysis result of a measurement value of 42 mm as a length of grass roots and a measurement value of 4 roots per square centimeter as density of grass roots is obtained as output information.

Figure 30:
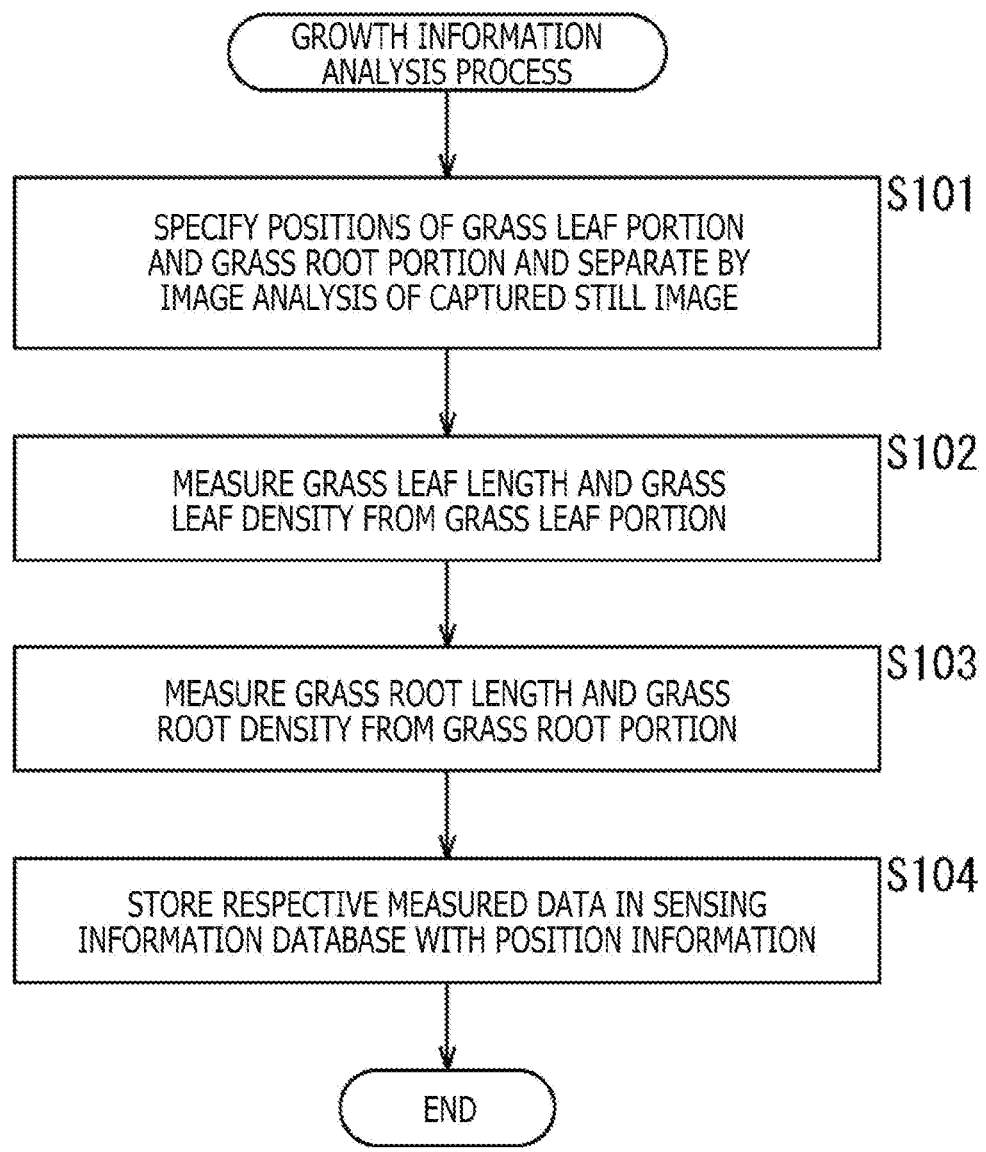
FIG. 30 is a flowchart explaining a growth information analysis process.

A growth information analysis process performed by the growth information analysis mechanism 26 will be explained with reference to a flowchart depicted in FIG. 30. For example, the growth information analysis process is performed in step S14 in FIG. 5 described above.

In step S101, the growth information analysis mechanism 26 specifies positions of a grass leaf portion and a grass root portion on the basis of image analysis of a still image captured by the camera 42 or 44 of the growth information analysis mechanism 22 and separates the grass leaf portion and the grass root portion from each other.

In step S102, the growth information analysis mechanism 26 measures lengths of grass leaves and density of grass leaves on the basis of the grass leaf portion separated in step S101.

In step S103, the growth information analysis mechanism 26 measures lengths of grass roots and density of grass roots on the basis of the grass root portion separated in step S101.

In step S104, the growth information analysis mechanism 26 stores the lengths of the grass leaves and the density of the grass leaves measured in step S102 and the lengths of the grass roots and the density of the grass roots measured in step S103 in the sensing information database 27 together with position information indicating a spot where the grass is dug up. Thereafter, the growth information analysis process ends.

For obtaining an evaluation value of the grass roots displayed in a growth information input screen depicted in FIG. 7 here, an evaluation value of the grass roots can be obtained automatically (automatic evaluation) even by a not-experienced person by using a neural network model on the basis of an image of grass roots previously captured.

For example, the growth information analysis mechanism 26 uses a learned neural network model for which neural net learning has been completed by the cultivation method improvement mechanism 28. In this manner, the growth information analysis mechanism 26 can obtain the evaluation value of the grass roots with no processing load imposed.

FIG. 31 depicts an outline of analysis performed by the growth information analysis mechanism 26 for analyzing a total evaluation value of grass roots with use of the neural network model.

For example, the growth information analysis mechanism 26 performs reduction of the number of pixels to a dimension of a scale allowed to be input to the neural network model (e.g., W×H pixels depicted in FIG. 26) and normalization for an image of grass roots captured by the camera 42 or 44 (see FIG. 6) of the growth information collection mechanism 22. Thereafter, the growth information analysis mechanism 26 performs processing for several intermediate layers and then, outputs, as an evaluation state of the grass roots, a probability that each of output layers has a corresponding evaluation value using a 10-stage evaluation in an example depicted in FIG. 31.

For example, in the course of the neural net learning, the growth information collection mechanism 22 uses a subjective evaluation value input from an experienced person in grass management, as teacher data, and uses a captured image of grass roots as learning data.

<Configuration Example of Sensing Information Database>

For example, the sensing information database 27 stores image information acquired by the grass surface imaging mechanism 21, position and numerical value information analyzed by the grass surface analysis mechanism 25, position, image, numerical value, and text information acquired by the growth information collection mechanism 22, position and numerical value information analyzed by the growth information analysis mechanism 26, position and numerical value information obtained from the environment sensing mechanism 23, numerical value information from the cultivation method improvement mechanism 28, and others. Besides, the sensing information database 27 accumulates meteorological numerical information presented by the Meteorological Agency or the like together with a position and a time at which the information is generated.

In addition, the sensing information database 27 may accumulate information indicating work contents of management work determined by the work contents determination mechanism 29, information stored in the sensing information database 27 and the cultivation method database 24 and referred to at the time of determination of the work contents, and information acquired by the grass surface imaging mechanism 21, the growth information collection mechanism 22, and the environment sensing mechanism 23 after execution of the work contents (i.e., information indicating effects produced by execution of the determined work) in association with each other as result information associated with the work contents.

Specifically, as depicted in FIG. 32, a facility information table, a meteorological information table, a grass image analysis information table, an environment sensing information table, and a grass growth information table are stored in the sensing information database 27.

For example, the facility information table stores information common to all parts of the grass management system 11. As depicted in the figure, the facility information table stores a facility name, a facility type, and a district in which the facility is located, in association with each other.

In addition, each of the meteorological information table, the grass image analysis information table, the environment sensing information table, and the grass growth information table stores information different for each facility.

As depicted in the figure, the meteorological information table stores a date of generation of meteorological information, a temperature, a humidity, a wind speed, and a wind direction in association with each other. In addition, the grass image analysis information table stores a date of execution of analysis, a position of a divisional region, a grass leaf covering ratio, a solar radiation amount, a trampling pressure grass damage ratio, and a harmful animal grass damage ratio in association with each other.

Similarly, the environment sensing information table stores a date of acquisition of sensor information, a sensor position, a soil temperature, a soil moisture, soil pH, soil EC, and a grass surface temperature in association with each other. Furthermore, the grass growth information table stores a date of acquisition of growth information, a position of acquisition of growth information, grass leaf hardness, a mowing waste amount, soil hardness, a grass root length, a grass root thickness, grass root density, a grass root automatic evaluation value, a grass root subjective evaluation value, a number of occurrence of weeds, and a number of occurrence of diseases in association with each other.

In this case, a more preferable grass cultivation method can be provided or a future prediction can be made according to an environment of each district, a purpose, or the like on the basis of the information stored in the sensing information database 27 and used by the cultivation method improvement mechanism 28.

<Configuration Example of Cultivation Method Database>

The cultivation method database 24 stores information associated with cultivation of vegetation. For example, existing learning models associated with cultivation methods, such as a light amount and a wavelength suited for cultivation and suited temperature management and fertilizer, and new rules and learned models of new neural network models as new models improved by the cultivation method improvement mechanism 28 are accumulated in the cultivation method database 24, according to a grass type, a season, a district of cultivation, and a purpose of use of grass such as soccer and rooftop greening. In this manner, the cultivation method database 24 is allowed to provide necessary information with respect to grass cultivation.

Moreover, the cultivation method database 24 stores two types of information, i.e., a rule-based method which defines conditions and values of the conditions and a neural net method having completed modeling after a learning course.

For example, as depicted in FIG. 33, the cultivation method database 24 stores various types of information for the rule-based method.

More specifically, a wavelength for radiation with LED light, a soil moisture amount (target moisture) and a soil temperature (target ground temperature) as targets to be maintained, and the like are recorded in the cultivation method database 24 according to a grass type, a cultivation district, and a usage of grass. Moreover, these types of information are provided according to cultivation purpose classification, such as whether or not grass grows by normal cultivation or by forcing cultivation for restoring a damaged portion in an early stage, and whether a seasonal transition is to be performed.

Presented in an example depicted in FIG. 33 is a cultivation classification table in a case of selection of bent grass as the grass type, Tokyo as the cultivation district, and a position before a soccer goal as the purpose of use.

In addition, as depicted in FIG. 34, the cultivation method database 24 stores initial rules used as initial values of these types of information by the rule-based method. FIG. 34 depicts an example of rules for determining work to be performed in a case of lowering the grass leaf covering ratio, on the basis of image analysis by the grass surface analysis mechanism 25. It is determined whether deterioration of grass has been caused by insufficiency of solar radiation, trampling stress during a game or the like, or a disease.

First, rules are selected according to a district and a purpose of use. In a case where a grass leaf covering ratio in a certain grass region lies in a range between 81% and 90%, for example, a soil moisture amount of 27% is selected as contents of the rules with reference to a second table from the top in FIG. 34. Then, in a case where a solar radiation amount at the same spot obtained by image analysis of the grass surface analysis mechanism 25 is 7001 or larger as a subsequent condition, for example, reference to a subsequent condition is selected with reference to a third table from the top in FIG. 34. Thereafter, a trampling pressure grass damage ratio (fourth table from the top in FIG. 34) and a harmful animal grass damage ratio (fifth table from the top in FIG. 34) are sequentially determined to determine contents to be performed as work.

In this manner, rules stored in the cultivation method database 24 are updated along with generation of new rules by the cultivation method improvement mechanism 28 in association with sequential and continuous updating of contents of the sensing information database 27.

Moreover, as depicted in FIG. 35, the cultivation method database 24 stores information for the neural network method (learning data and teacher data).

According to an example depicted in FIG. 35, the cultivation method database 24 stores a learned model in a case where a trampling pressure grass damage ratio used by the grass surface analysis mechanism 25 is an analysis target, a learned model for analyzing a harmful animal grass damage ratio used by the grass surface analysis mechanism 25, a learned model for analyzing an evaluation value of grass roots used by the growth information analysis mechanism 26, and the like. Furthermore, the cultivation method database 24 is allowed to store a neural network model newly developed or learned by the cultivation method improvement mechanism 28.

<Configuration Example of Cultivation Method Improvement Mechanism>

The cultivation method improvement mechanism 28 acquires various analysis methods related to a grass state by discovering new rules concerning grass cultivation and management or performing learning using a neural network model, with use of a statistical analysis method such as a multivariate analysis on the basis of image, numerical value, or text information accumulated in the sensing information database 27. For example, in a case of use of the statistical analysis method, a multivariate analysis reflecting ideas of a service provider, a user, or the like is performed with respect to contents of the sensing information database 27, and correction to a value considered to be appropriate is performed. In this manner, improvement of the cultivation method is sought. In addition, in a case of execution of learning using a neural network model, further learning is performed for new data added to the sensing information database 27 as teacher data. In this manner, improvement of the cultivation method is sought. The cultivation method improvement mechanism 28 further accumulates new rules and neural network models for which learning has been completed, in the cultivation method database 24.

For example, the cultivation method improvement mechanism 28 updates existing rules and learns a neural network model with respect to rules related to a grass cultivation method, a method of predicting a trampling pressure grass damage ratio or a harmful animal grass damage ratio to predict a grass state, and the like by using sequentially collected contents of the sensing information database 27.

In addition, the cultivation method improvement mechanism 28 updates existing rules related to the cultivation method in a case explained below.

For example, the initial rules explained above with reference to FIG. 34 indicate contents to be performed for the values of the grass leaf covering ratio, the solar radiation amount, the trampling pressure grass damage ratio, and the harmful animal grass damage ratio according to the district where the facility is located and the purpose of use. However, application of these rules is not necessarily appropriate for all facilities.

For example, an annual average temperature in eastern Japan is different from that in western Japan. Accordingly, this difference needs to be taken into consideration in grass cultivation. Moreover, in a high temperature environment, grass attempts to lower its temperature through transpiration from leaves. For this purpose, a sufficient amount of moisture needs to be supplied to roots. However, an excessive amount of moisture given to roots may cause root rot.

Moreover, in a state where information from every region of the country is accumulated in the sensing information database 27, statistical analysis including regional differences can be made with respect to a relation between a grass leaf covering ratio and a soil moisture amount.

For example, as for the initial rule of the grass leaf covering ratio depicted in FIG. 34, the soil moisture is set to 22% to produce a grass leaf covering ratio of 91% or higher. On the other hand, in a case where an average value of moisture amounts is 30% when moisture amounts are collected at all spots where the grass leaf covering ratio is 91% or higher in a facility located in a specific district, it is preferable to change the initial rule from 22% to 30%.

Note that the relation between the grass leaf covering ratio and the soil moisture used for description here is presented only by way of example. It is obvious that determination and improvement of the initial rule are allowed to be made in consideration of a plurality of other items.

As described above, the neural network model learned by the cultivation method improvement mechanism 28 is used by the grass surface analysis mechanism 25 for analyzing a trampling pressure grass damage ratio and a harmful animal grass damage ratio and used by the growth information analysis mechanism 26 for analyzing a grass root evaluation value. Moreover, the cultivation method improvement mechanism 28 is allowed to use data accumulated in the sensing information database 27, as learning data and teacher data for these types of learning of the neural network model.

In addition, there is NDVI as an index for representing a state of a grass surface. The cultivation method improvement mechanism 28 performs learning by using NDVI as teacher data and using a solar radiation amount, a grass leaf covering ratio, a trampling pressure grass damage ratio, a harmful animal grass damage ratio, a grass root evaluation value, a grass surface temperature, soil moisture, a soil temperature, and the like as learning data. In this manner, the cultivation method improvement mechanism 28 can acquire an equivalent index without measuring NDVI.

Note that the index for representing a grass surface state is not particularly limited to NDVI. Other known vegetation indexes such as EVI (Enhanced Vegetation Index) and PRI (Photochemical Reflectance Index) may be used as teacher data. In this case, an equivalent index can be acquired by learning in a similar manner without necessity of measurement.

The timing for executing the cultivation method improvement mechanism 28 here is not particularly limited. The cultivation method improvement mechanism 28 may be executed every time information is added to the sensing information database 27. Alternatively, the cultivation method improvement mechanism 28 may be executed at timing when the user inputs teacher data to the sensing information database 27 via a terminal apparatus such as a tablet, timing designated by the user, or any timing set beforehand, such as every one month, for example.

<Configuration Example of Work Contents Determination Mechanism>

The work contents determination mechanism 29 determines work contents of management work to be performed subsequently to maintain high quality of grass with reference to information stored in the sensing information database 27 and the cultivation method database 24 and gives instructions on the determined work contents together with the position of the grass surface. For example, adopted as the work contents to be determined by the work contents determination mechanism 29 is at least one of radiation of artificial light, setting of heater or cooler inside the ground, watering, insecticide distribution, fungicide distribution, fertilizer distribution, deployment of a curing sheet, lawn mowing, weed removal, and harmful animal removal each performed for all or part of a region of the grass surface.

In addition, the work contents determination mechanism 29 is capable of determining specific work contents necessary for the course of grass cultivation with reference to a database. Examples of a work start method include deadline-based work and event-based work. For example, as the deadline-based work, the work contents determination mechanism 29 determines work items to be started at regular intervals such as designated time, date, week, month, year, and the like (e.g., designated time for each day and designated time for each weekend). Moreover, as the event-based work, the work contents determination mechanism 29 determines work items to be started according to an analysis result obtained by the grass surface analysis mechanism 25 or the growth information analysis mechanism 26 or a change of sensor information (e.g., temperature, humidity, ground temperature, and soil moisture).

The deadline-based work will first be explained.

The work contents determination mechanism 29 calculates an integrated solar radiation amount of a corresponding date with reference to the sensing information database 27 at an end of the date, acquires data regarding an insufficient solar radiation amount from the cultivation method database 24 and determines a position and a time to be supplemented by an LED during nighttime. Moreover, the work contents determination mechanism 29 acquires data regarding selection and a ratio of a wavelength of an LED used for radiation from the cultivation method database 24 and determines the acquired data regarding selection and ratio in a case where a change of grass growth is desired such as an area in the vicinity of a center circle or before a goal.

Furthermore, the work contents determination mechanism 29 determines, on the basis of a predicted grass damage ratio and a grass leaf covering ratio obtained after each end of various events, distribution of a fertilizer for a region where only a predicted damage ratio is undesirable, radiation of LED light in a case where the grass leaf covering ratio is a certain value or higher, and a position of grass to be re-covered in a case where the grass leaf covering ratio is a certain value or lower.

The work contents determination mechanism 29 is allowed to determine the deadline-based work in the manner described above.

Figure 36:
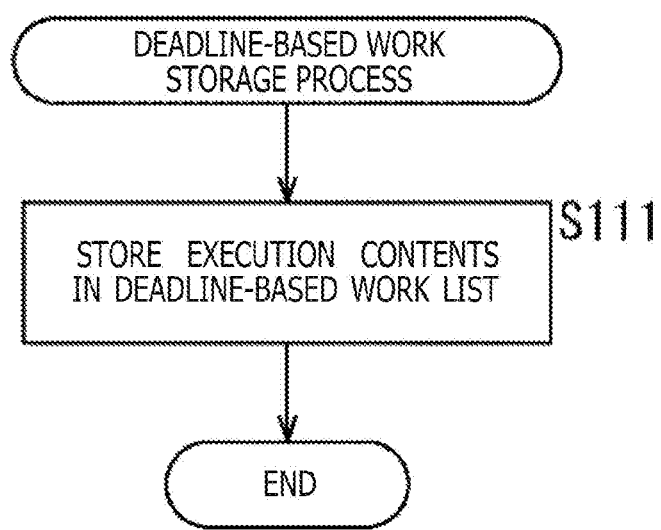
FIG. 36 is a flowchart explaining a deadline-based work storage process.

A deadline-based work storage process performed by the work contents determination mechanism 29 will be explained with reference to a flowchart depicted in FIG. 36. In step S111, the work contents determination mechanism 29 stores execution contents in a deadline-based work list as depicted in FIG. 37. Thereafter, the deadline-based work storage process ends.

As depicted in FIG. 37, the deadline-based work list stores execution contents of work performed at a corresponding time for each execution timing, such as each start time.

Figure 38:
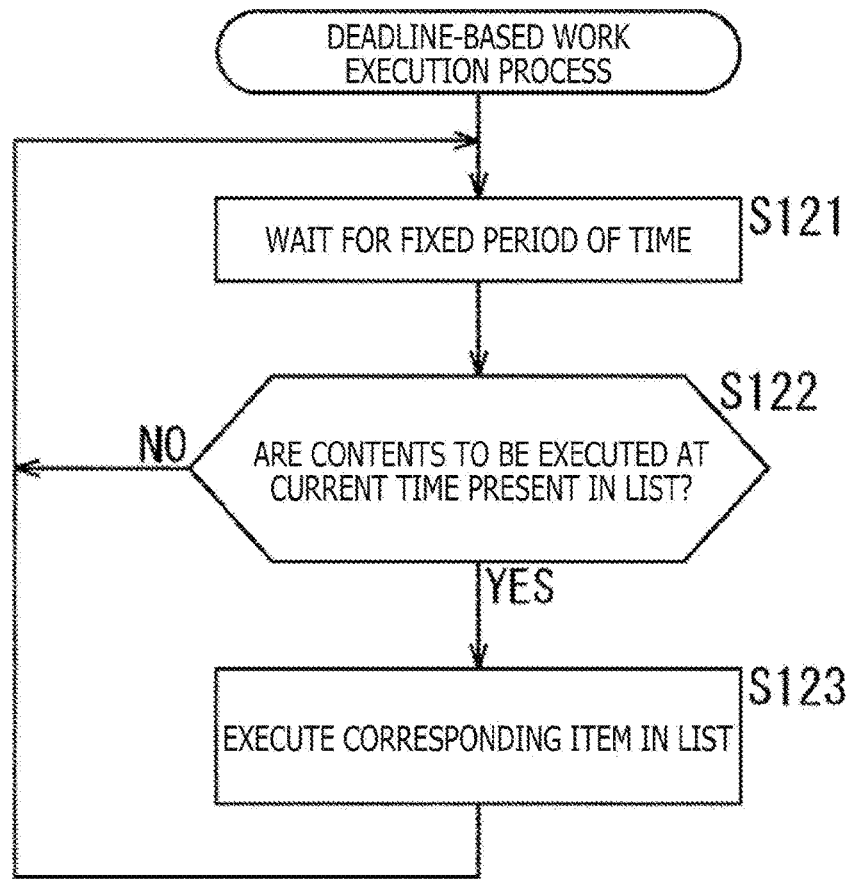
FIG. 38 is a flowchart explaining a deadline-based work execution process.

A deadline-based work execution process performed by the work contents determination mechanism 29 will be explained with reference to a flowchart depicted in FIG. 38.

In step S121, the work contents determination mechanism 29 waits for a certain period of time. Thereafter, the work contents determination mechanism 29 determines whether or not the deadline-based work list (FIG. 37) includes contents to be executed at the current time, in step S122.

In a case where the deadline-based work list is determined to include contents to be executed at the current time in step S122, the work contents determination mechanism 29 executes a corresponding item in the deadline-based work list in step S123.

On the other hand, in a case where the deadline-based work list is not determined to include contents to be executed at the current time, in step S122, or after processing in step S123 is completed, the process returns to step S121. Thereafter, similar processing is repeated.

Next, the event-based work will be explained.

The work contents determination mechanism 29 sequentially determines a water amount to be sprinkled, on the basis of current ground temperature, air temperature, and soil moisture amount, to reduce stress imposed on the grass by a rapid change of the ground temperature. Moreover, the work contents determination mechanism 29 predicts a sharp drop of soil moisture as a result of an increase in transpiration of the grass, on the basis of a change rate of air temperature or soil temperature increase stored in the sensing information database 27, and performs determination for identification of a watering position and watering with a watering amount without producing waste. Furthermore, the work contents determination mechanism 29 detects a presence of an animal such as a bird on the grass during curing on the basis of an analysis result obtained by the grass surface analysis mechanism 25 and guides the animal away from the grass by sprinkling water.

The work contents determination mechanism 29 is allowed to determine the event-based work in the manner described above.

Figure 39:
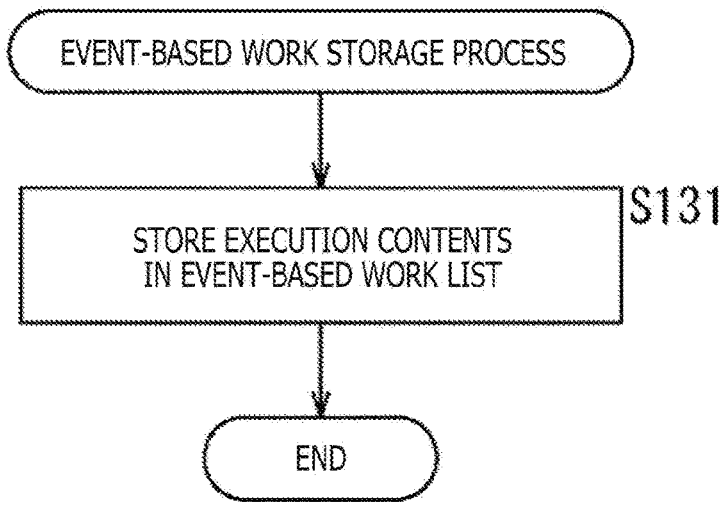
FIG. 39 is a flowchart explaining an event-based work storage process.

An event-based work storage process performed by the work contents determination mechanism 29 will be explained with reference to a flowchart depicted in FIG. 39. In step S131, the work contents determination mechanism 29 stores execution contents in an event-based work list as depicted in FIG. 40. Thereafter, the event-based work storage process ends.

As depicted in FIG. 40, the event-based work list stores execution contents of work to be performed at the time of occurrence of a corresponding event for each monitoring event.

Figure 41:
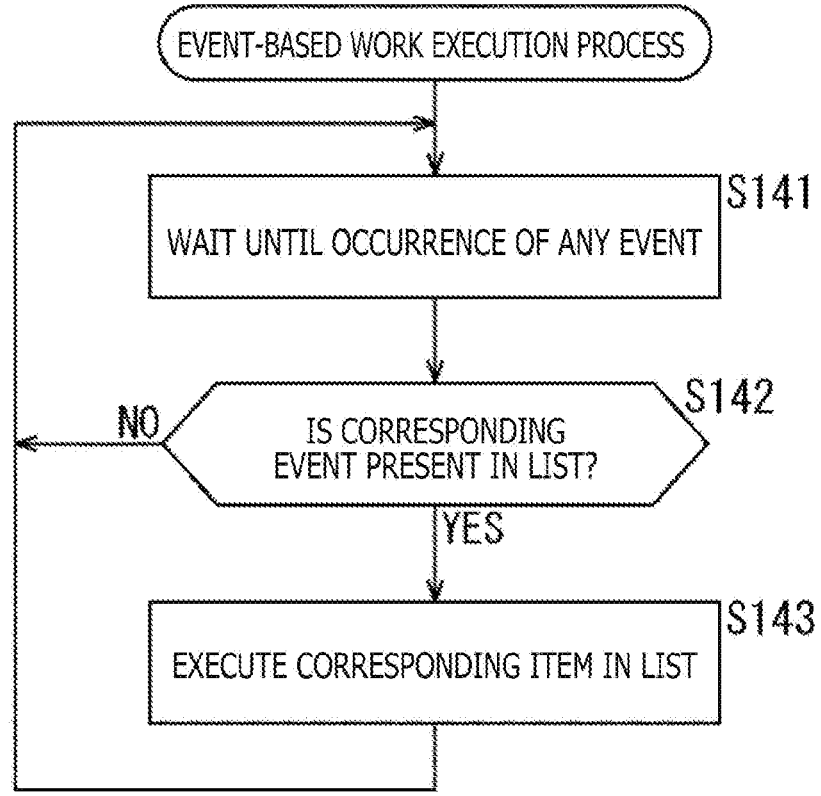
FIG. 41 is a flowchart explaining an event-based work execution process.

An event-based work execution process performed by the work contents determination mechanism 29 will be explained with reference to a flowchart depicted in FIG. 41.

In step S141, the work contents determination mechanism 29 waits until occurrence of any event. Thereafter, the work contents determination mechanism 29 determines whether or not the event-based work list (FIG. 40) includes the corresponding event, in step S142.

In a case where the event-based work list is determined to include the corresponding event, in step S142, the work contents determination mechanism 29 executes a corresponding item in the event-based work list in step S143.

On the other hand, in a case where the event-based work list is not determined to include the corresponding event, in step S142, or after processing in step S143 is completed, the process returns to step S141. Thereafter, similar processing is repeated.

<Configuration Example of Work Mechanism>

The work mechanism 30 presents a work instruction to a user who manages a facility, via a presentation unit of a terminal apparatus such as a tablet type computer and a personal computer, according to work contents and a position determined by the work contents determination mechanism 29. In addition, for example, the work mechanism 30 outputs information associated with various types of actual work to be performed by a work apparatus such as a light supplementing device and a robot device.

Figure 42:
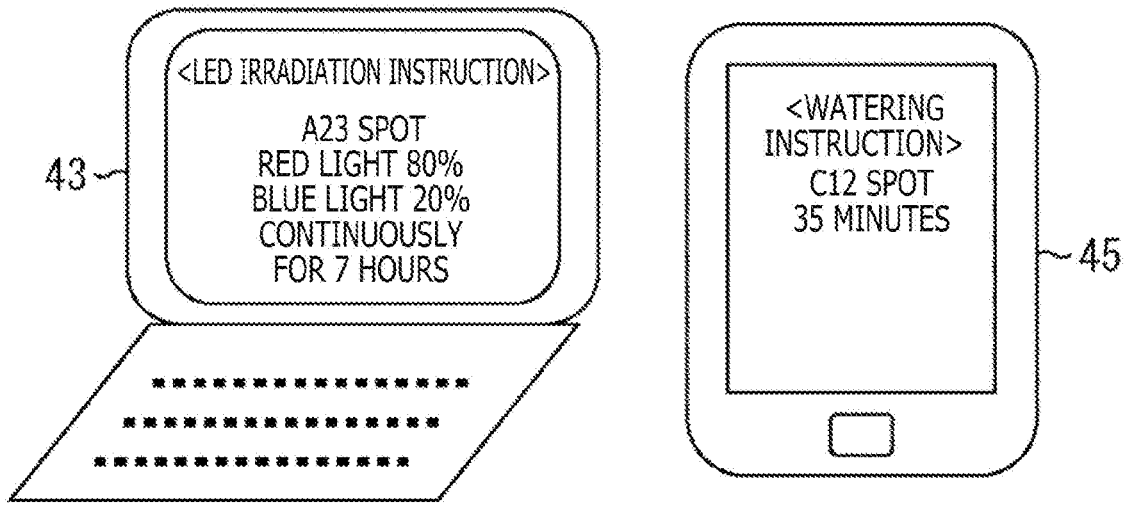
FIG. 42 is a diagram depicting an example of a terminal used as a work mechanism.

FIG. 42 depicts the personal computer 43 and the tablet type computer 45 as an example of a presentation unit used as the work mechanism 30. An instruction on specific work contents can be issued to the user using the grass management system 11 by the use of these terminals. Note that the issue of the instruction is not limited to the use of the terminals depicted in the figure herein.

Figure 43:
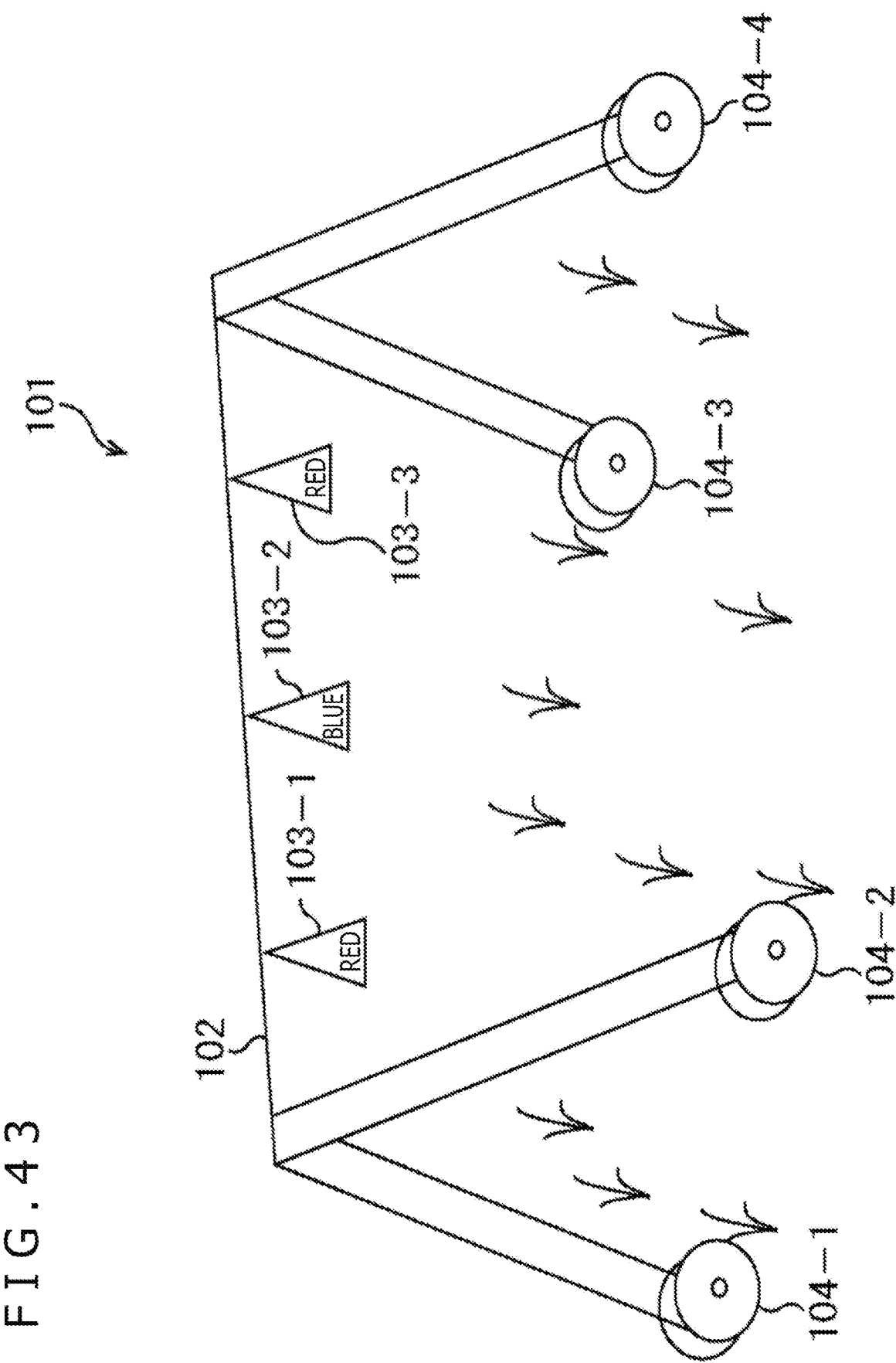
FIG. 43 is a diagram explaining a portable lighting apparatus.

FIG. 43 depicts a portable lighting apparatus 101 as an example of a work apparatus used as the work mechanism 30. The portable lighting apparatus 101 is capable of radiating the grass surface with LED light from plural LEDs 103 (three LEDs 103-1 to 103-3 in the example of FIG. 43) fixed to a frame 102. In addition, the portable lighting apparatus 101 is configured to be movable using moving mechanisms 104-1 to 104-4 each including a tire or the like, for example.

For example, the portable lighting apparatus 101 is allowed to be moved to a position designated by the user having checked work contents performed by the personal computer 43, the tablet type computer 45, or the like depicted in FIG. 42 and to emit light at a designated time to irradiate the grass surface with LED light. In a case where the portable lighting apparatus 101 includes an autonomously movable mechanism, note that the portable lighting apparatus 101 is allowed to autonomously move to a designated position and emit light at a designated time to irradiate the grass surface with LED light according to work contents determined by the work contents determination mechanism 29, without intervention by the user.

Figure 44:
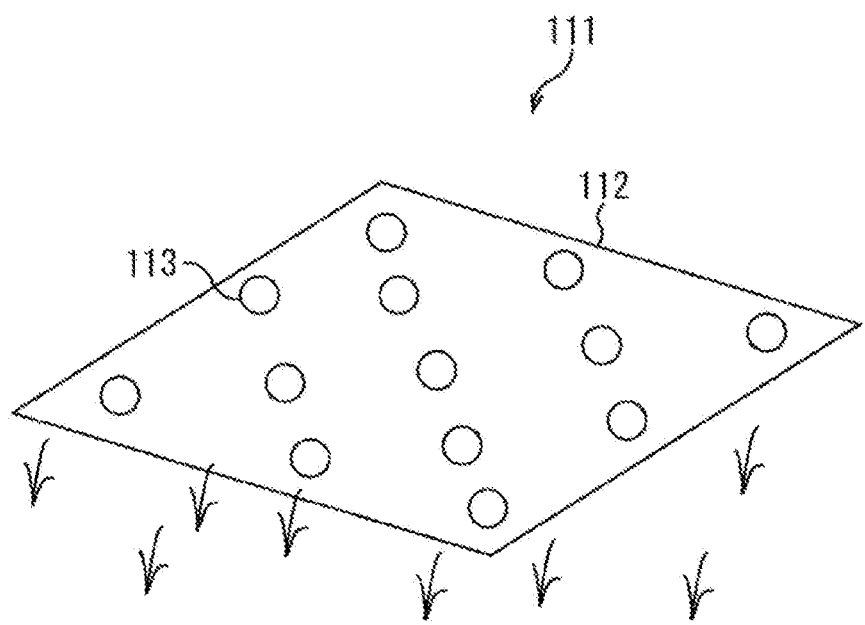
FIG. 44 is a diagram explaining a sheet-type lighting apparatus.

FIG. 44 depicts a sheet-type lighting apparatus 111 as an example of a work apparatus used as the work mechanism 30. The sheet-type lighting apparatus 111 is capable of irradiating grass surfaces of various places and various areas with LED light by using plural LEDs 113 attached to one surface of a flexible sheet material 112. In addition, the sheet-type lighting apparatus 111 is capable of concurrently retaining heat necessary for grass by covering the grass surface with the sheet material 112.

Figure 45:
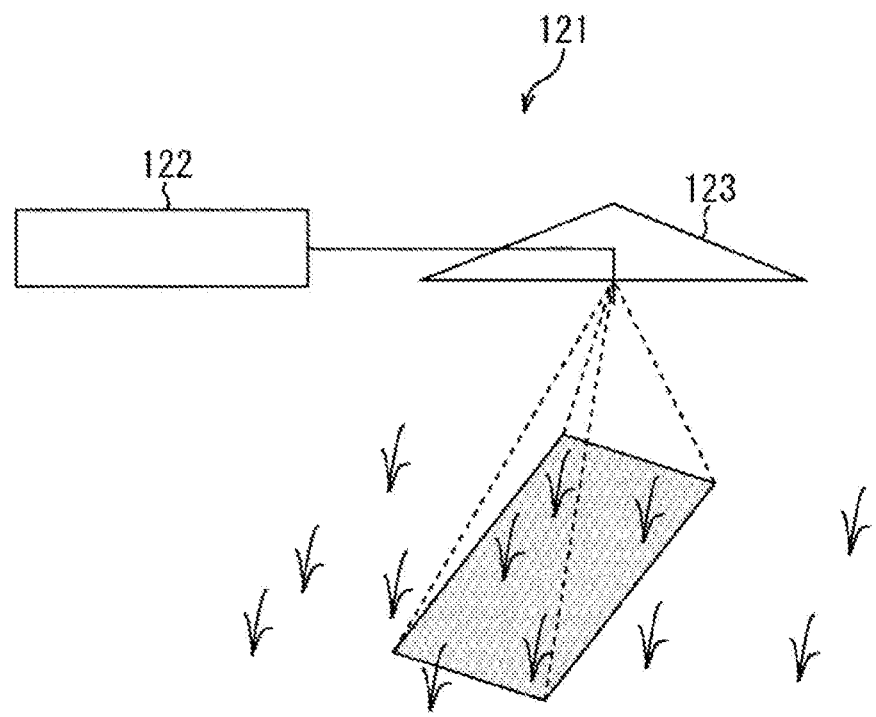
FIG. 45 is a diagram explaining a laser-scanner-type lighting apparatus.

FIG. 45 depicts a laser-scanner-type lighting apparatus 121 as an example of a work apparatus used as the work mechanism 30. The lighting apparatus 121 includes a combination of a multicolor laser light source 122 and a scanner 123 and is capable of irradiating any position of the grass surface with laser light output from the multicolor laser light source 122 by using the scanner 123. The lighting apparatus 121 thus configured does not require labor for movement unlike the portable lighting apparatus 101 depicted in FIG. 43.

Moreover, the lighting apparatus 121 is capable of sequentially changing power or a wavelength of laser light to change growth of grass or a leaf color and expressing a team logo by using grass leaves, for example. Furthermore, the lighting apparatus 121 is capable of performing growth suppression of grass, sterilization, weeding, and the like by using ultraviolet laser.

Figure 46:
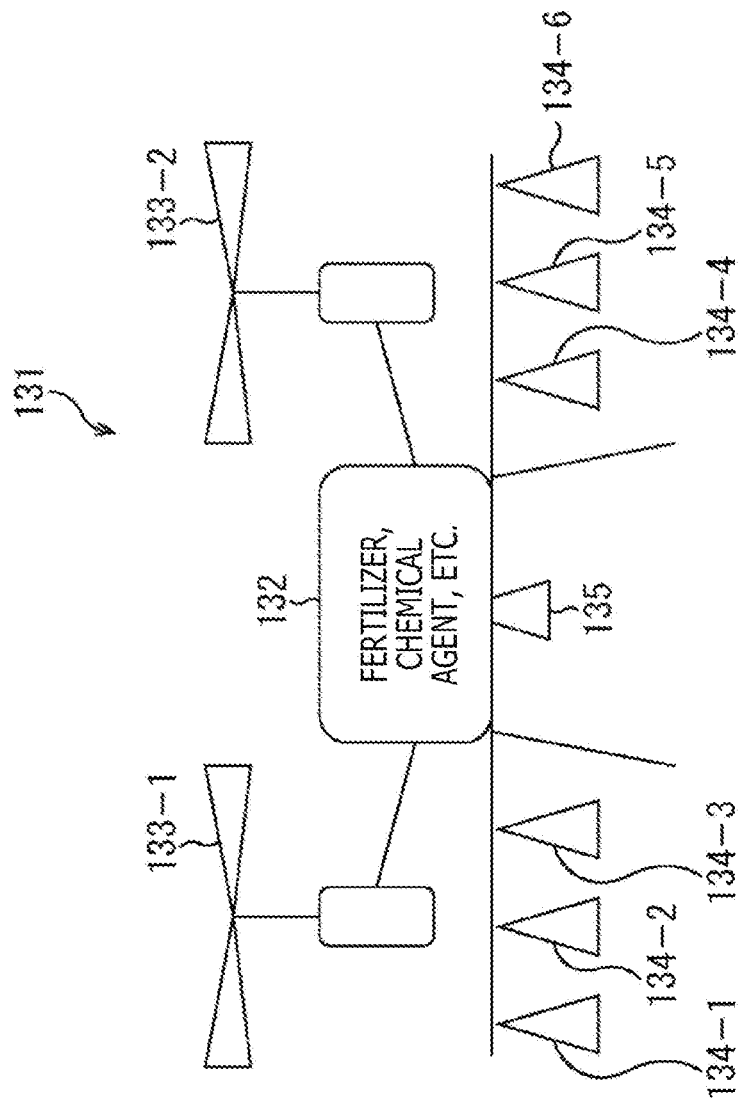
FIG. 46 is a diagram explaining a compact unmanned aerial vehicle.

FIG. 46 depicts a compact unmanned aerial vehicle (what is generally called a drone) 131 having an independent navigation function, as an example of the work apparatus used as the work mechanism 30. As depicted in the figure, the compact unmanned aerial vehicle 131 is capable of flying using rotors 133-1 and 133-2 attached to a vehicle body 132, radiating LED light from lighting units 134-1 to 134-6, and distributing fertilizers, chemical agents, and the like from a distribution port 135. The compact unmanned aerial vehicle 131 thus configured is capable of executing work contents determined by the work contents determination mechanism 29, without intervention of the user.

Note that the work apparatus used as the work mechanism 30 is not limited to the apparatuses depicted in FIGS. 43 to 46 and may be various work apparatuses.

The cultivation method improvement mechanism 28 here is also allowed to perform learning by a neural network model with use of work contents result information as teacher data and information stored in the sensing information database 27 and the cultivation method database 24 and referred to at the time of determination of work contents, as learning data, to update a learning model related to a cultivation method. Note that learning may be executed at a time designated by the user or may sequentially be executed at any timing set beforehand, such as one week after determination of work contents by the work contents determination mechanism 29.

<Imaging Area Division Method>

Explained with reference to FIGS. 47 to 50 will be an example of a division method for dividing a grass surface into plural imaging areas at the time of imaging the grass surface with use of the camera 41 of the grass surface imaging mechanism 21.

For example, prediction result values of a grass leaf covering ratio, a trampling pressure grass damage ratio, and a harmful animal grass damage ratio obtained by the grass surface analysis mechanism 25 can be associated with each of plural imaging areas as divisions of a grass surface. In a case where the resolution of the image sensor included in the camera 41 of the grass surface imaging mechanism 21 is sufficiently high for an entire imaging area, settings of these imaging areas are allowed to be freely determined according to grass work, the area to be evaluated, or the like as in the division method explained hereinafter.

For example, for executing ordinary work, the grass surface is dividable into plural imaging areas by a first division method which simply divides the imaging area into equal areas. Moreover, the grass surface is dividable into plural imaging areas by a second division method which divides the imaging area for each of work ranges corresponding to a work apparatus, such as each of irradiation areas by the lighting apparatus 101 depicted in FIG. 43. Furthermore, as described with reference FIG. 9, the grass surface is dividable into plural imaging areas by a third division method which divides the imaging area for each of sensing ranges of the sensors 51 provided under the ground surface.

Figure 47:
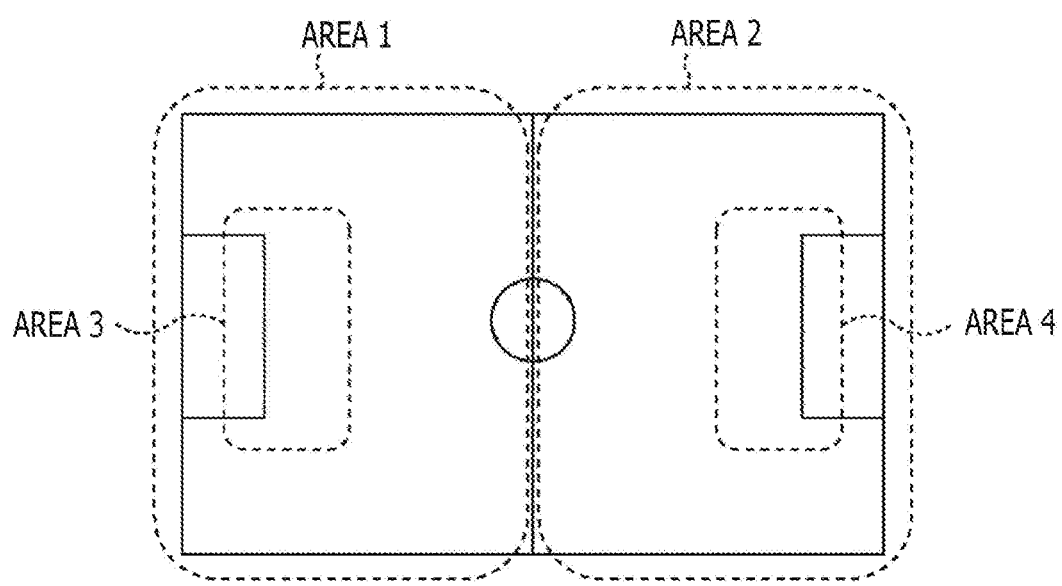
FIG. 47 is a diagram explaining a division method for dividing an imaging area into specific areas.

In addition, the grass surface is dividable into plural imaging areas by a fourth division method which divides the imaging area into respective specific areas in a soccer pitch grass surface as depicted in FIG. 47. For example, the entire grass surface is divided into half areas (e.g., entire home side and entire away side) as imaging areas of an area 1 and an area 2 with a boundary located on a half line. Specific areas such as areas before goals are defined as imaging areas of an area 3 and an area 4 for the area 1 and area 2, respectively.

Figure 48:
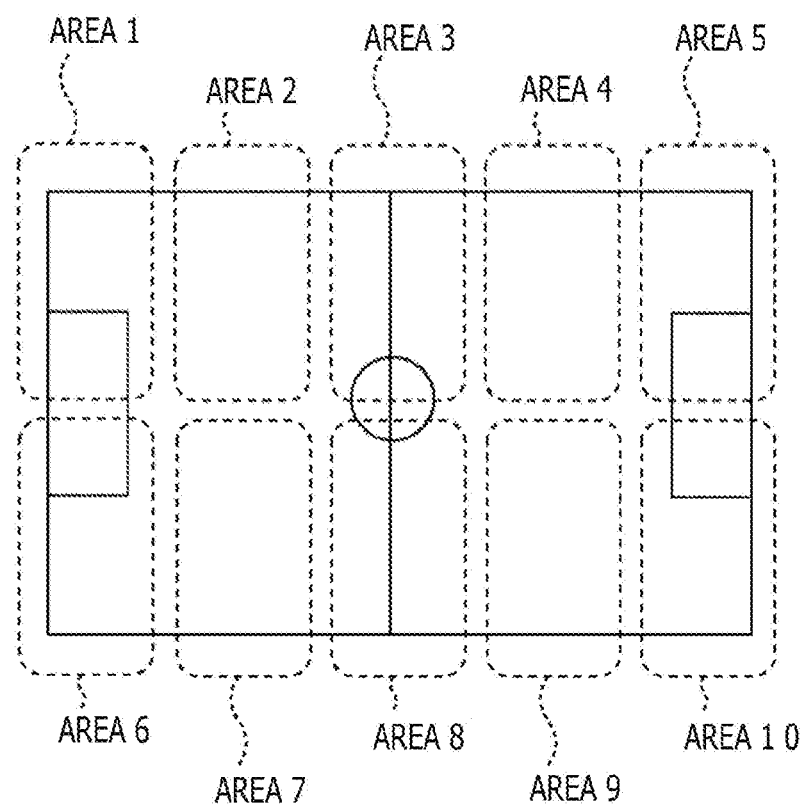
FIG. 48 is a diagram explaining a division method for dividing an imaging area into specific areas.

Furthermore, for promoting transpiration from grass leaves, a soccer pitch grass surface as depicted in FIG. 48 is dividable into long and narrow imaging areas such that wind from a blower reaches the imaging areas from the outside of a touch line, for example. More specifically, in the example depicted in FIG. 48, the grass surface is divided into five long and narrow areas arranged on each side of the soccer pitch grass surface and extending toward the center from the touch line on each side to divide the imaging area into areas 1 to 10.

As depicted in FIGS. 47 and 48, the grass surface is dividable into plural imaging areas according to a purpose of use, i.e., a soccer pitch grass surface.

Figure 49:
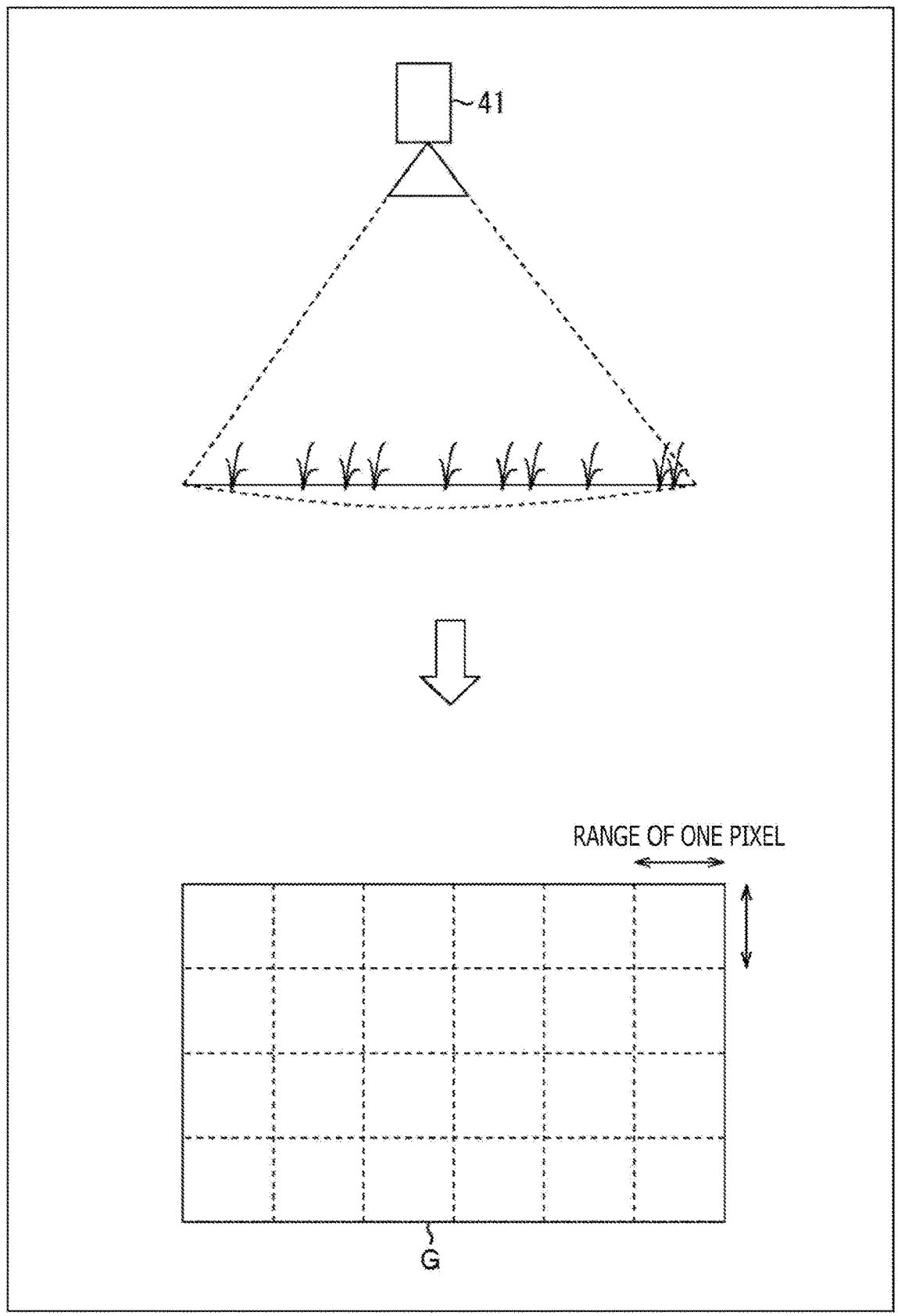
FIG. 49 is a diagram explaining an example of division of an imaging area at the time of imaging in a vertical direction with respect to a grass surface.
Figure 50:
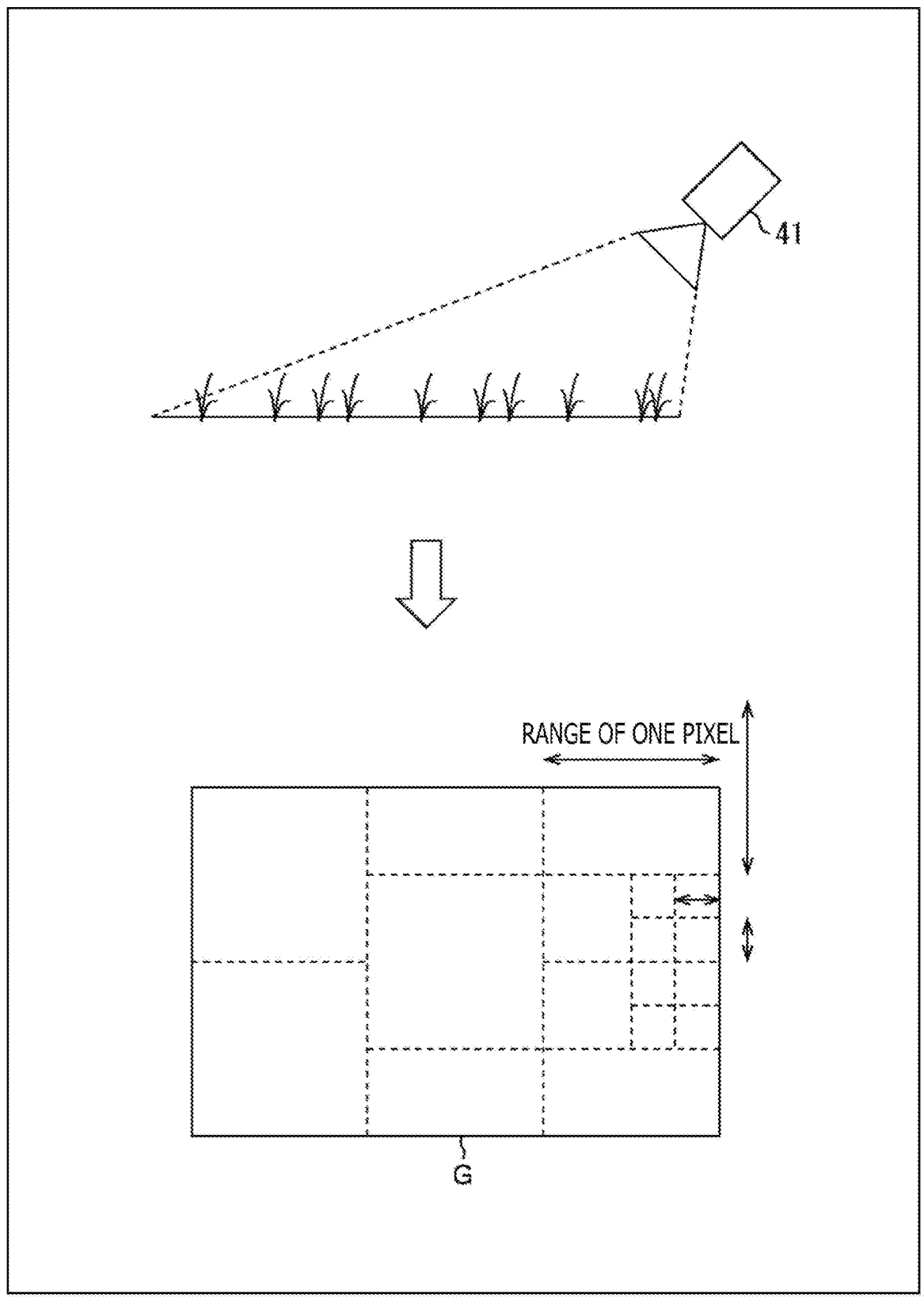
FIG. 50 is a diagram explaining an example of division of the imaging area at the time of imaging in an inclined direction with respect to the grass surface.

In addition, as depicted in FIGS. 49 and 50, the imaging area may be divided according to an imaging direction with respect to the grass surface.

For example, as depicted in an upper part of FIG. 49, such an environment that a distance from the camera 41 to a grass surface G becomes substantially constant is produced when an image is captured by the camera 41 in the vertical direction with respect to the grass surface G. Accordingly, as depicted in a lower part of FIG. 49, a range of the grass surface per one pixel is equalized when the imaging area is divided into equal areas with respect to the grass surface G.

On the other hand, as depicted in an upper part of FIG. 50, such an environment that a distance from the camera 41 to the grass surface G considerably differs is produced when an image is captured by the camera 41 in an inclined direction with respect to the grass surface G. Accordingly, as depicted in a lower part of FIG. 49, a range of a grass surface per one pixel located far from the camera 41 is considerably different from a range of a grass surface per one pixel located close to the camera 41. The range of the grass surface per one pixel located far from the camera 41 is wide, while the range of the grass surface per one pixel located close to the camera 41 is narrow. Accordingly, in a case of performing imaging by the camera 41 in an inclined direction with respect to the grass surface G, the two or more cameras 41 are preferably used to capture images from opposite sides as described with reference to FIG. 6 and to thereby avoid a considerable difference of the range of the grass surface per one pixel.

As described above, the user of the grass management system 11 is capable of producing grass having constant quality by using the grass management system 11 even if the user does not have deep know-how for grass cultivation. In addition, sophisticated know-how for achieving high grass quality can be accumulated in the cultivation method database 24 of the grass management system 11, as reusable knowledge.

Moreover, the grass management system 11 is capable of quantifying a solar radiation state of a grass surface by using not a special camera for acquiring an image having a specific narrow bandwidth but the camera 41 which captures an image based on ordinary visible light. Similarly, the grass management system 11 is capable of obtaining a current state and predicting a future state related to growth of grass by using the ordinary camera 41.

Furthermore, the grass management system 11 is capable of rapidly restoring a grass surface damaged by games or occurrence of diseases, weeds, or the like and contributing to improvement of a facility operating rate and maintenance of a fine appearance by determining appropriate work contents according to a grass surface state, for example. In addition, the grass management system 11 is capable of decreasing labor costs necessary for management of grass.

Moreover, the grass management system 11 is capable of changing output of light applied to the grass surface, an irradiation time, and a wavelength by issuing an instruction to the portable lighting apparatus 101 depicted in FIG. 43, the sheet-type lighting apparatus 111 depicted in FIG. 44, the laser-scanner-type lighting apparatus 121 depicted in FIG. 45, or the like, for example. In this manner, the grass management system 11 is capable of creating different grass growth states. For example, the grass management system 11 is capable of achieving separated grass cultivation in such a manner that grass producing a strong root spread grows in an area before a goal and that grass allowing easy rolling of a ball grows in the other area in a soccer pitch grass surface.

Furthermore, as explained with reference to FIG. 3, the grass management system 11 is allowed to distribute the cultivation method database 24, the grass surface analysis mechanism 25, the growth information analysis mechanism 26, the sensing information database 27, the cultivation method improvement mechanism 28, and the work contents determination mechanism 29 by using a plurality of information processing apparatuses connected in a network, to constitute the grass management system 11. In this manner, expenses required for the user using the grass management system 11 can be reduced.

Note that the present technology preferably applied to the grass management system 11 for grass management as explained in the present embodiment is not limited to this application and is also applicable to management of various vegetations such as ordinary trees, fields, gardening, farms, and pastures.

<Configuration Example of Computer>

Note that the respective processes explained with reference to the above flowcharts are not necessarily required to be performed in time series in the order described in the flowcharts and include processes executed in parallel or individually (e.g., parallel processes or processes by an object). Moreover, programs may be processed by one CPU or distributed to and performed by a plurality of CPUs.

Furthermore, a series of processes described above (information processing method) may be executed by either hardware or software. In a case where the series of processes is executed by software, a program constituting the software is installed from a program recording medium where the program is recorded into a computer incorporated in dedicated hardware, a computer such as a general-purpose personal computer capable of executing various functions under various programs installed into the computer, or the like.

Figure 51:
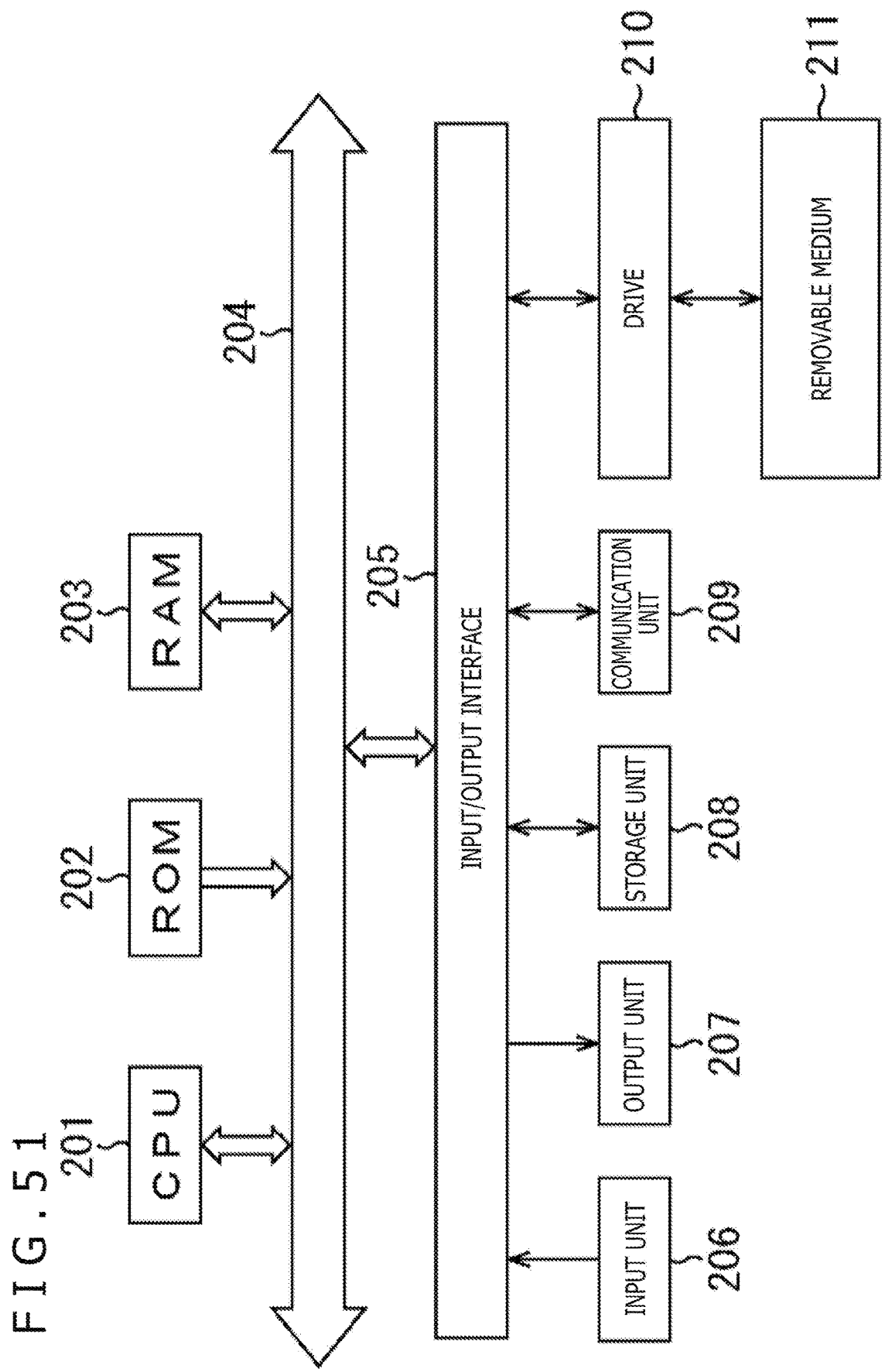
FIG. 51 is a block diagram depicting a configuration example of a computer according to one embodiment to which the present technology is applied.

FIG. 51 is a block diagram depicting a configuration example of hardware of a computer which executes the series of processes described above under a program.

In the computer, a CPU (Central Processing Unit) 201, a ROM (Read Only Memory) 202, and a RAM (Random Access Memory) 203 are connected to each other via a bus 204.

Further, an input/output interface 205 is connected to the bus 204. An input unit 206 including a keyboard, a mouse, a microphone, and the like, an output unit 207 including a display, a speaker, and the like, a storage unit 208 including a hard disk, a non-volatile memory, and the like, a communication unit 209 including a network interface and the like, and a drive 210 which drives a removable medium 211 including a magnetic disk, an optical disk, a magneto-optical disk, a semiconductor memory, or the like are connected to the input/output interface 205.

In the computer configured as above, the CPU 201 loads the program stored in the storage unit 208 via the input/output interface 205 and the bus 204 into the RAM 203 and executes the loaded program to perform the series of processes described above, for example.

The program to be executed by the computer (CPU 201) is recorded in the removable medium 211 which is a package medium including a magnetic disk (including flexible disk), an optical disk (CD-ROM (Compact Disc-Read Only Memory), a DVD (Digital Versatile Disc), or the like), a magneto-optical disk, a semiconductor memory, or the like, or is provided via a wired or wireless transmission medium such as a local area network, the Internet, and digital satellite broadcasting, for example.

In addition, the program is installable into the storage unit 208 via the input/output interface 205 in a state where the removable medium 211 is attached to the drive 210. Furthermore, the program is receivable by the communication unit 209 via a wired or wireless transmission medium and is installable into the storage unit 208. Besides, the program is installable into the ROM 202 or the storage unit 208 beforehand.

<Configuration Combination Examples>

Note that the present technology may also have following configurations.

(1)

An information processing apparatus including:

an analysis unit that analyzes, as at least input information, an image in which vegetation corresponding to a target of management is captured; and a determination unit that determines work contents to be performed for the vegetation, according to an analysis result output from the analysis unit.

(2)

The information processing apparatus according to (1) described above, further including:

an information database that stores the input information and information indicating the analysis result, in which the determination unit determines the work contents on the basis of information stored in the information database.

(3)

The information processing apparatus according to (1) or (2) described above, in which the analysis unit divides an entire surface of the vegetation corresponding to the target of management into plural divisional regions and outputs the analysis result for each of the divisional regions.

(4)

The information processing apparatus according to any one of (1) to (3) described above, in which the analysis unit outputs, as the analysis result, a vegetation index associated with grass that is the vegetation.

(5)

The information processing apparatus according to (4) described above, in which the vegetation index includes a grass leaf covering ratio that is a ratio of grass present per unit area and calculated on the basis of the image for each of divisional regions that are plural divisions of a grass surface.

(6)

The information processing apparatus according to (4) or (5) described above, in which the vegetation index includes a solar radiation amount calculated by integrating luminance values of sunlight reaching the grass surface on the basis of the image for each of divisional regions that are the plural divisions of the grass surface.

(7)

The information processing apparatus according to any one of (4) to (6) described above, in which the vegetation index includes a grass damage ratio that is calculated, for each of the divisional regions that are the plural divisions of the grass surface, as a ratio of an integrated value of periods in which a detection target stays in the corresponding divisional region to a total period of a moving image in which the grass surface is captured.

(8)

The information processing apparatus according to any one of (1) to (5) described above, further including:

a growth information collection unit that collects predetermined growth information, in which the analysis unit performs analysis on the basis of the growth information collected by the growth information collection unit.

(9)

The information processing apparatus according to any one of (3) to (8) described above, in which the divisional regions are divided according to an imaging area where the image is captured.

(10)

The information processing apparatus according to any one of (3) to (8) described above, in which the divisional regions are divided on the basis of a range of work to be performed for the vegetation.

(11)

The information processing apparatus according to any one of (2) to (10) described above, in which the information database stores sensor information associated with the vegetation as the target of management and received from an environment sensing apparatus that includes plural sensors and acquires the sensor information by sensing an environment.

(12)

The information processing apparatus according to any one of (1) to (11) described above, further including:

a cultivation method database that stores information associated with cultivation of the vegetation and including at least a learning model, in which the determination unit determines work contents associated with the vegetation, on the basis of the cultivation method database.

(13)

The information processing apparatus according to (12) described above, in which the determination unit determines execution timing of the work contents according to a predetermined deadline or a predetermined event set by a user.

(14)

The information processing apparatus according to (12) described above, further including:

a cultivation method improvement unit that updates the learning model on the basis of information stored in the cultivation method database, in which the updated learning model is stored in the cultivation method database.

(15)

The information processing apparatus according to (14) described above, in which information stored in an information database that stores the input information and information indicating the analysis result includes at least work contents result information.

(16)

The information processing apparatus according to any one of (1) to (12) described above, in which the determination unit presents the work contents that have been determined to a presentation unit that presents the work contents.

(17)

The information processing apparatus according to any one of (1) to (12) described above, in which the determination unit outputs information associated with the work contents to a work apparatus that performs a process for executing work for the vegetation.

(18) An information processing method performed by an information processing apparatus, the information processing method including:

analyzing, as at least input information, an image in which vegetation corresponding to a target of management is captured; and determining work contents to be performed for the vegetation, according to an analysis result output by the analysis.

(19)

A vegetation management system including:

an information processing apparatus that includes an image acquiring apparatus that acquires an image in which vegetation corresponding to a target of management is captured, an analysis unit that analyzes, as at least input information, an image acquired by the image acquiring apparatus, and a determination unit that determines work contents to be performed for the vegetation, according to an analysis result output from the analysis unit; and a work apparatus that performs a process for executing work for the vegetation according to the work contents determined by the determination unit.

Note that the present embodiment is not limited to the embodiment described above and may be modified in various manners without departing from the subject matters of the present disclosure. In addition, the advantageous effects described in the present description are presented only by way of example. Advantageous effects to be offered are not limited to these advantageous effects and may include other advantageous effects.

REFERENCE SIGNS LIST

11 Grass management system, 21 Grass surface imaging mechanism, 22 Growth information collection mechanism, 23 Environment sensing mechanism, 24 Cultivation method database, 25 Grass surface analysis mechanism, 26 Growth information analysis mechanism, 27 Sensing information database, 28 Cultivation method improvement mechanism, 29 Work contents determination mechanism, 30 Work mechanism, 31 Network, 32 Storage apparatus, 41 Camera, 42 Camera, 43 Personal computer, 44 camera, 45 Tablet-type computer, 51 Sensor, 52 Wired sensor integrated apparatus, 53 Antenna, 54 Light emitting apparatus, 55 Streamer, 56 Smoke generator, 57 PPFD measuring device

The invention claimed is:

1. An information processing apparatus comprising:

analysis circuitry configured to analyze, as at least input information, an image in which vegetation corresponding to a target of management is captured; and determination circuitry configured to determine work contents to be performed for the vegetation, according to an analysis result output from the analysis unit, wherein the analysis circuitry outputs, as the analysis result, a vegetation index associated with the vegetation, and the vegetation index includes a vegetation damage ratio that is calculated, for each of divisional regions that are plural divisions of a vegetation surface, as a ratio of an integrated value of periods in which a detection target stays in the corresponding divisional region to a total period of a moving image in which the vegetation surface is captured.

2. The information processing apparatus according to claim 1, further comprising:

an information database that stores the input information and information indicating the analysis result, wherein the determination circuitry determines the work contents on a basis of information stored in the information database.

3. The information processing apparatus according to claim 1, wherein the analysis circuitry divides an entire surface of the vegetation corresponding to the target of management into plural divisional regions and outputs the analysis result for each of the divisional regions.

4. The information processing apparatus according to claim 1, wherein the vegetation is grass, and the vegetation damage ratio is a grass damage ratio.

5. The information processing apparatus according to claim 4, wherein the vegetation index includes a grass leaf covering ratio that is a ratio of grass present per unit area and calculated on a basis of the image for each of divisional regions that are plural divisions of a grass surface.

6. The information processing apparatus according to claim 4, wherein the vegetation index includes a solar radiation amount calculated by integrating luminance values of sunlight reaching the grass surface, on a basis of the image, for each of divisional regions that are plural divisions of a grass surface.

7. The information processing apparatus according to claim 1, further comprising:
growth information collection circuitry configured to collect predetermined growth information, wherein
the analysis circuitry performs analysis on a basis of the growth information collected by the growth information collection circuitry.

8. The information processing apparatus according to claim 3, wherein
the divisional regions are divided according to an imaging area where the image is captured.

9. The information processing apparatus according to claim 3, wherein
the divisional regions are divided on a basis of a range of work to be performed for the vegetation.

10. The information processing apparatus according to claim 2, wherein
the information database stores sensor information associated with the vegetation as the target of management and received from an environment sensing apparatus that includes plural sensors and acquires the sensor information by sensing an environment.

11. The information processing apparatus according to claim 1, further comprising:
a cultivation method database that stores information associated with cultivation of the vegetation and including at least a learning model, wherein
the determination circuitry determines work contents associated with the vegetation, on a basis of the cultivation method database.

12. The information processing apparatus according to claim 11, wherein
the determination circuitry determines execution timing of the work contents according to a predetermined deadline or a predetermined event set by a user.

13. The information processing apparatus according to claim 11, further comprising:
cultivation method improvement circuitry that updates the learning model on a basis of information stored in the cultivation method database, wherein
the updated learning model is stored in the cultivation method database.

14. The information processing apparatus according to claim 13, wherein
information stored in an information database that stores the input information and information indicating the analysis result includes at least work contents result information.

15. The information processing apparatus according to claim 1, wherein
the determination circuitry presents the work contents that have been determined to a presentation circuitry that presents the work contents.

16. The information processing apparatus according to claim 1, wherein
the determination circuitry outputs information associated with the work contents to a work apparatus that performs a process for executing work for the vegetation.

17. An information processing method performed by an information processing apparatus, the information processing method comprising:
analyzing, as at least input information, an image in which vegetation corresponding to a target of management is captured;
determining work contents to be performed for the vegetation, according to an analysis result output by the analysis;
calculating a vegetation damage ratio that is calculated, for each of divisional regions that are plural divisions of a vegetation surface, as a ratio of an integrated value of periods in which a detection target stays in the corresponding divisional region to a total period of a moving image in which the vegetation surface is captured; and
outputting, as the analysis result, a vegetation index associated with the vegetation.

18. The information processing method according to claim 16, wherein the vegetation is grass, and the vegetation damage ratio is a grass damage ratio.

19. A non-transitory computer readable medium storing program code, the program code being executable by a processor to perform operations comprising:
analyzing, as at least input information, an image in which vegetation corresponding to a target of management is captured;
determining work contents to be performed for the vegetation, according to an analysis result output by the analysis;
calculating a vegetation damage ratio that is calculated, for each of divisional regions that are plural divisions of a vegetation surface, as a ratio of an integrated value of periods in which a detection target stays in the corresponding divisional region to a total period of a moving image in which the vegetation surface is captured; and
outputting, as the analysis result, a vegetation index associated with the vegetation.

20. The non-transitory computer readable medium according to claim 19, wherein the vegetation is grass, and the vegetation damage ratio is a grass damage ratio.

* * * * *